United States Patent
Feinberg

(10) Patent No.: US 11,580,372 B2
(45) Date of Patent: *Feb. 14, 2023

(54) EFFICIENT CONVOLUTIONAL ENGINE

(71) Applicant: Recogni Inc., San Jose, CA (US)

(72) Inventor: Eugene M. Feinberg, San Jose, CA (US)

(73) Assignee: Recogni Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/811,409

(22) Filed: Jul. 8, 2022

(65) Prior Publication Data

US 2022/0351027 A1    Nov. 3, 2022

Related U.S. Application Data

(63) Continuation of application No. 16/273,616, filed on Feb. 12, 2019, now Pat. No. 11,468,302.

(60) Provisional application No. 62/694,290, filed on Jul. 5, 2018, provisional application No. 62/642,578, filed on Mar. 13, 2018.

(51) Int. Cl.

| G06N 3/063 | (2006.01) |
| G06F 5/01 | (2006.01) |
| G06F 17/15 | (2006.01) |
| G06N 5/04 | (2006.01) |
| G06N 3/04 | (2006.01) |
| G06N 5/046 | (2023.01) |

(52) U.S. Cl.
CPC ............. *G06N 3/063* (2013.01); *G06F 5/01* (2013.01); *G06F 17/15* (2013.01); *G06N 3/04* (2013.01); *G06N 5/046* (2013.01)

(58) Field of Classification Search
CPC .......... G06N 3/063; G06N 3/04; G06N 5/046; G06N 3/0454; G06F 5/01; G06F 17/15
See application file for complete search history.

(56) References Cited

U.S. PATENT DOCUMENTS

| 5,138,695 A | 8/1992 | Means et al. |
| 8,442,927 B2 | 5/2013 | Chakradhar et al. |
| 8,533,250 B1 | 9/2013 | Foo et al. |
| 2015/0086134 A1 | 3/2015 | Hameed et al. |
| 2016/0314555 A1* | 10/2016 | Zhu .......................... G06T 1/60 |
| 2016/0379019 A1 | 12/2016 | Nyffeler et al. |
| 2016/0379109 A1 | 12/2016 | Chung et al. |
| 2017/0011006 A1 | 1/2017 | Saber et al. |
| 2017/0102950 A1 | 4/2017 | Chamberlain et al. |

(Continued)

FOREIGN PATENT DOCUMENTS

| CN | 106203617 A | 12/2016 |
| CN | 106951395 A | 7/2017 |

(Continued)

OTHER PUBLICATIONS

Aimar; et al., "NullHop: A Flexible Convolutional Neural Network Accelerator Based on Sparse Representations of Feature Maps", Computer Vision and Pattern Recognition; Neural and Evolutionary Computing, arXiv:1706.01406v2[cs.CV] (Mar. 6, 2018), 13 pages.

(Continued)

*Primary Examiner* — Sam K Ahn
*Assistant Examiner* — Amneet Singh
(74) *Attorney, Agent, or Firm* — Ascenda Law Group, PC

(57) ABSTRACT

A hardware architecture for implementing a convolutional neural network.

3 Claims, 58 Drawing Sheets

(56) References Cited

U.S. PATENT DOCUMENTS

| | | | |
|---|---|---|---|
| 2018/0005074 | A1 | 1/2018 | Shacham et al. |
| 2018/0046903 | A1 | 2/2018 | Yao et al. |
| 2018/0173571 | A1 | 6/2018 | Huang et al. |
| 2018/0330466 | A1* | 11/2018 | Basso .................. G06T 1/20 |
| 2019/0164043 | A1 | 5/2019 | Litvak et al. |
| 2019/0171930 | A1 | 6/2019 | Lee et al. |

FOREIGN PATENT DOCUMENTS

| | | |
|---|---|---|
| CN | 106951961 A | 7/2017 |
| CN | 107563952 A | 1/2018 |
| WO | 2016186810 A1 | 11/2016 |

OTHER PUBLICATIONS

Amendment (PCT Article 34) filed Jan. 13, 2020, for International Patent Application No. PCT/US2019/017787 (filed Feb. 13, 2019), 20 pgs.

Bernard; et al., "Reconfigurable Pipelined 2-D Convolvers for Fast Digital Signal Processing", IEEE Transactions on Very Large Scale Integration (VLSI) Systems, Sep. 1, 1999, 7(3):299-308.

Chakradhar; et al., "A Dynamically Configurable Coprocessor for Convolutional Neural Networks", Proceedings of the 37th Annual International Symposium on Computer Architecture, ISCA '10, Jun. 19, 2010, pp. 247-257.

Chen; et al., "Eyeriss: An Energy-Efficient Reconfigurable Accelerator for Deep Convolutional Neural Networks", IEEE Journal of Solid-State Circuits (Jan. 2017), 52(1):127-138.

Du; et al., "ShiDianNao: Shifting Vision Processing Closer to the Sensor", 2015 ACM/IEEE 42nd Annual International Symposium on Computer Architecture (ISCA) (Jun. 13-17, 2015), Access No. 15490986, 15 pages.

Hardesty, "Neural networks everywhere: New chip reduces neural networks' power consumption by up to 95 percent, making them practical for battery-powered devices", MIT News Office (Feb. 13, 2018), http://news.mit.edu/2018/chip-neural-networks-battery-powered-devices-0214, 3 pages.

Hrabovsky; et al., "Systolic-based 2D convolver for CNN in FPGA," 2017 15th International Conference on Emerging elearning Technologies and Applications (ICETA), 2017, pp. 1-7. (Year: 2017).

International Preliminary Report on Patentability dated Oct. 21, 2020, from the IPEA/US, for International Patent Application No. PCT/US2019/017787 (filed Feb. 13, 2019), 66 pgs.

International Search Report and Written Opinion dated May 24, 2019, from the ISA/European Patent Office, for International Application No. PCT/US2019/017787 (filed Feb. 13, 2019), 19 pages.

Kung; et al., "A Systolic 2-D Convolution Chip", Department of Computer Science, Carnegie-Mellon University, last revised Mar. 1981, 15 pages.

Lacassagne; et al., "High performance motion detection: some trends toward new embedded architectures for vision systems", J Real-Time Image Proc (2009) 4:127-146.

Lu; et al., "FlexFlow: A Flexible Dataflow Accelerator Architecture for Convolutional Neural Networks", 2017 IEEE International Symposium on High Performance Computer Architecture (2017), pp. 553-564.

Miyashita; et al., "Convolutional Neural Networks using Logarithmic Data Representation", Neural and Evolutionary Computing; Machine Learning, 1603.01025v2 [cs.NE] (Mar. 17, 2016), 10 pages.

Mukkara; et al., "SCNN: An Accelerator for Compressed-sparse Convolutional Neural Networks", Neural and Evolutionary Computing; Hardware Architecture; Machine Learning, arXiv:1708.04485v1 [cs.NE] (May 23, 2017), 12 pages.

Notice of Allowance dated May 25, 2022, for U.S. Appl. No. 16/273,616 (filed Feb. 12, 2019), 14 pgs.

Qadeer; et al., "Convolution Engine: Balancing Efficiency and Flexibility in Specialized Computing", Communications of the ACM (Apr. 2015), 58(4):85-93.

Qiao; et al., "FPGA-accelerated deep convolutional neural networks for high throughput and energy efficiency", Concurrency and Computation: Practice and Experience (2017), 29:e3850, 20 pages.

Qui; et al., "Going Deeper with Embedded FPGA Platform for Convolutional Neural Network", Proceedings of the 2016 ACM/SIGDA International Symposium on Field-Programmable Gate Arrays, FPGA '16, Jan. 1, 2016, pp. 26-35.

Sankaradas; et al., "A Massively Parallel Coprocessor for Convolutional Neural Networks", 2009 20th IEEE International Conference on Application-specific Systems, Architectures and Processors, Jul. 1, 2009, pp. 53-60.

Seong; et al., "Geometric Convolutional Neural Network for Analyzing Surface-Based Neuroimaging Data", Neural and Evolutionary Computing; Machine Learning, arXiv:1708.00587 [cs.NE] (Aug. 2, 2017), 29 pages.

Xu; et al., "Efficient fast convolution architectures for convolutional neural network," 2017 IEEE 12th International Conference on ASIC (ASICON), 2017, pp. 904-907. (Year: 2017).

Zhang; et al., "Optimizing FPGA-based Accelerator Design for Deep Convolutional Neural Networks", Proceedings of the 2015 ACM/SIGDA International Symposium on Field-Programmable Gate Arrays, FPGA '15, Feb. 22, 2015, pp. 161-170.

EP Examination Report dated Sep. 15, 2022, from the European Patent Office, for European Patent Application No. 19708715.8, 13 pgs.

The First Office Action dated Oct. 28, 2022, from the National Intellectual Property Administration of the People's Republic of China, for Chinese Patent Application No. 201980028372.6, 13 pgs.

Non-Final Office Action dated Dec. 13, 2022, for U.S. Appl. No. 17/811,410, (filed: Jul. 8, 2022), 32 pgs.

* cited by examiner

Model Training

Model Inference

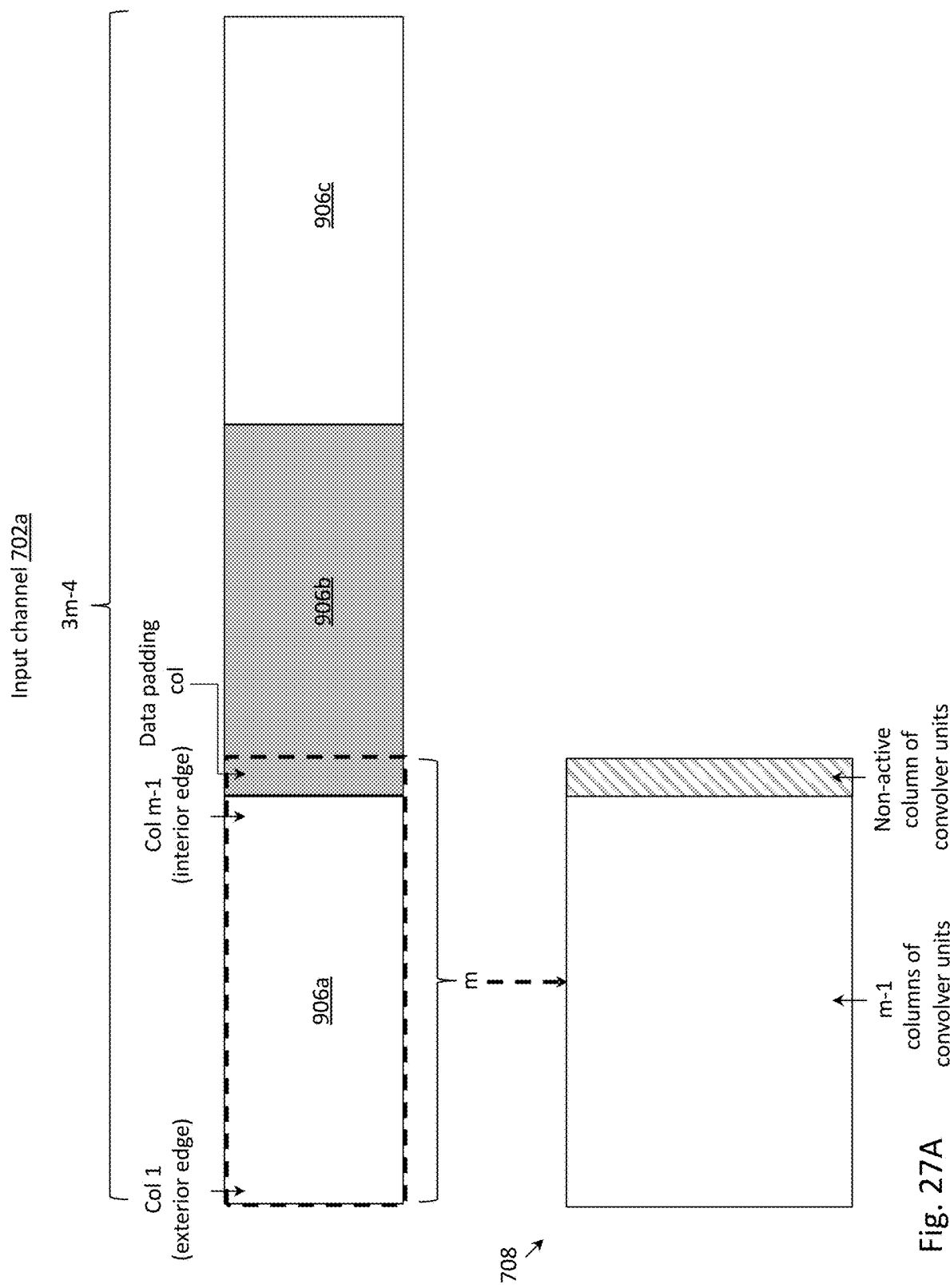

EFFICIENT CONVOLUTIONAL ENGINE

RELATED APPLICATIONS

This application is a Continuation Application of U.S. application Ser. No. 16/273,616, filed on 12 Feb. 2019 (now issued as U.S. Pat. No. 11,468,302), which is a non-provisional patent application of and claims priority to U.S. Provisional Application No. 62/642,578, filed 13 Mar. 2018 and U.S. Provisional Application No. 62/694,290, filed 5 Jul. 2018, all of which are incorporated by reference herein.

FIELD OF THE INVENTION

The present invention relates to a hardware architecture for a convolutional engine, and more particularly relates to an efficient way to provide data values to compute units (called convolver units or functional units) of the convolutional engine.

BACKGROUND

Today, neural networks (in particular convolution neural networks) are widely used for performing image recognition/classification, object recognition/classification and image segmentation. While having numerous applications (e.g., object identification for self-driving cars, facial recognition for social networks, etc.), neural networks require intensive computational processing and frequent memory accesses. Described herein is an efficient hardware architecture for implementing a convolutional neural network.

BRIEF DESCRIPTION OF THE DRAWINGS

FIGS. 10B-10D depict the loading of data values into the 2-D shift register, in accordance with one embodiment of the invention.

FIGS. 15B-15D depict the loading of data values into the 2-D shift register, in accordance with one embodiment of the invention.

FIGS. 27A-27C depict the loading of data values into the convolutional engine for scenario (b), in accordance with one embodiment of the invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Description associated with any one of the figures may be applied to a different figure containing like or similar components/steps.

Figure 1:
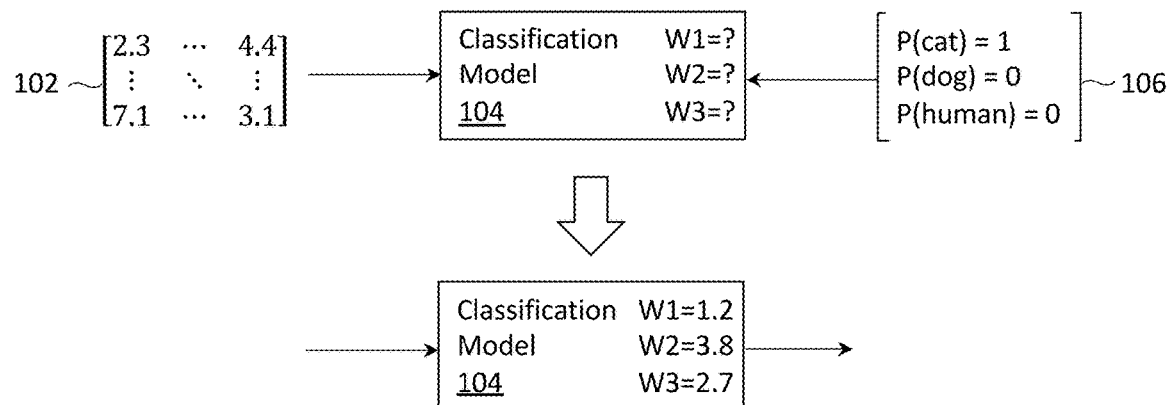
FIG. 1 depicts a diagram providing an overview of model training and model application in a neural network.
Figure 1:
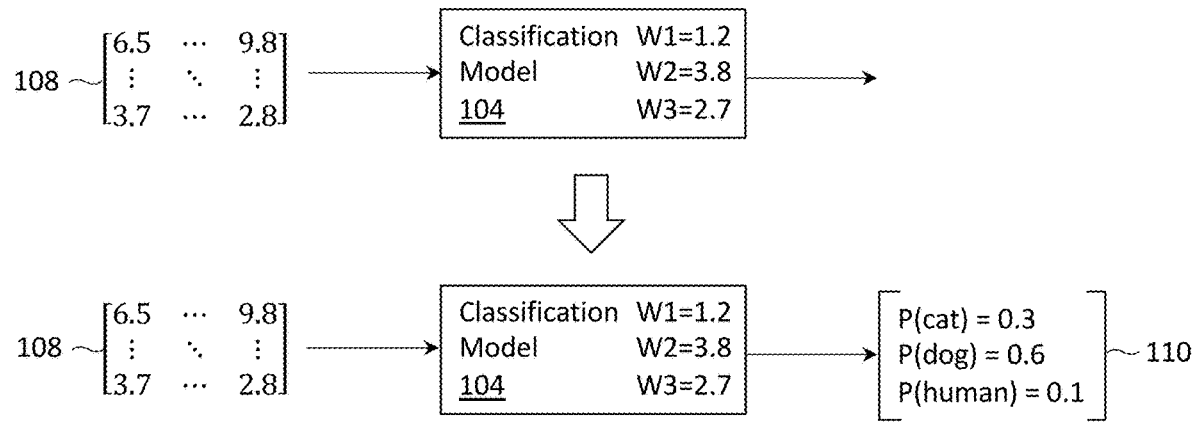

FIG. 1 depicts a diagram providing an overview of the training phase and the inference phase in a neural network. In the training phase, pairs of input and known (or desired) output may be provided to train model parameters (also called "weights") of classification model 104. For conciseness, only one input and output pair (102, 106) is depicted in FIG. 1, but in practice many known input and output pairs will be used to train classification model 104. In the example of FIG. 1, input 102 is a matrix of numbers (which may represent the pixels of an image) and known output 106 is a vector of classification probabilities (e.g., the probability that the input image is a cat is 1, the probability that the input image is a dog is 0, and the probability that the input image is a human is 0). In one possible training process, the classification probabilities may be provided by a human (e.g., a human can recognize that the input image depicts a cat and assign the classification probabilities accordingly). At the conclusion of the model training process, the model parameters will have been estimated (e.g., W1=1.2, W2=3.8, W3=2.7). Sometimes, there may be intuitive ways to interpret the model parameters, but many times no intuition may be associated therewith, and the model parameters may simply be the parameters that minimize the error between the model's classification (or the model's classification probabilities) of a given set of input with the known classification (or known classification probabilities), while at the same time avoiding "model overfitting".

In the inference (or prediction or feed-forward) phase, classification model 104 with trained parameters (i.e., parameters trained during the training phase) is used to classify a set of input. In the instant application, the trained classification model 104 provides the classification output 110 of a vector of probabilities (e.g., the probability that the input image is a cat is 0.3, the probability that the input image is a dog is 0.6, and the probability that the input image is a human is 0.1) in response to input 108.

One embodiment of classification model 104 is a convolutional neural network. A basic building block of a convolutional neural network is a convolution operation, which is described in FIGS. 2-7. As further described below, a convolution operation may refer to a 2-dimensional convolution operation with 2-dimensional input and a 2-dimensional filter, a 3-dimensional convolution operation with 3-dimensional input and a 3-dimensional filter, etc.

Figure 2:
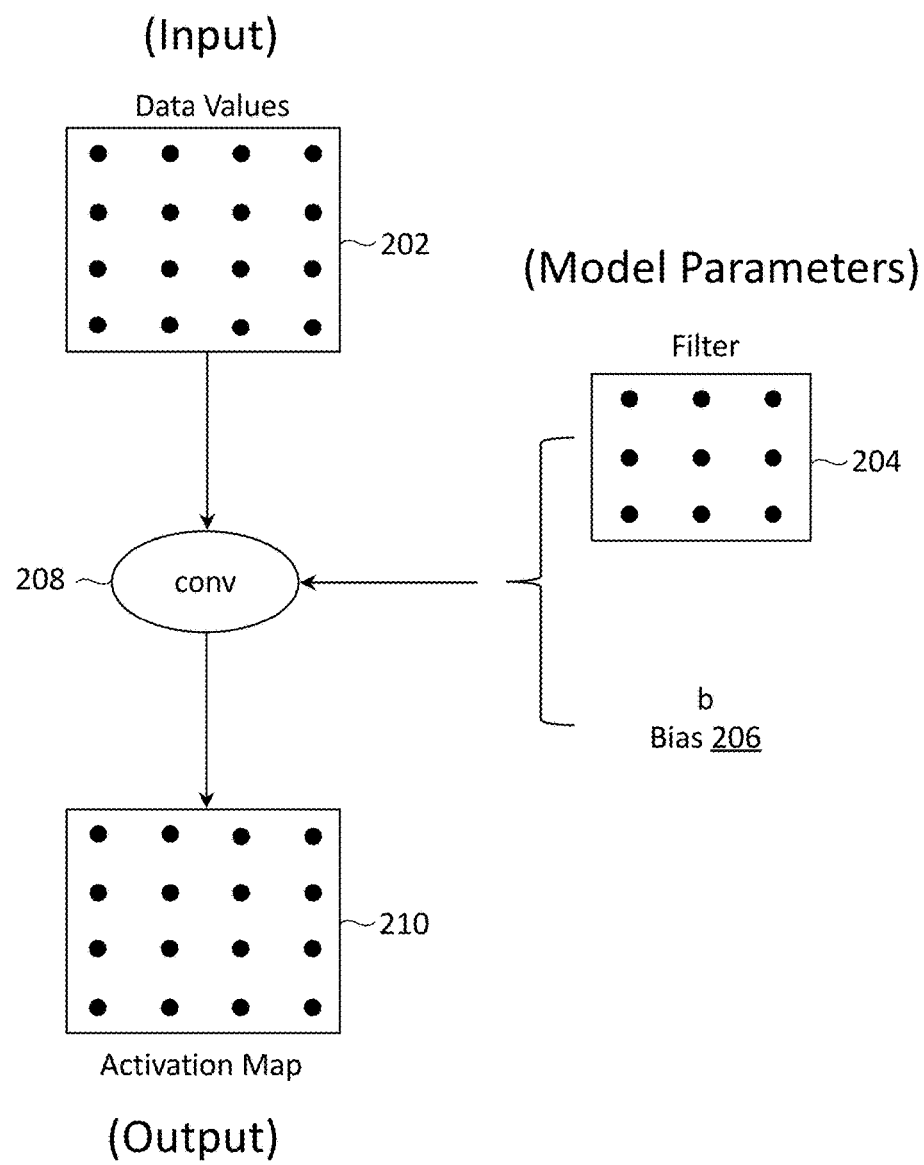
FIG. 2 depicts a diagram of the input, model parameters and output of a convolution operation, the model parameters including a single 2-dimensional filter.

FIG. 2 depicts a diagram of the input, model parameters and output of a 2-dimensional convolution operation. In the example of FIG. 2, the input includes a 2-dimensional matrix of numerical values (each of the numerical values abstractly represented by "•"). The matrix in the example of FIG. 2 is a 4×4 matrix, but other input could have different dimensions (e.g., could be a 100×100 square matrix, a 20×70 rectangular matrix, etc.). Later presented examples will illustrate that the input may even be a 3-dimensional object. In fact, the input may be an object of any number of dimensions. The input may represent pixel values of an image or may represent the output of a previous convolution operation.

The model parameters may include a filter and a bias. In the example of FIG. 2, the filter is a 3×3 matrix of values (the values also called "weights") and the bias is a scalar value. Typically, there is one bias associated with each filter. The example in FIG. 2 includes one filter, so there is one corresponding bias. However, in certain embodiments, if there were 5 filters, there would be 5 associated biases, one for each of the filters.

The convolution operator 208 (abbreviated "conv") receives input 202 and the model parameters 204, 206, and generates output 210 called an activation map or a feature map. Each value of the activation map is generated as the sum of a dot product between of input 202 and filter 204 (at a certain spatial location relative to input 202) and bias 206. The computations to arrive at activation map 210 are described in more detail below in FIG. 3.

Figure 3:
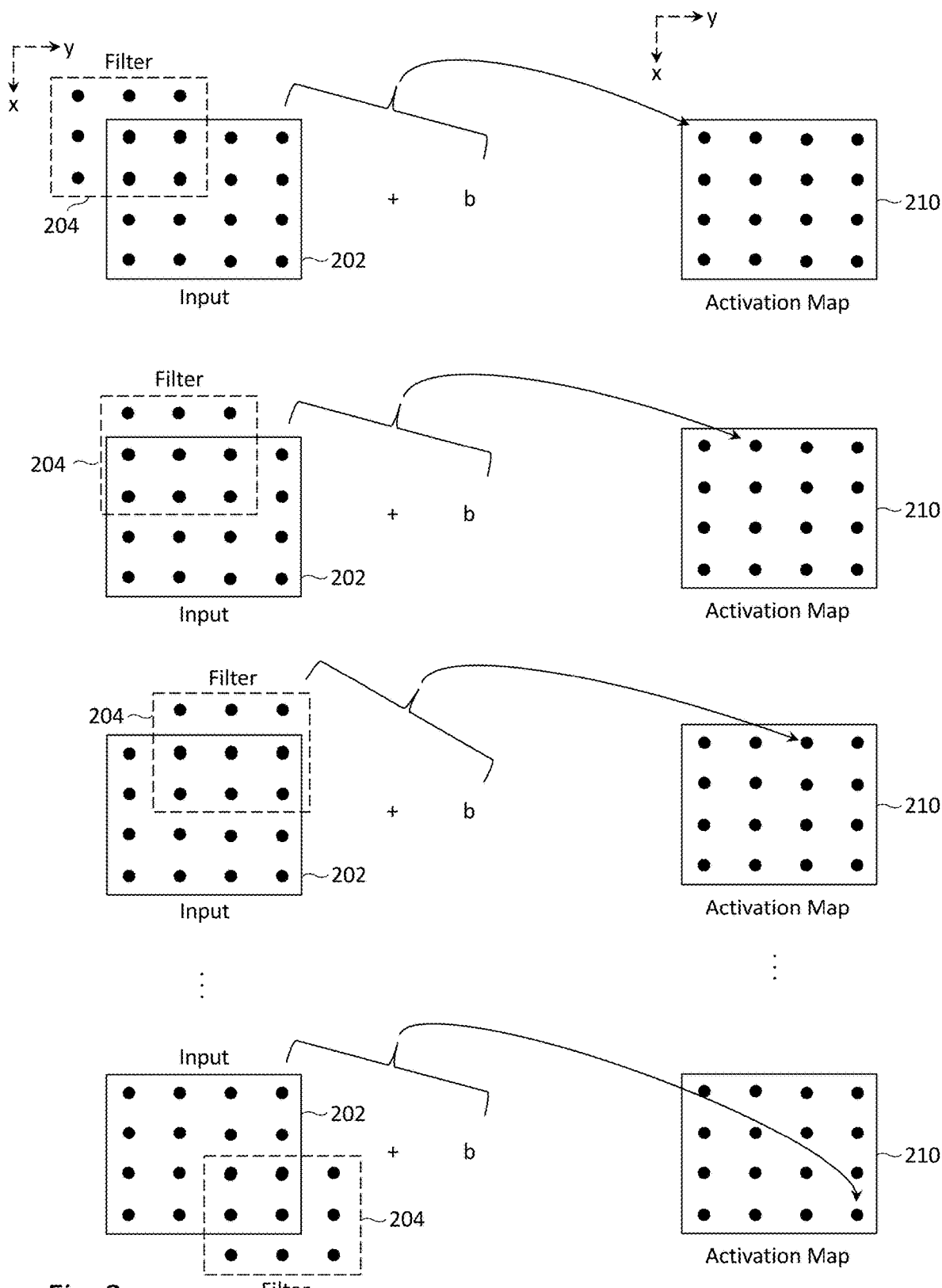
FIG. 3 depicts a diagram that explains the computation of a convolution operation using a 2-dimensional filter.

The first row of FIG. 3 describes the computation of the element at position (x=1, y=1) of activation map 210. As shown in the first row, the center of filter 204 is spatially aligned with the element at position (1, 1) of input 202. Such computation assumes the use of "zero padding" in which the input 202 is implicitly surrounded by a border of zeros. The advantage of using zero padding is that the dimensions of input 202 and output activation map 210 remain constant when using a 3×3 filter. A dot product is computed between filter 204 and the four values of input 202 that spatially align with filter 204. The dot product is then summed with bias b to arrive at the element at position (1, 1) of activation map 210.

The second row of FIG. 3 describes the computation of the element at position (1, 2) of activation map 210. As shown in the second row, the center of filter 204 is spatially aligned with the element at position (1, 2) of input 202. A dot product is computed between filter 204 and the six values of input 202 that spatially align with filter 204. The dot product is then summed with bias b to arrive at the element at position (1, 2) of activation map 210.

The third row of FIG. 3 describes the computation of the element at position (1, 3) of activation map 210. As shown in the third row, the center of filter 204 is spatially aligned with the element at position (1, 3) of input 202. A dot product is computed between filter 204 and the six values of input 202 that spatially align with filter 204. The dot product is then summed with bias b to arrive at the element at position (1, 3) of activation map 210.

The fourth row of FIG. 3 describes the computation of the element at position (4, 4) of activation map 210. As shown in the fourth row, the center of filter 204 is spatially aligned with the element at position (4, 4) of input 202. A dot product is computed between filter 204 and these four values of input 202 that spatially align with filter 204. The dot product is then summed with bias b to arrive at the element at position (4, 4) of activation map 210. In general, the convolution operation comprises a plurality of shift (or align), dot product and bias (or sum) steps. In the present example, the filter was shifted by 1 spatial position between dot product computations (called the step size or stride), but other step sizes of 2, 3, etc. are possible.

Figure 4:
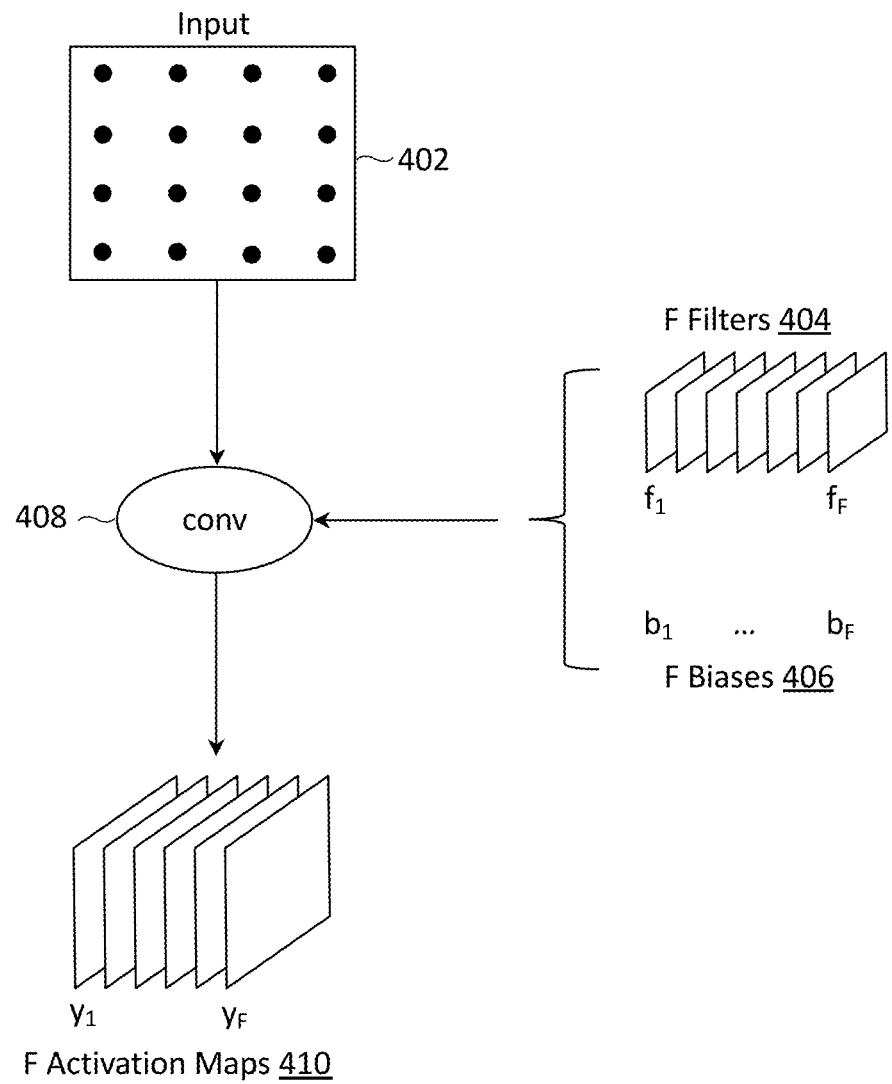
FIG. 4 depicts a diagram of the input, model parameters and output of a convolution operation, the model parameters including a plurality of 2-dimensional filters.

FIG. 4 is similar to FIG. 2, except that there are F filters 404, F biases 406 and F activation maps 410 instead of a single filter 204, a single bias 206 and a single activation map 210. The relation between the F filters 404, F biases 406 and F activation maps 410 is as follows: Filter $f_1$, bias $b_1$ and input 402 are used to compute activation map $y_1$ (in very much the same way that filter 204, bias 206 and input 202 were used to compute activation map 210 in FIG. 2); filter $f_2$, bias $b_2$ and input 402 are used to compute activation map $y_2$; and so on.

Figure 5:
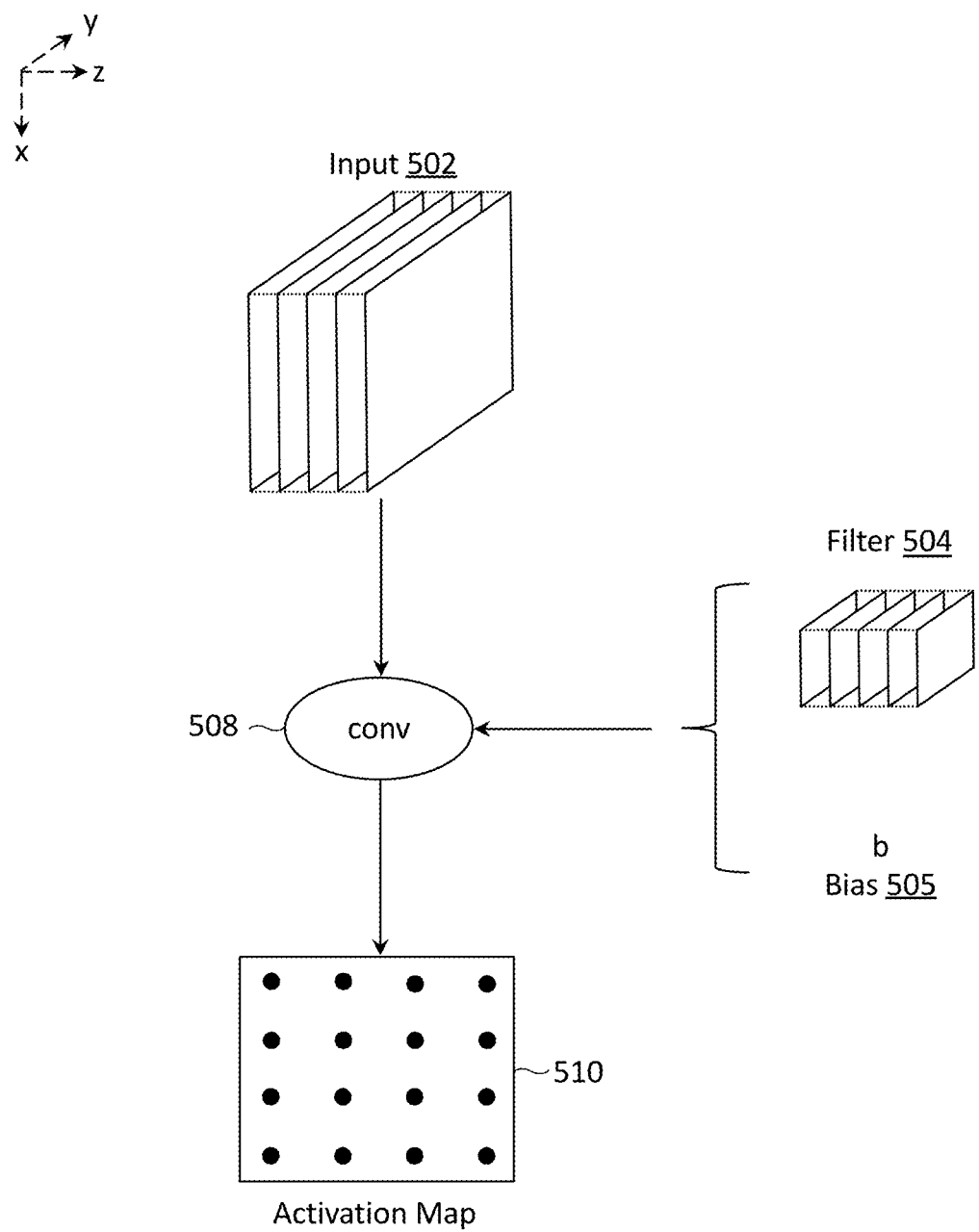
FIG. 5 depicts a diagram of the input, model parameters and output of a convolution operation, the model parameters including a single 3-dimensional filter.

FIG. 5 is similar to FIG. 2, except that instead of a 2-dimensional input 202 and a 2-dimensional filter 204, a 3-dimensional input 502 and a 3-dimensional filter 504 are used. The computations to arrive at activation map 510 are described in more detail below in FIG. 6. While input 502 and filter 504 are 3-dimensional, activation map 510 is 2-dimensional, as will become clearer in the associated description of FIG. 6. Each "slice" of filter 504 (analogous to a "channel" of input 502) may be called a kernel. In FIG. 5, filter 504 is composed of five kernels, and input 502 is composed of five channels. If not already apparent, the number of kernels of filter 504 (or the size of the "z" dimension of filter 504) must match the number of channels of input 502 (or the size of the "z" dimension of input 502). During a convolution operation, channel 1 of input 502 aligns with kernel 1 of filter 504; channel 2 of input 502 aligns with kernel 2 of filter 504; and so on. Typically, there is no translation of filter 504 with respect to input 502 in the z-dimension during a convolution operation.

Figure 6:
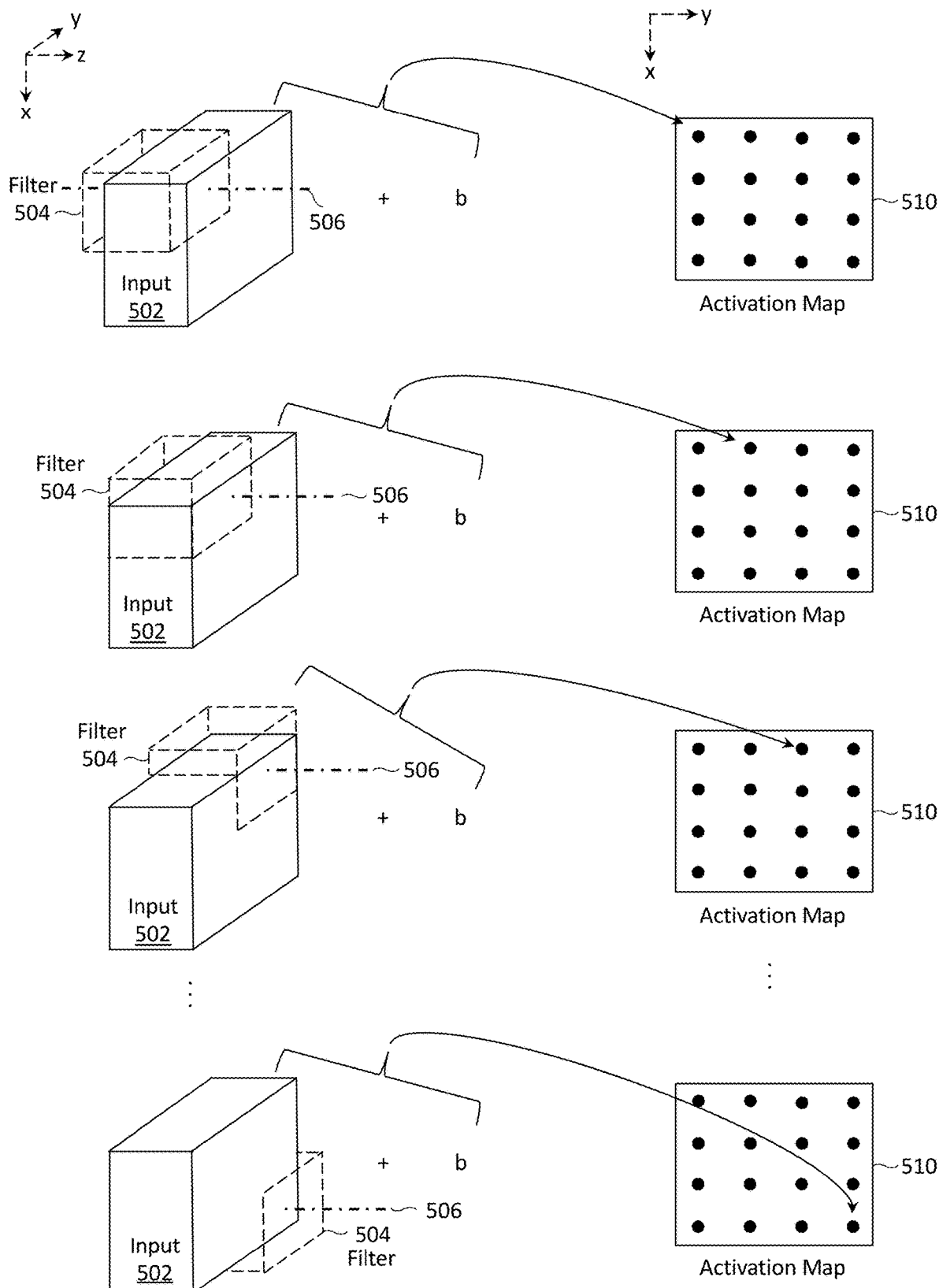
FIG. 6 depicts a diagram that explains the computation of a convolution operation using a 3-dimensional filter.

The first row of FIG. 6 describes the computation of the element at position (x=1, y=1) of activation map 510. As shown in the first row, the central axis 506 of filter 504 (with central axis drawn parallel to the z-axis) is aligned with the elements at positions (1, 1, z) for $z \in \{1, \ldots, 5\}$ of input 502. A dot product is computed between filter 504 and the twenty values of input 502 that spatially align with filter 504 (4 aligned values per channel×5 channels). The dot product is then summed with bias b to arrive at the element at position (1, 1) of activation map 510.

The second row of FIG. 6 describes the computation of the element at position (1, 2) of activation map 510. As shown in second first row, the central axis 506 of filter 504 is aligned with the elements at positions (1, 2, z) for $z \in \{1, \ldots, 5\}$ of input 502. A dot product is computed between filter 504 and the thirty values of input 502 that spatially align with filter 504 (6 aligned values per channel×5 channels). The dot product is then summed with bias b to arrive at the element at position (1, 2) of activation map 510.

The third row of FIG. 6 describes the computation of the element at position (1, 3) of activation map 510. As shown in the third row, the central axis 506 of filter 504 is aligned with the elements at positions (1, 3, z) for $z \in \{1, \ldots, 5\}$ of input 502. A dot product is computed between filter 504 and the thirty values of input 502 that spatially align with filter 504 (6 aligned values per channel×5 channels). The dot product is then summed with bias b to arrive at the element at position (1, 3) of activation map 510.

The fourth row of FIG. 6 describes the computation of the element at position (4, 4) of activation map 510. As shown in the fourth row, the central axis 506 of filter 504 is aligned with the elements at positions (4, 4, z) for $z \in \{1, \ldots, 5\}$ of input 502. A dot product is computed between filter 504 and the twenty values of input 502 that spatially align with filter 504 (4 aligned values per channel×5 channels). The dot product is then summed with bias b to arrive at the element at position (4, 4) of activation map 510.

Figure 7:
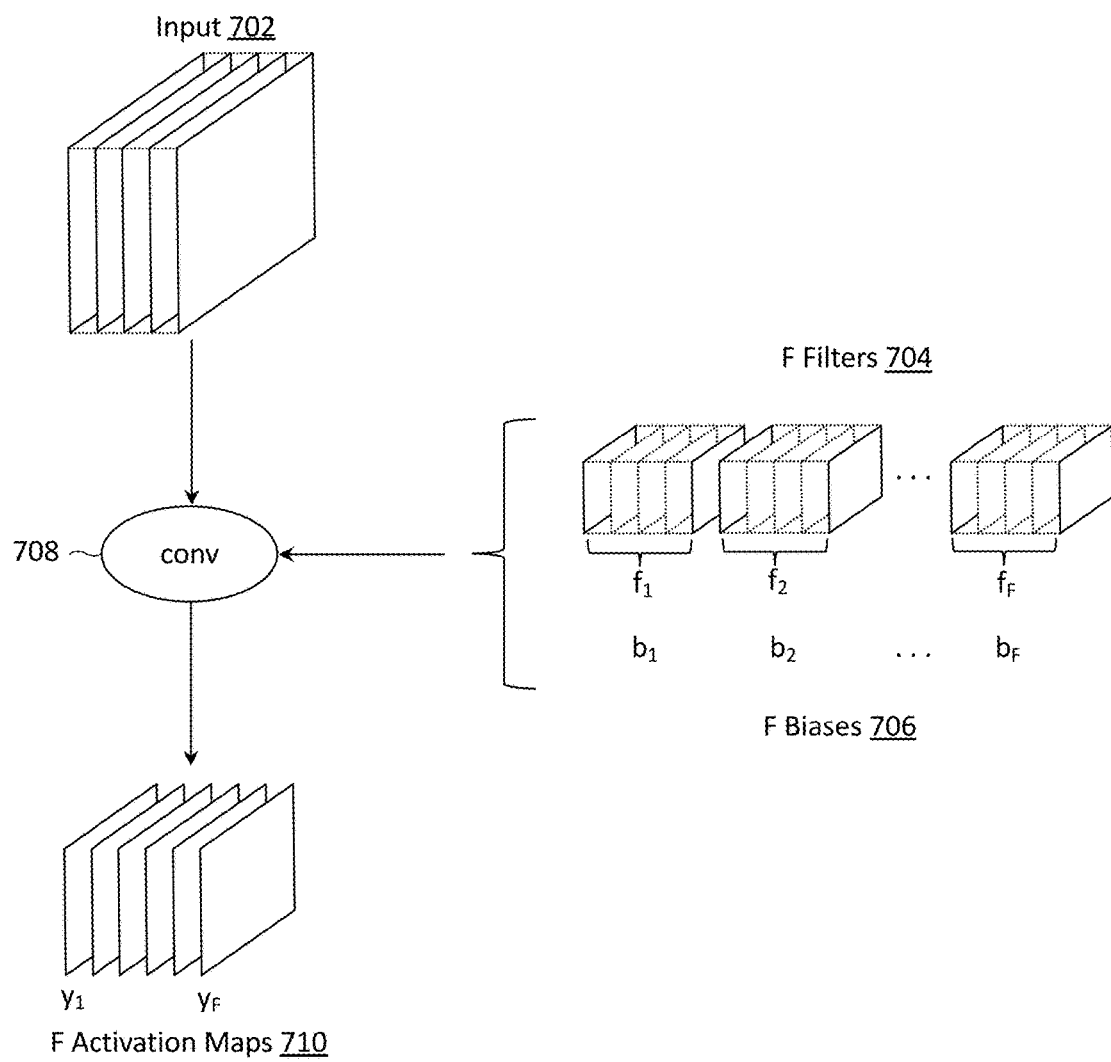
FIG. 7 depicts a diagram of the input, model parameters and output of a convolution operation, the model parameters including a plurality of 3-dimensional filters.

FIG. 7 is similar to FIG. 5, except that there are F 3-dimensional filters 704, F biases 706 and F activation maps 710 (F>1), instead of a single 3-dimensional filter 504, a single bias b 505 and a single activation map 510. The relation between the F 3-dimensional filters 704, F biases 706 and F activation maps 710 is as follows: Filter $f_1$, bias $b_1$ and input 702 are used to compute activation map $y_1$ (in very much the same way that filter 504, bias b 505 and input 502 were used to compute activation map 510 in FIG. 5); filter $f_2$, bias $b_2$ and input 702 are used to compute activation map $y_2$; and so on.

The following figures describe a hardware architecture to perform the convolution operation of FIG. 7. Many of the examples assume the use of two filters, F=2, for simplicity. The examples further assume that the filters 704 are constructed using 3×3 kernels (i.e., each kernel being composed of 9 weights). It is understood, however, that the concepts/architectures described herein can be modified to accommodate kernels with other dimensions.

Figure 8:
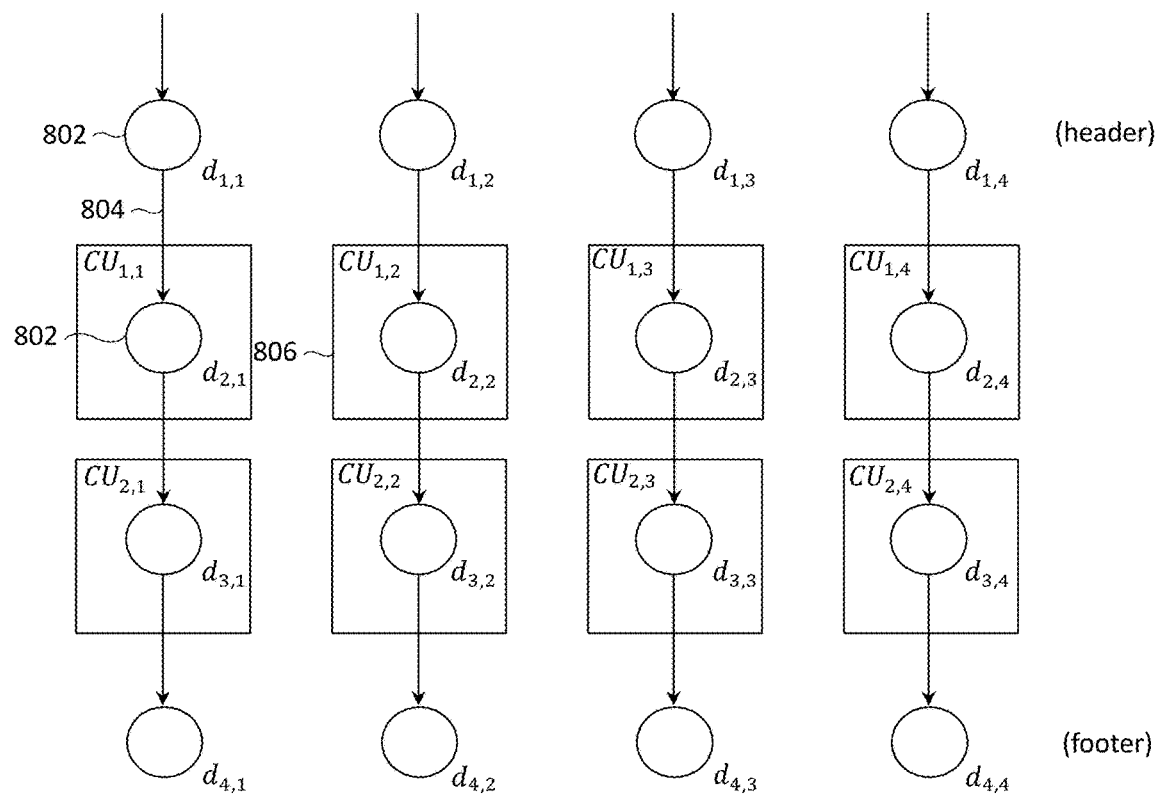
FIG. 8 depicts a convolutional engine including a 2-D shift register and an array of convolver units, in accordance with one embodiment of the invention.

FIG. 8 depicts convolutional engine 708, in accordance with one embodiment of the invention. Convolutional engine 708 (depicted in FIG. 8) is a hardware architecture of the convolution operator ("conv") 708 (depicted in FIG. 7). Convolutional engine 708 may include a 2-D shift register with an array of data storage elements:

$$\begin{bmatrix} d_{1,1} & d_{1,2} & d_{1,3} & d_{1,4} \\ d_{2,1} & d_{2,2} & d_{2,3} & d_{2,4} \\ d_{3,1} & d_{3,2} & d_{3,3} & d_{3,4} \\ d_{4,1} & d_{4,2} & d_{4,3} & d_{4,4} \end{bmatrix}$$

In the simplified example of FIG. 8, the array is a four by four array. Each of the data storage elements may be formed by a plurality of D flip-flops (i.e., one D flip-flop to store each bit of a data signal). Therefore, if data storage element $d_{1,1}$ were to store eight bits, $d_{1,1}$ may be formed from eight D flip-flops. Each of the arrows between pairs of data storage elements represents an electrical connection (i.e., may be implemented as a wire). For example, data storage element $d_{1,1}$ (ref. num. 802) may be electrically coupled to storage element $d_{2,1}$ (ref. num. 802) via electrical connection 804. Further, the arrow may represent a one-directional flow of data (i.e., data being transmitted from data storage element $d_{1,1}$ to data storage element $d_{2,1}$, but not from $d_{2,1}$ to data storage element $d_{1,1}$). In the discussion that follows, the first row of data storage elements may be called a "header", and the last row of data storage elements may be called a "footer".

Convolutional engine 708 may further include an array of convolver units:

$$\begin{bmatrix} CU_{1,1} & CU_{1,2} & CU_{1,3} & CU_{1,4} \\ CU_{2,1} & CU_{2,2} & CU_{2,3} & CU_{2,4} \end{bmatrix}$$

For conciseness, an array of convolver units may be called "a convolver array". In the simplified example of FIG. 8, the convolver array is a two by four array. Convolver unit $CU_{1,2}$ has been labeled with reference numeral 806 (to facilitate later discussion). It is understood that a more typical embodiment will contain many more convolver units, such as in the example embodiment of FIG. 30. The operation of the 2-D shift register and the operation of the convolver units will be described in detail in the following figures.

Figure 9A:
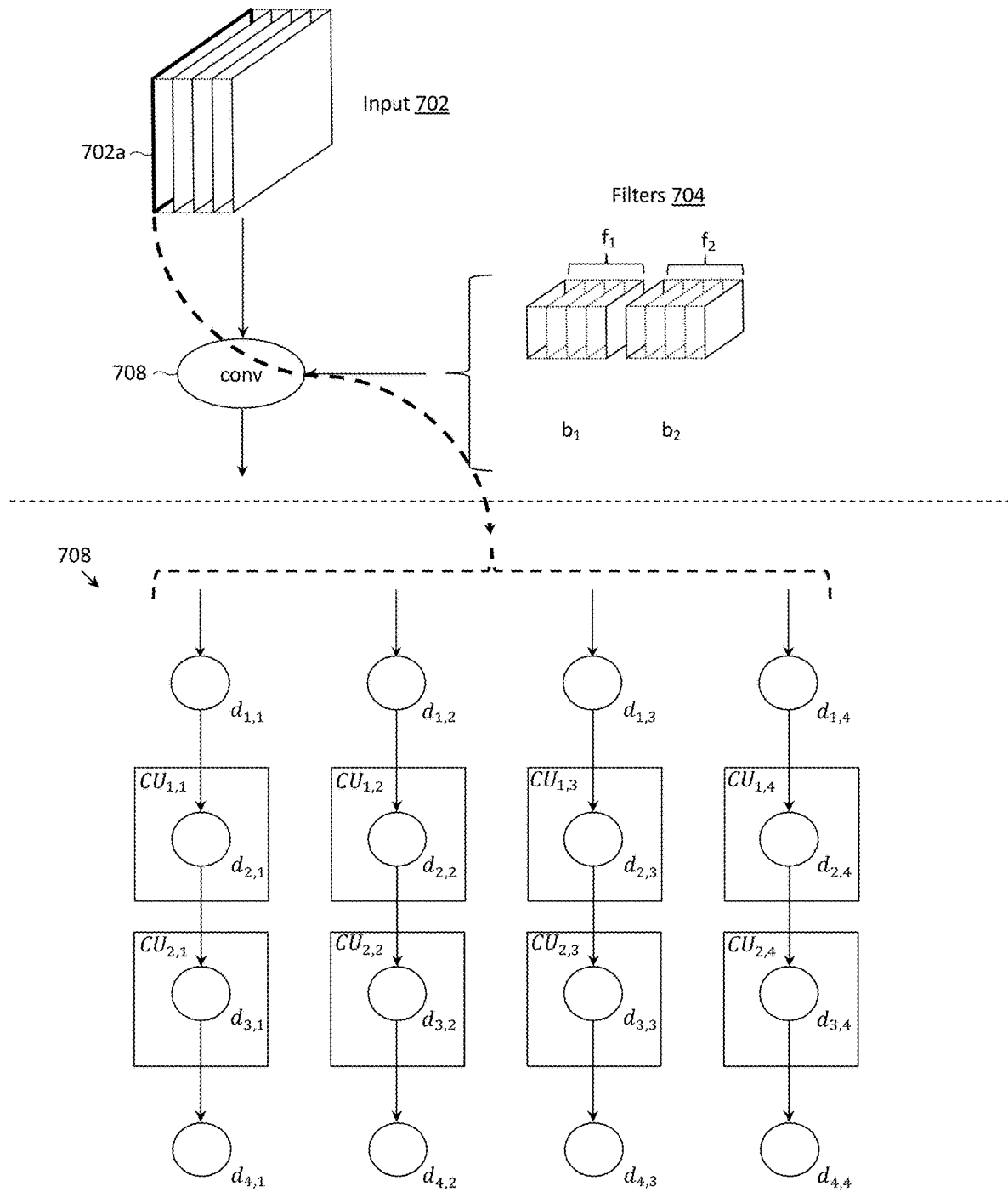
FIGS. 9A-9B depict the loading of data values into the convolutional engine, in accordance with one embodiment of the invention.

FIG. 9A depicts the loading of data values into convolutional engine 708, in accordance with one embodiment of the invention. Each channel of input may be loaded into convolutional engine 708 in a serial fashion. FIG. 9A depicts the loading of the first channel 702a of input 702 into convolutional engine 708 (assuming that the channels are numbered from 1 to 5 in the left to right direction). As will be described in FIGS. 10B-10D, the rows of a particular channel may be loaded into convolutional engine 708 in a serial fashion. It is noted that terms such as a "row" and a "column" will be/are being used for convenience and with respect to how elements are depicted in the figures. Nevertheless, the meaning of such terms may or may not translate into how circuit elements are laid out on a chip, where a row could be interpreted as a column and vice versa, depending on the viewer's orientation with respect to the chip.

Figure 9B:
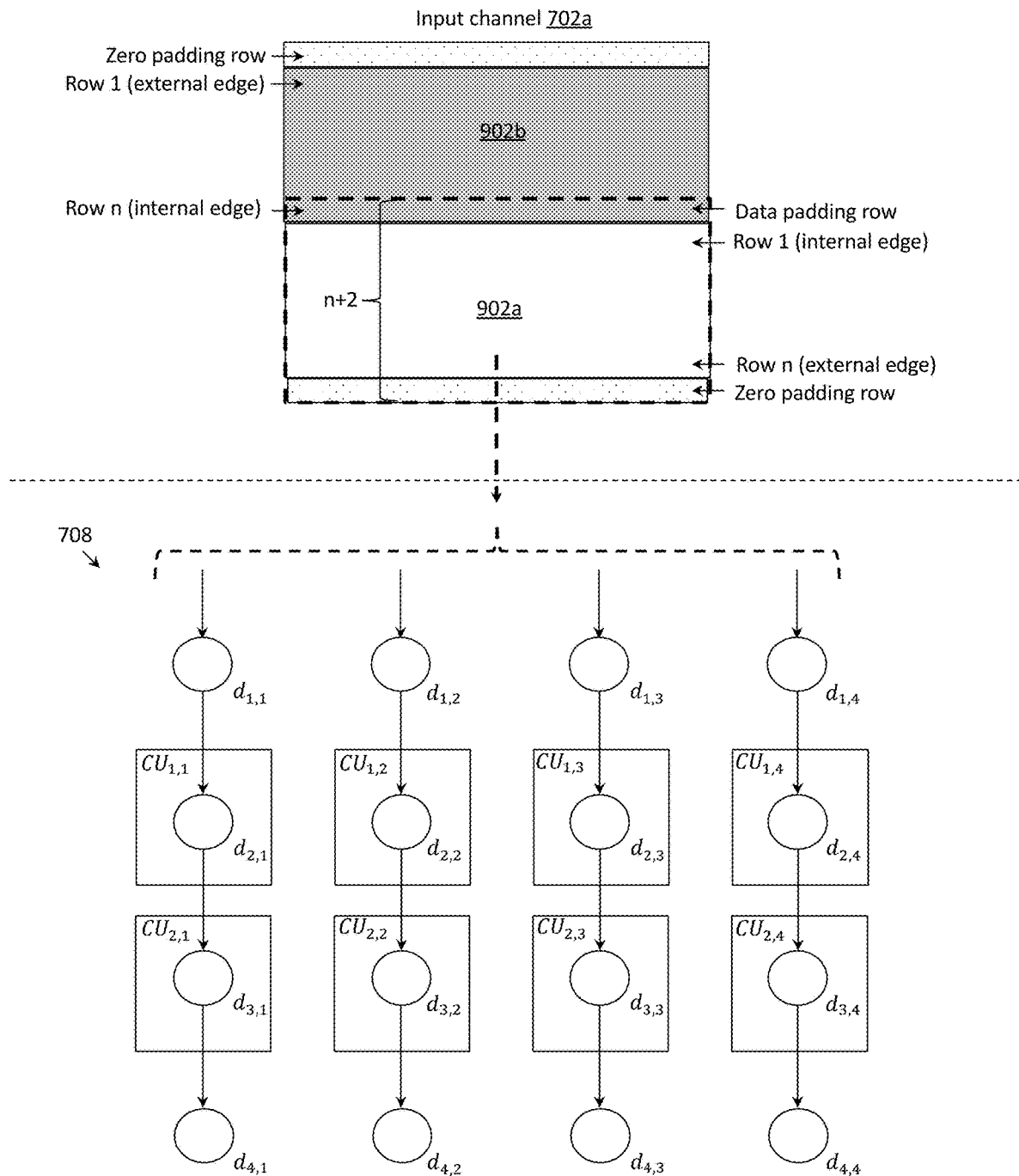
Figure 27B:
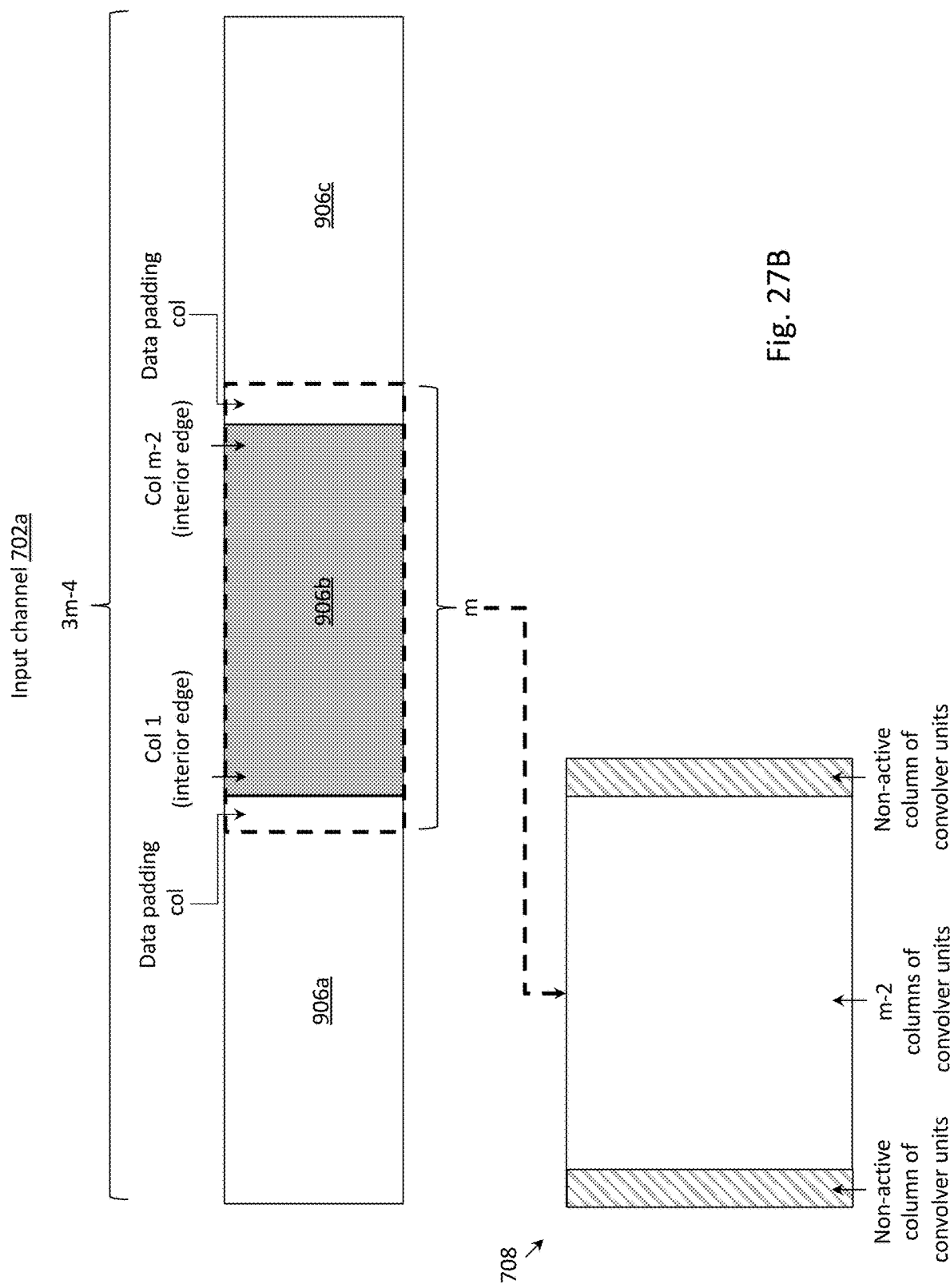
Figure 27C:
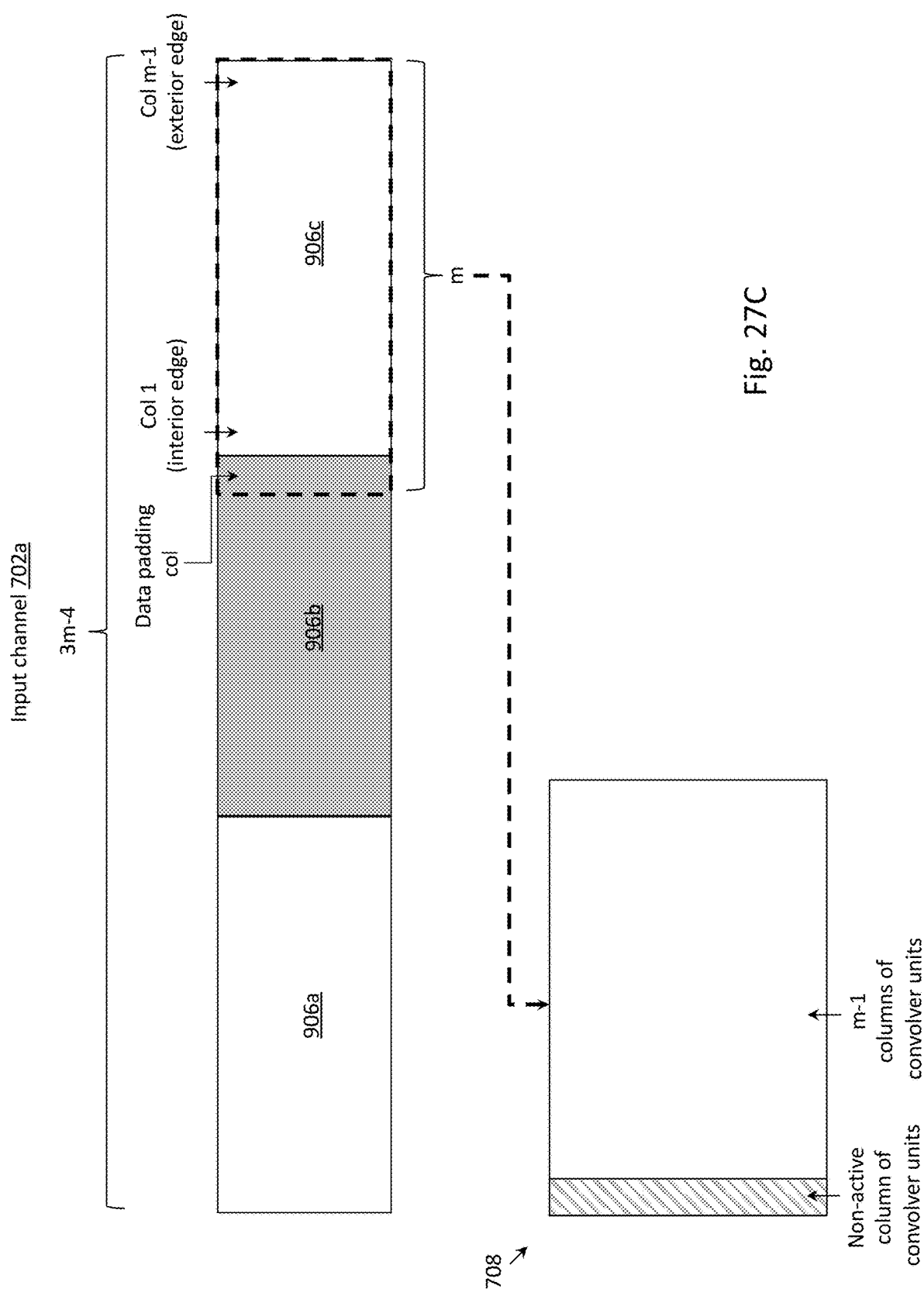
Figure 28:
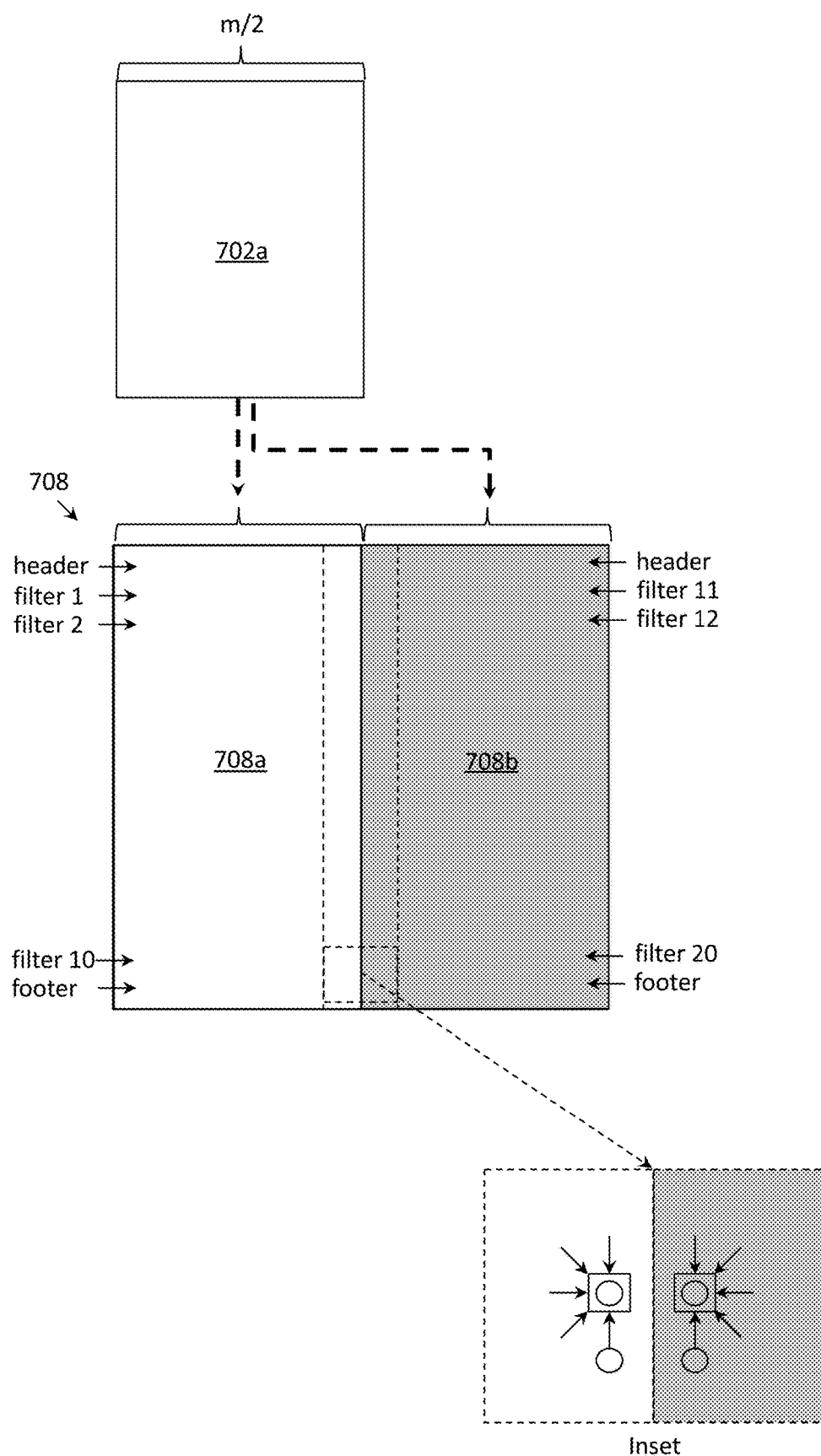
FIG. 28 depicts the loading of data values into the convolutional engine for scenario (c), in accordance with one embodiment of the invention.
Figure 29A:
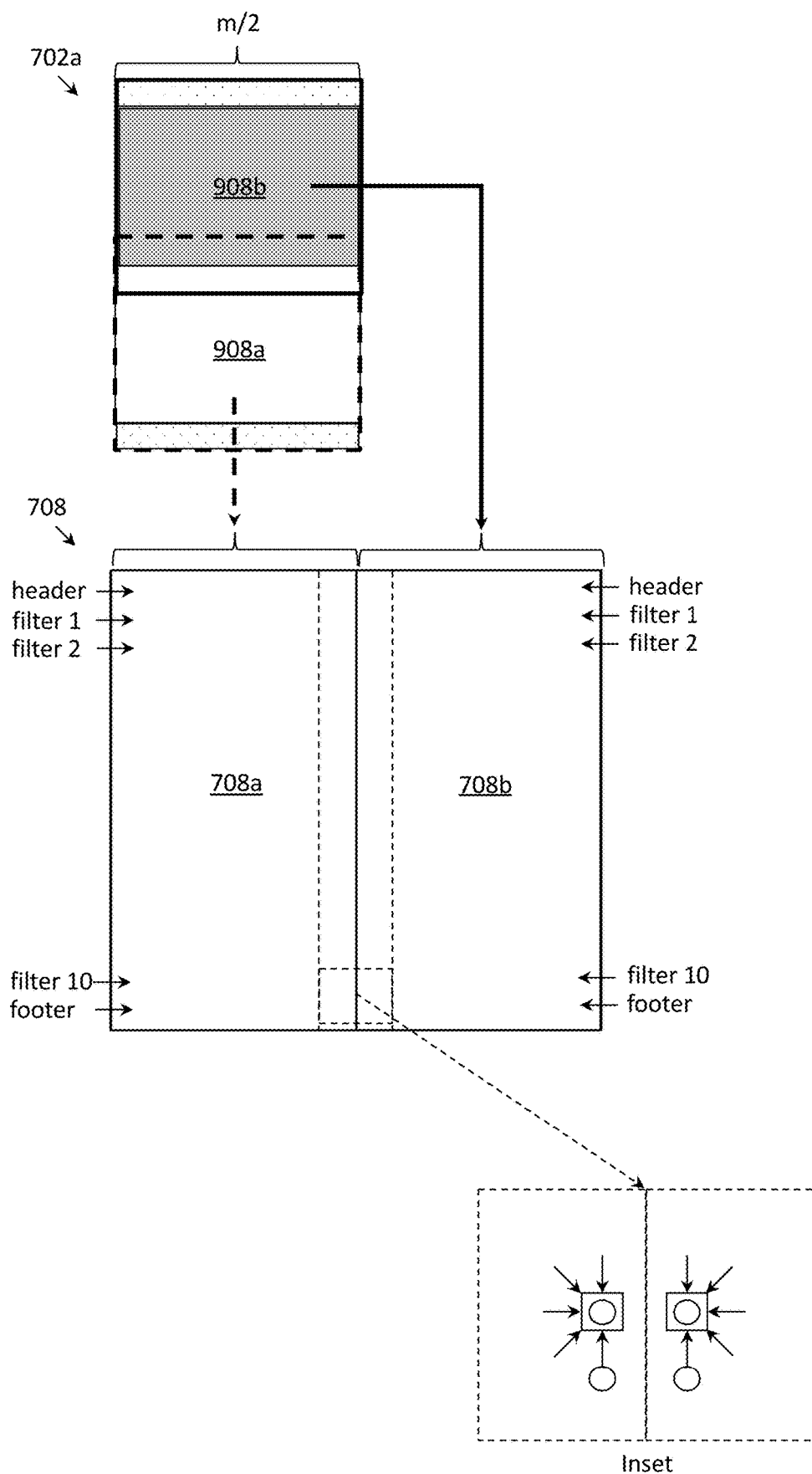
FIGS. 29A-29B depict an alternate scheme for loading data values into the convolutional engine for scenario (c), in accordance with one embodiment of the invention.
Figure 29B:
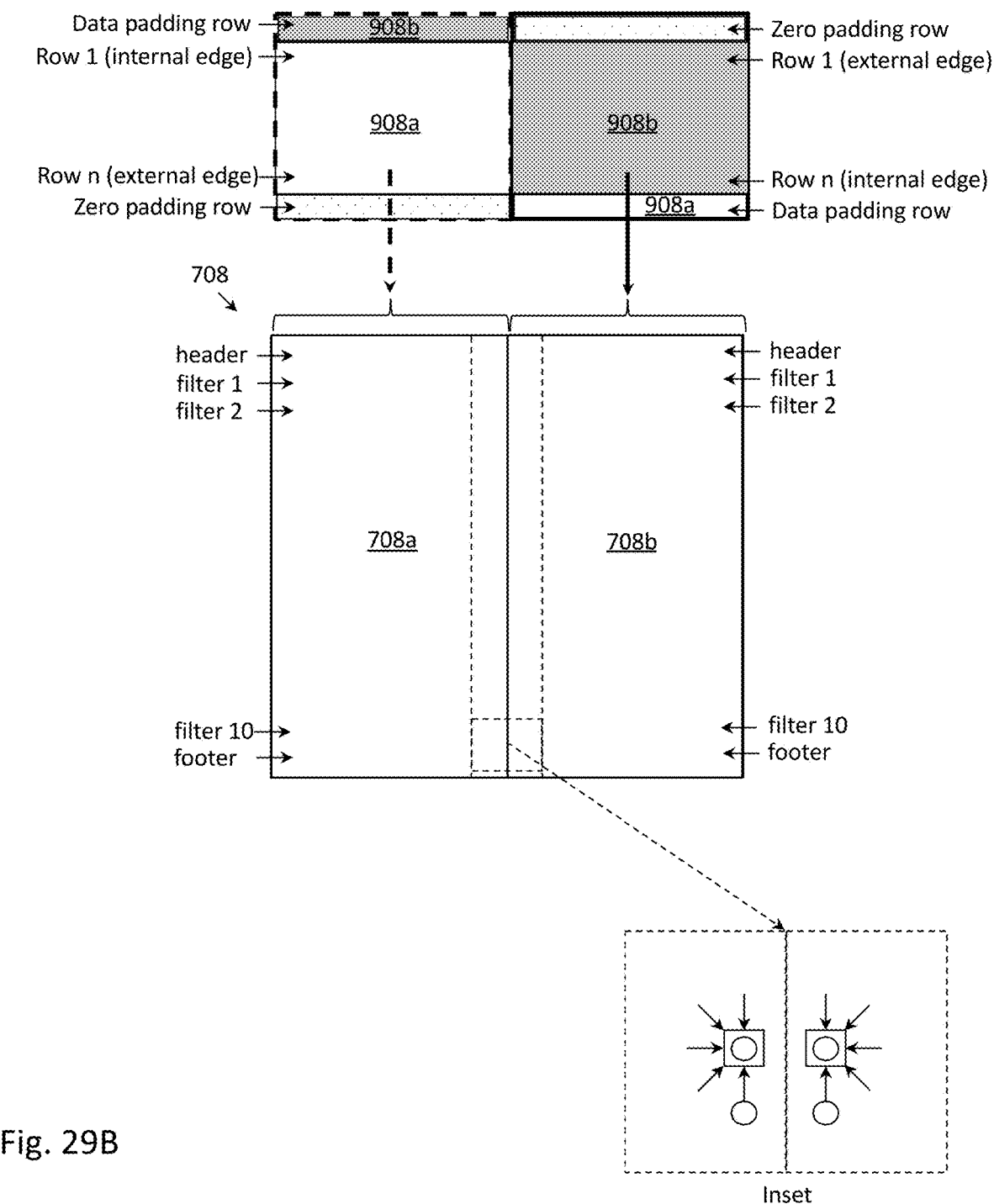

For simplicity, this first example describing the hardware architecture of a convolutional engine will handle the case in which the number of columns of an input channel is equal to the number of columns of the convolver array. In FIG. 9B, the number of columns of input channel 702a is assumed to equal the number of columns of the convolver array. For instance, input channel 702a may be a ten by four matrix of data values. FIGS. 27A-27C describe how to handle the scenario in which the number of columns of an input channel is greater than the number of columns of the convolver array. FIGS. 28, 29A and 29B describe two schemes for handling the case in which the number of columns of an input channel is less than the number of columns of the convolver array.

Figure 30:
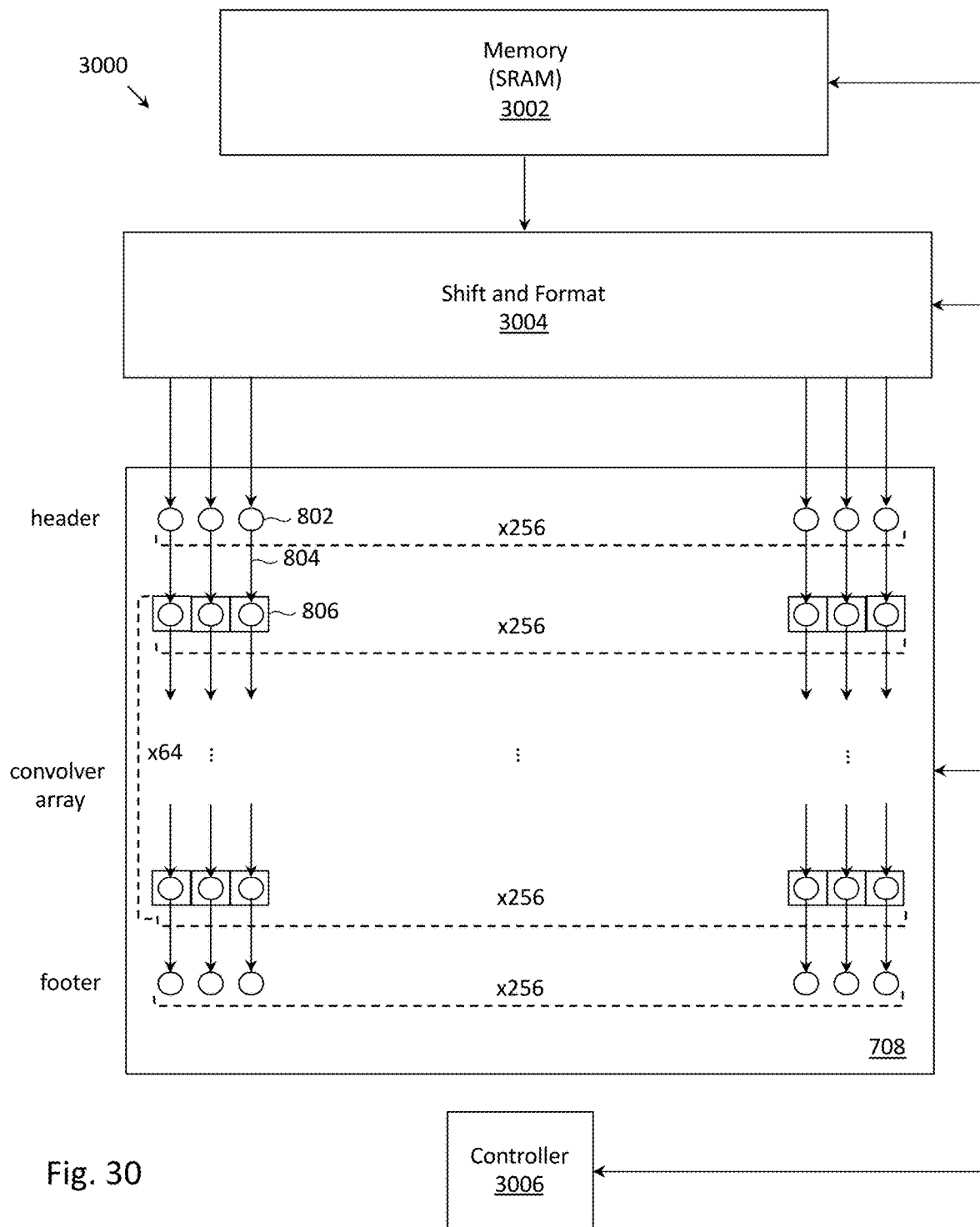
FIG. 30 depicts a convolutional engine as one component of a larger system, in accordance with one embodiment of the invention.

Typically, due to memory constraints of each convolver unit, convolutional engine 708 can only compute the convolution operation for a certain number of contiguous rows of the data values before the output needs to be saved (copied to a memory location separate from the convolver units—see memory 3002 in FIG. 30). Once the output is saved, the convolutional engine 708 can continue onto the next set of contiguous rows. In particular, if each convolver unit is constructed with n accumulators, convolutional engine 708 can compute the output of n contiguous input rows (plus two padding rows explained below). For simplicity of explanation, n contiguous input rows will be called a "horizontal stripe" of data. In the simplified example of FIG. 9B, there are two horizontal stripes 902a, 902b (while it is understood that in practice there could be any number of horizontal stripes). Due to the memory constraint of the convolver units, the convolutional engine 708 may process the horizontal stripes serially. In the example of FIG. 9B, horizontal stripe 902a is processed first, followed by horizontal stripe 902b.

For reasons that will be more apparent below, the loading of a leading row (i.e., first row of a horizontal stripe to be loaded) that is an external edge may be preceded by the loading of a zero padding row (as in row n of horizontal stripe 902a); the loading of a trailing row (i.e., last row of a horizontal stripe to be loaded) that is an external edge may be followed by the loading of a zero padding row (as in row 1 of horizontal stripe 902b); the loading of a leading row that is an internal edge may be preceded by the loading of a data padding row (as in row n of horizontal stripe 902b); and the loading of a trailing row that is an internal edge may be followed by the loading of a data padding row (as in row 1 of horizontal stripe 902a). If not already apparent, an "external edge" refers to a leading or trailing row of a horizontal stripe that forms an external boundary of an input channel, whereas an internal edge refers to a leading or trailing row of a horizontal stripe that is not part of an external boundary of an input channel. The reason for the zero or data padding row is tied to the 3×3 filter requiring data from a row above and a row below the row of interest to compute the convolution output. For a 5×5 filter, two padding rows (for the top row of a stripe) and two padding rows (for the bottom row of a stripe) or a total of four padding rows would have been needed.

In the particular example of FIG. 9B, the n+2 rows within the bolded and dashed rectangle are loaded into convolutional engine 708. The n+2 rows include a zero padding row, n rows of horizontal stripe 902a and a data padding row (equivalent to row n of horizontal stripe 902b).

Figure 9C:
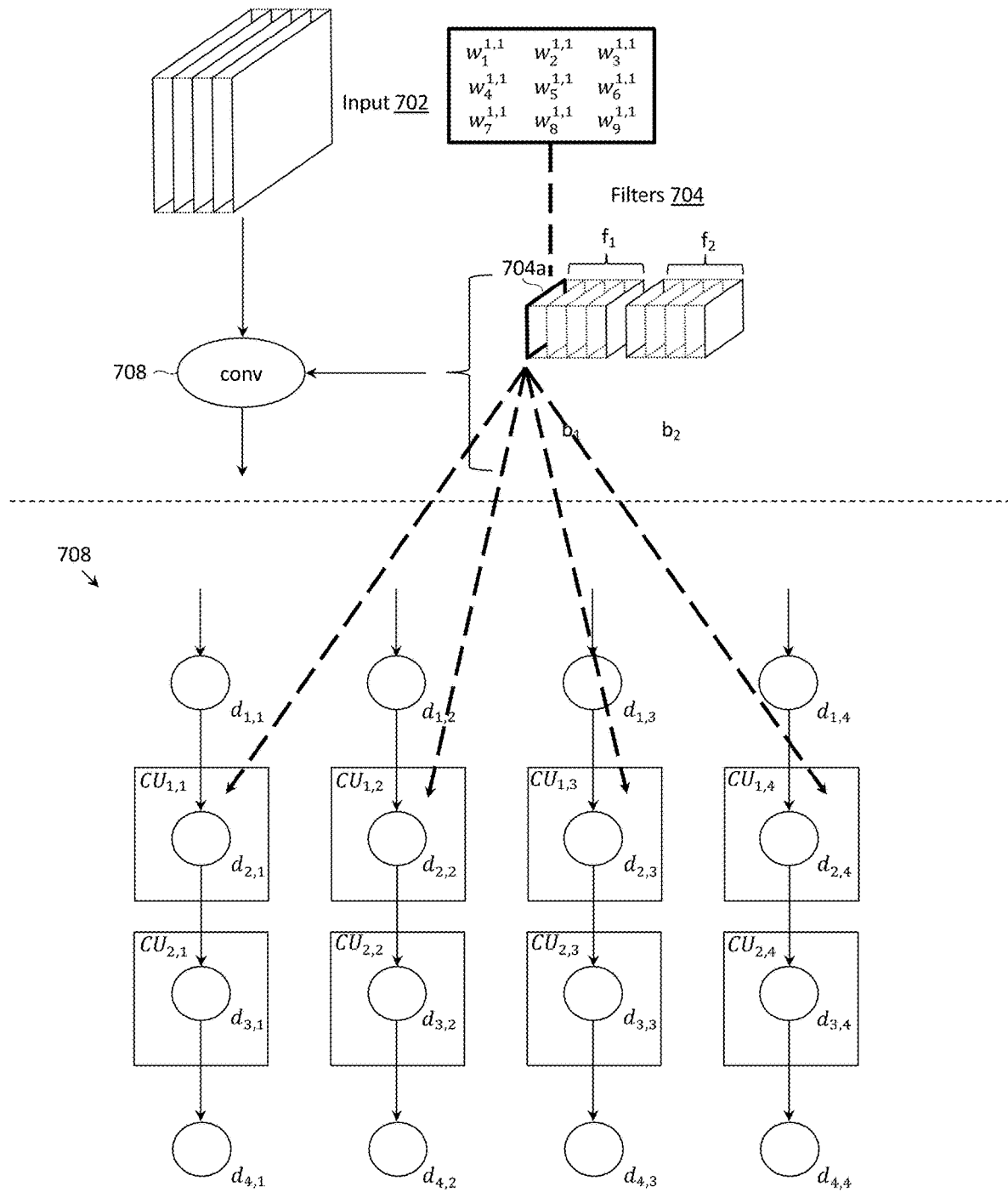
FIGS. 9C-9D depict the loading of filter weights into the convolutional engine, in accordance with one embodiment of the invention.
Figure 9D:
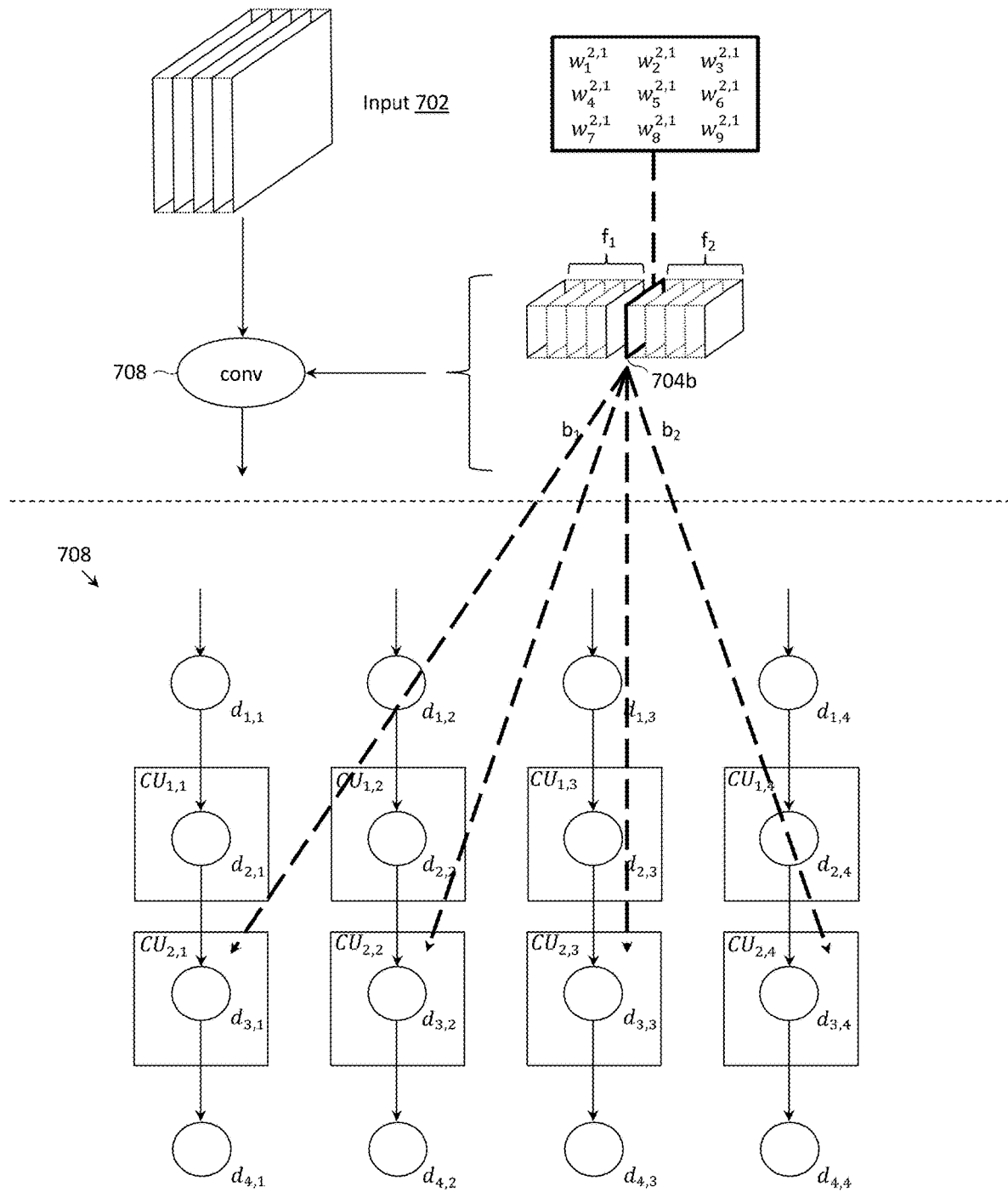

FIGS. 9C-9D depict the loading of filter weights to convolutional engine 708, in accordance with one embodiment of the invention. More specifically, FIG. 9C depicts the loading of the nine weights of kernel 704a into each of the convolver units of the first row of the convolver array (i.e., $CU_{1,1}$, $CU_{1,2}$, $CU_{1,3}$ and $CU_{1,4}$), and FIG. 9D depicts the loading of the nine weights of kernel 704b into each of the convolver units of the second row of the convolver array (i.e., $CU_{2,1}$, $CU_{2,2}$, $CU_{2,3}$ and $CU_{2,4}$). Kernel 704a is the first kernel of filter $f_1$, and each of its weights is labeled with the superscript "1,1", which is shorthand for (filter $f_1$, kernel 1). Kernel 704b is the first kernel of filter $f_2$, and each of its weights is labeled with the superscript "2,1", which is shorthand for (filter $f_2$, kernel 1).

Figure 10A:
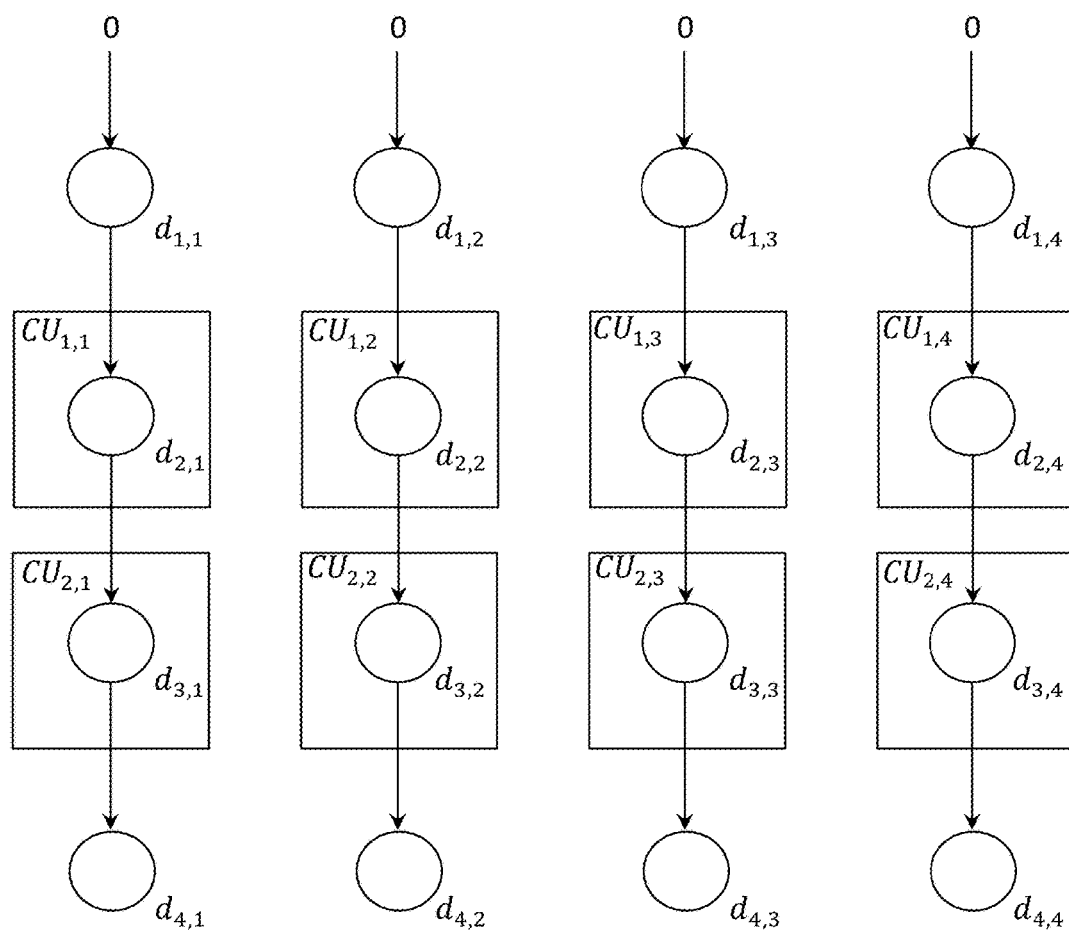
FIGS. 10A-10B depict the loading of a zero padding row into the 2-D shift register, in accordance with one embodiment of the invention.
Figure 10B:
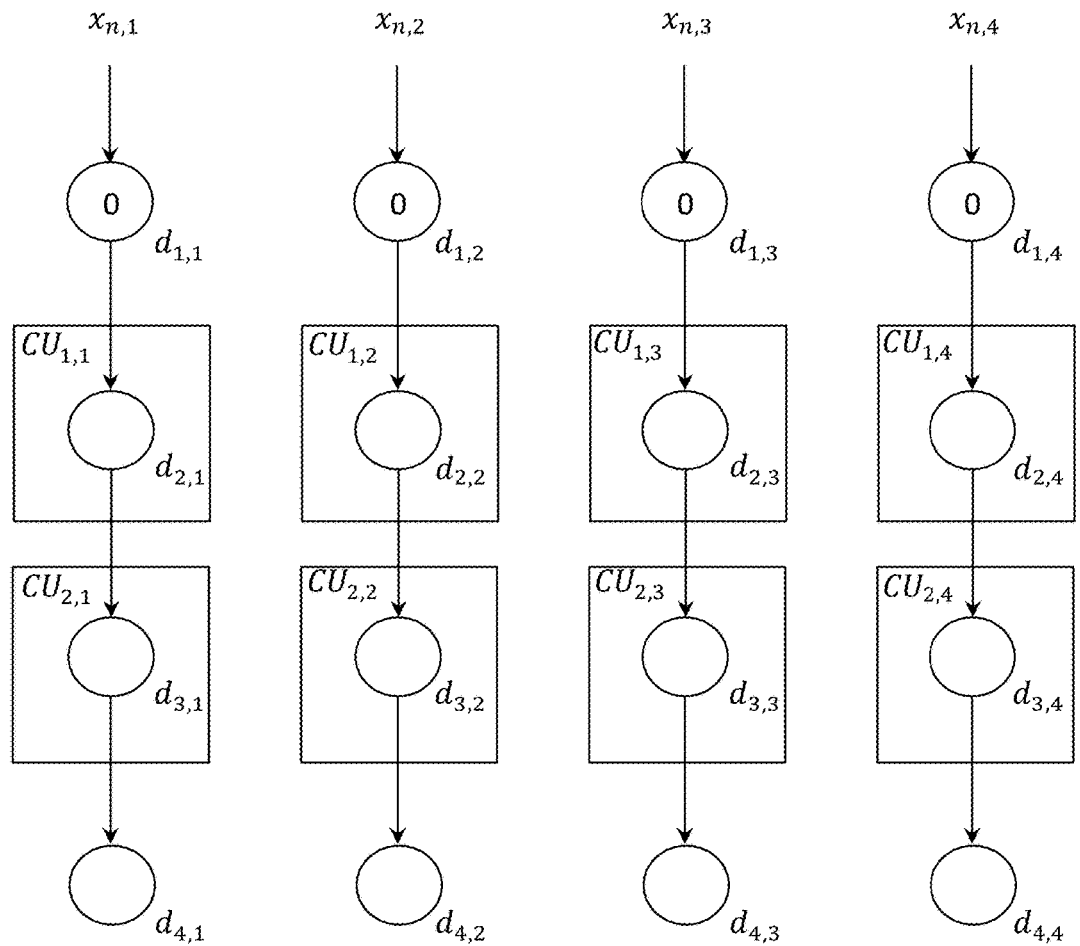
Figure 10C:
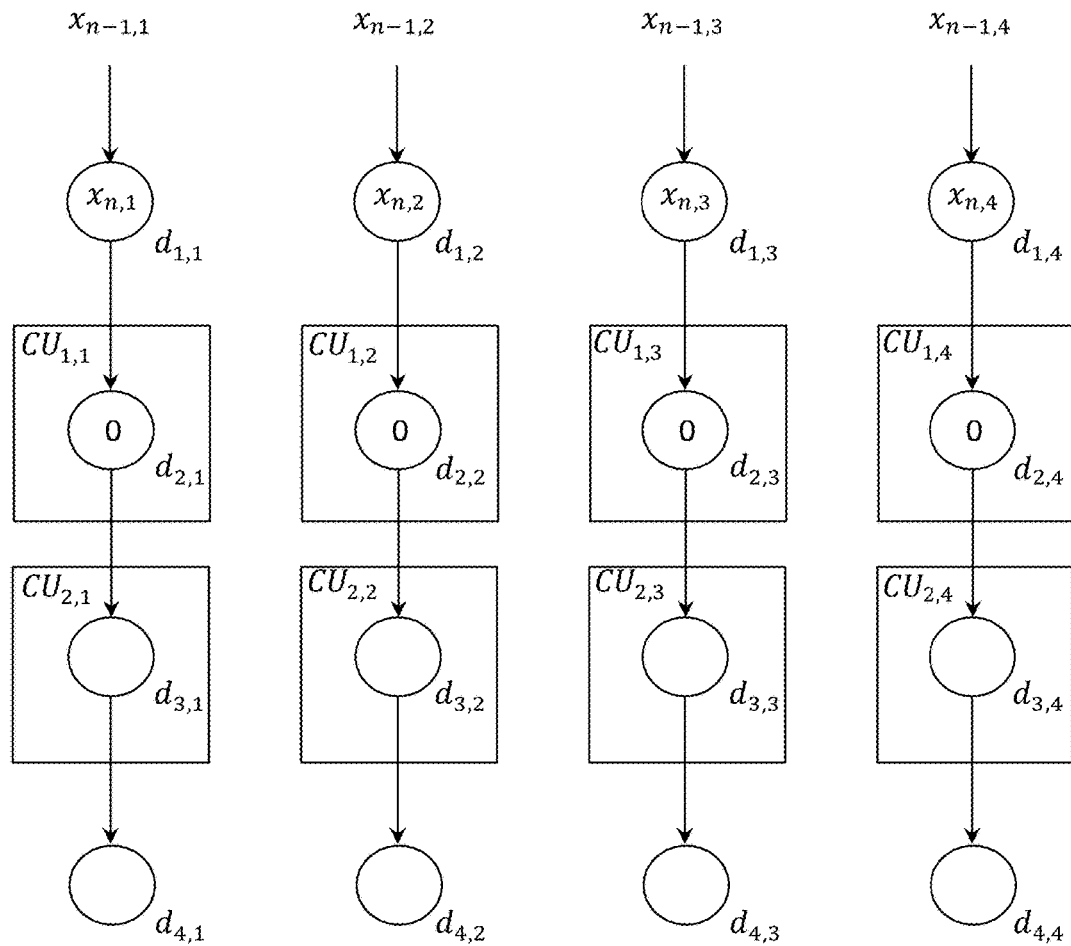
Figure 10D:
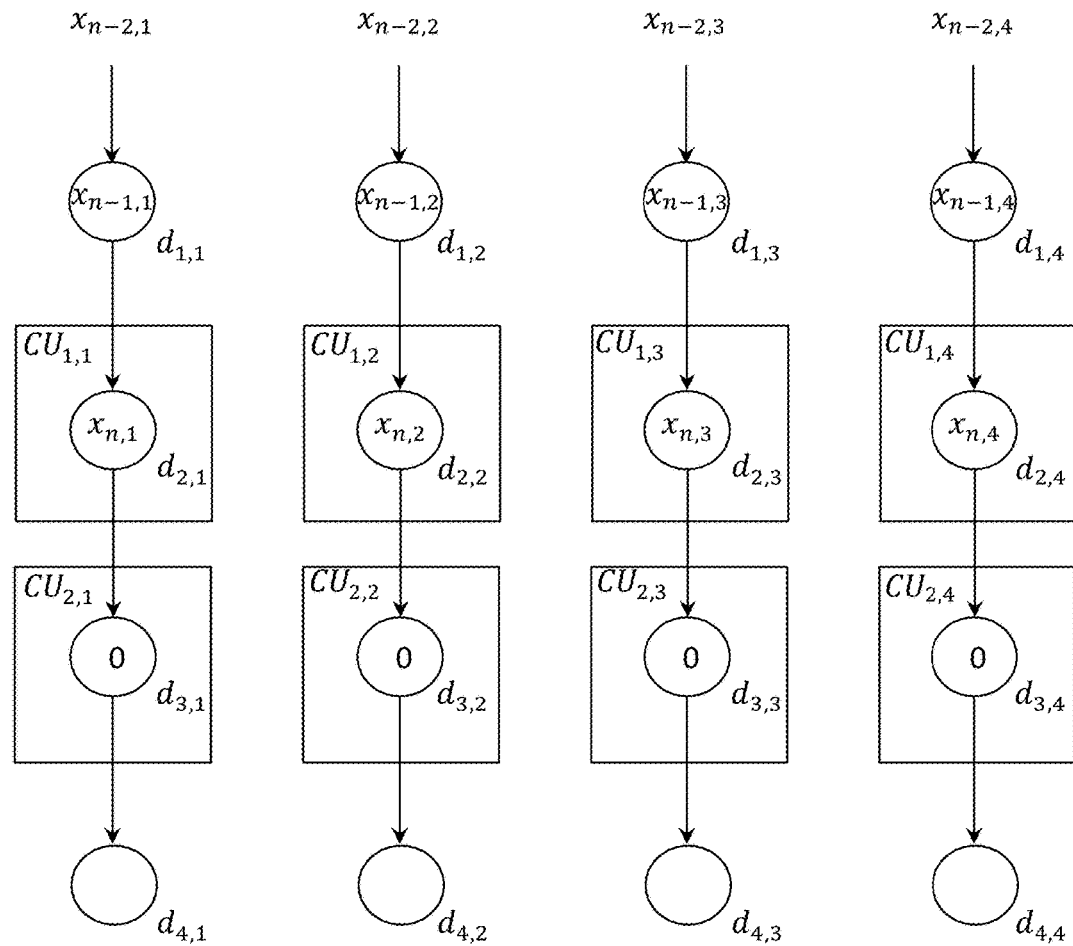

FIGS. 10A-10B depict the loading of a row of zero values into the 2-D shift register. FIGS. 10B-10D depict a row-by-row loading of data values from the first input channel 702a into the 2-D shift register and a row-to-row shifting of the data values through the 2-D shift register. Data values $x_{n,1}$, $x_{n,2}$, $x_{n,3}$ and $x_{n,4}$ may represent values from row n of horizontal stripe 902a of input channel 702a. Data values $x_{n-1,1}$, $x_{n-1,2}$, $x_{n-1,3}$ and $x_{n-1,4}$ may represent values from row n−1 of horizontal stripe 902a of input channel 702a. Data values $x_{n-2,1}$, $x_{n-2,2}$, $x_{n-2,3}$ and $x_{n-2,4}$ may represent values from row n−2 of horizontal stripe 902a of input channel 702a.

Upon row n of horizontal stripe 902a being loaded into the second row of data storage elements (i.e., $d_{2,1}$, $d_{2,2}$, $d_{2,3}$ and $d_{2,4}$), the first row of convolver units (i.e., $CU_{1,1}$, $CU_{1,2}$, $CU_{1,3}$ and $CU_{1,4}$) corresponding to the second row of data storage elements may be activated. By "corresponding", it is meant that there is a logical correspondence between convolver unit $CU_{1,1}$ and data storage element $d_{2,1}$, convolver unit $CU_{1,2}$ and data storage element $d_{2,2}$, and so on. The correspondences between the data storage element and convolver units are shown in the figures by the data storage element being drawn within the corresponding convolver unit. In a more typical embodiment with a high number of convolver units, most of the convolver units will receive data values from its corresponding data storage element and eight spatial neighbors (i.e., data storage element neighbors) of the corresponding data storage element. Such relationship is more difficult to appreciate from the example convolutional engine of FIG. 11A in which there is a small number of convolver units.

Figure 11A:
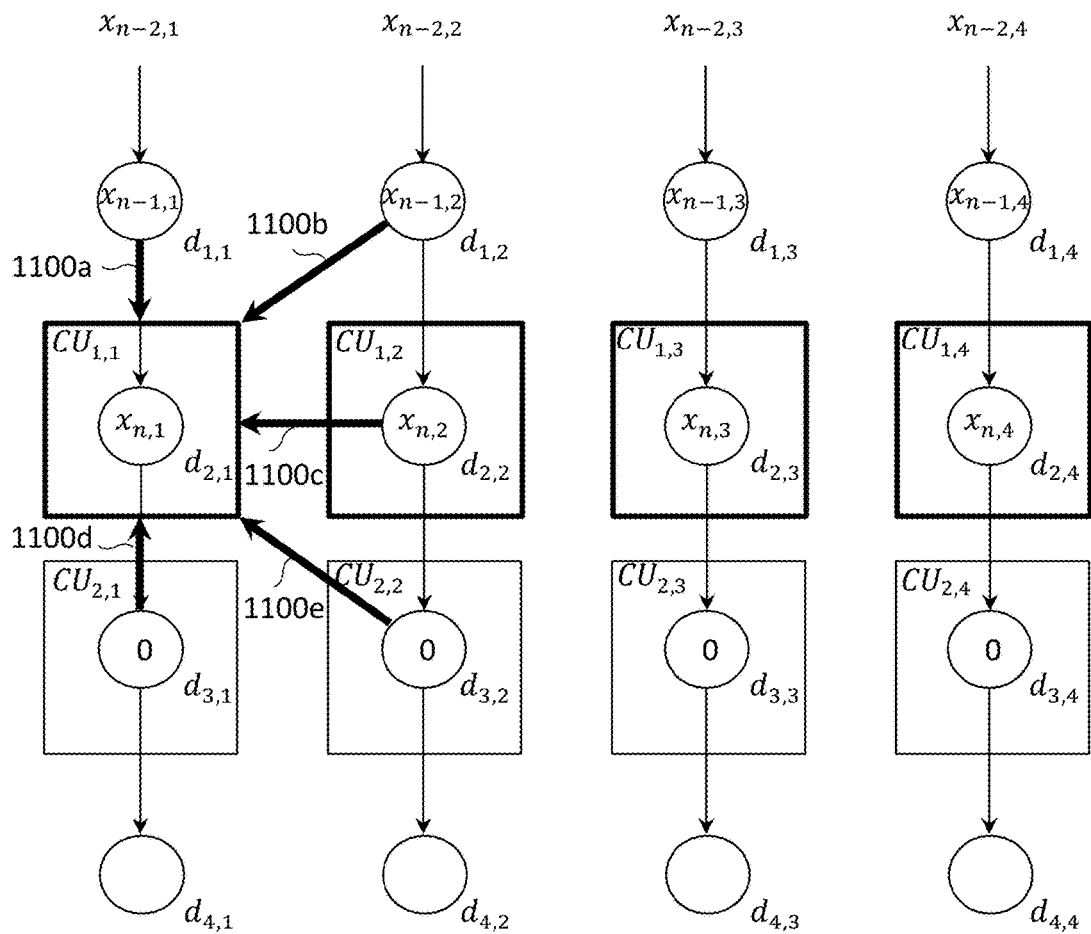
FIGS. 11A and 11B describe the processing of two convolver units for the spatial orientation of the data values depicted in FIG. 10D, in accordance with one embodiment of the invention.
Figure 11A:
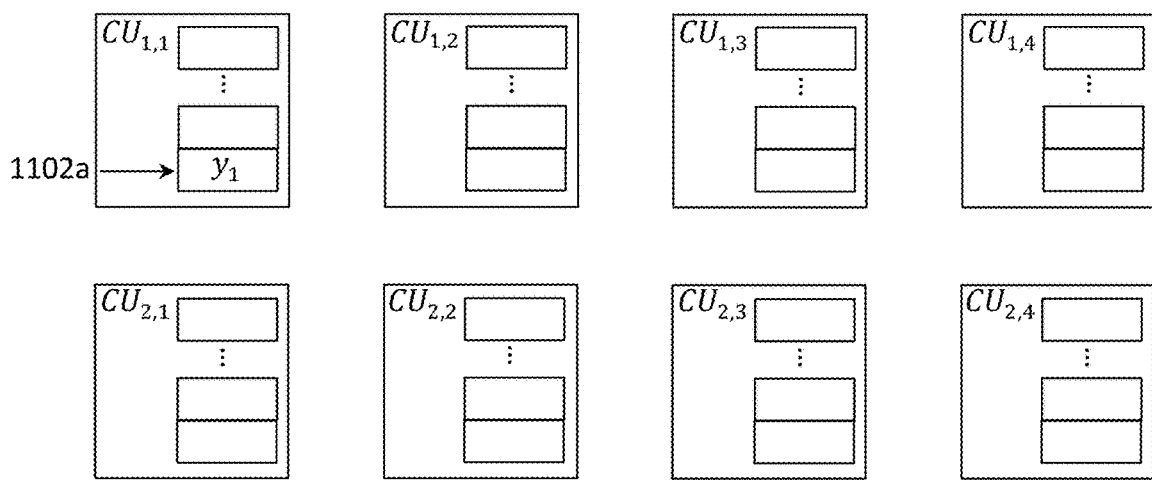

Active convolver units are drawn in FIG. 11A in bolded lines while non-active convolver units are drawn in FIG. 11A using non-bolded lines. In one embodiment, "active" means that a convolver unit is powered on, whereas "non-active" means that a convolver unit is powered off to save power. A controller (depicted as controller 2202 in FIG. 22 and controller 3006 in FIG. 30, but not depicted in other figures for conciseness of presentation) may be responsible for powering on and off convolver units. The controller may power on a row of convolver units once the data from row n of a horizontal stripe has been loaded into the data storage elements corresponding to the row of convolver units. The controller may power off a row of convolver units once data from row 1 of a horizontal stripe has been transferred out of the data storage elements corresponding to the row of convolver units.

Figure 11B:
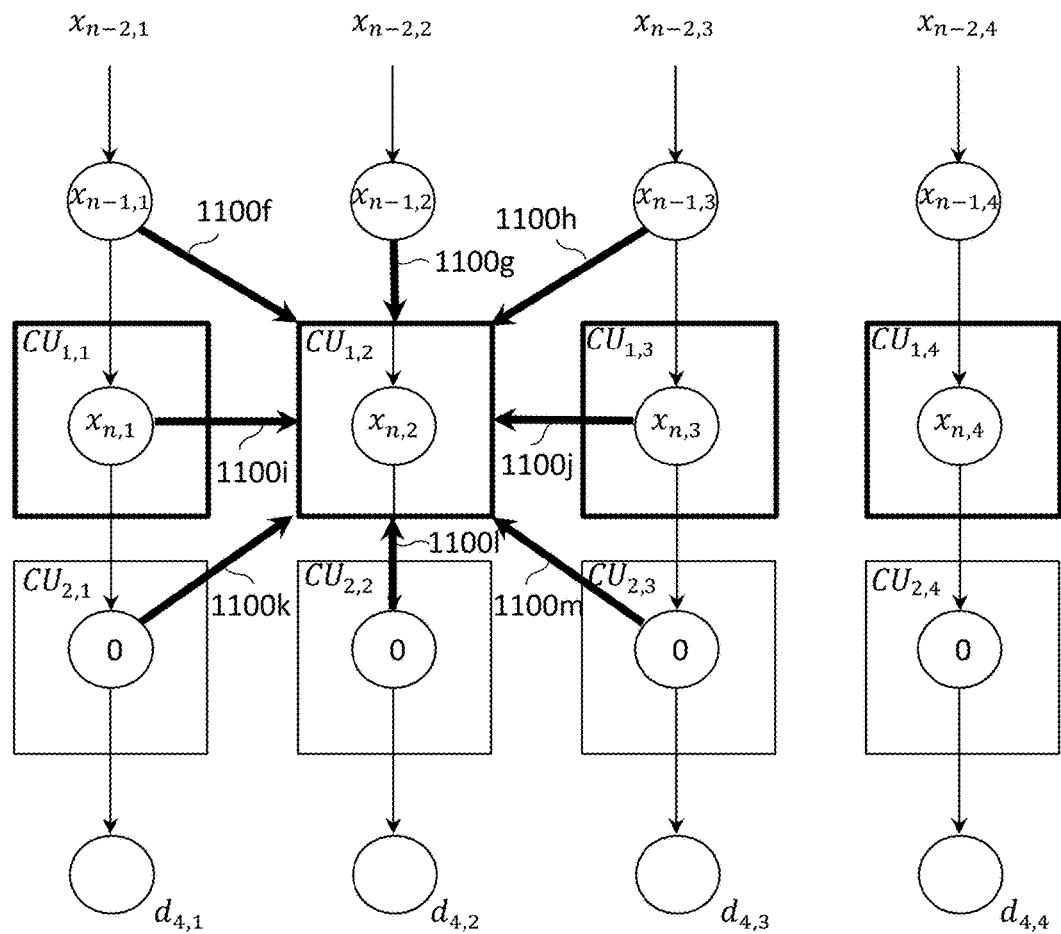
Figure 11B:
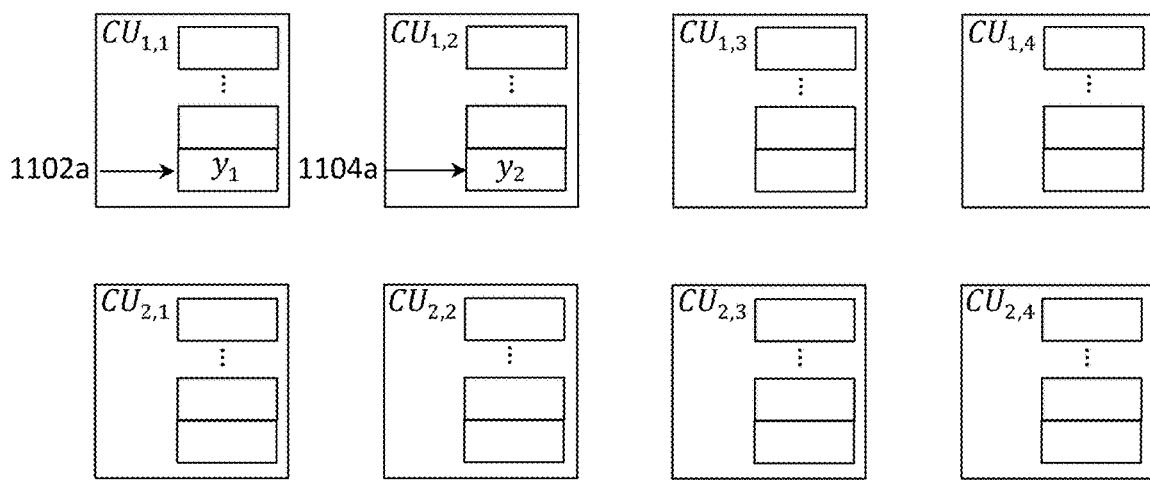

FIGS. 11A and 11B describe the processing of two out of the four active convolver units for the spatial orientation of the data values depicted in FIG. 10D. While the processing of the two convolver units is described in two separate figures, it is understood that such processing typically occurs in parallel (i.e., at the same time) in order to increase the number of computations per clock cycle.

As depicted in FIG. 11A, convolver unit $CU_{1,1}$ (typical for convolver units located on the left and right edges of the convolver array) receives data and/or zero values from five neighboring data storage elements and one data value from the data storage element corresponding to convolver unit $CU_{1,1}$. More specifically, convolver unit $CU_{1,1}$ receives:

data value $x_{n-1,1}$ from data storage element $d_{1,1}$ via electrical connection 1100a, data value $x_{n-1,2}$ from data storage element $d_{1,2}$ via electrical connection 1100b, data value $x_{n,1}$ from data storage element $d_{2,1}$ via an electrical connection (not depicted)

data value $x_{n,2}$ from data storage element $d_{2,2}$ via electrical connection 1100c, the zero value from data storage element $d_{3,1}$ via electrical connection 1100d, and the zero value from data storage element $d_{3,2}$ via electrical connection 1100e.

For clarity of depiction, electrical interconnections (i.e., bolded arrows) between convolver units and data storage elements are only depicted when needed for discussion.

Once the data and/or zero values have been received, convolver unit $CU_{1,1}$ may compute the partial sum $y_1$ defined by $w_2^{1,1}x_{n-1,1}+w_{n-1,1}^{1,1}x_{n-1,2}+w_5^{1,1}x_{n,1}+w_6^{1,1}x_{n,2}$ (where $w_2^{1,1}$, $w_3^{1,1}$, $w_5^{1,1}$, and $w_6^{1,1}$ are four of the nine weights of kernel 704a depicted in FIG. 9C) and store the partial sum $y_1$ in accumulator 1102a of convolver unit $CU_{1,1}$. Accumulator 1102a may be part of a linear array of n accumulators, where n is the number of rows within horizontal stripe 902a. Accumulator 1102a may be configured to store the partial sums corresponding to row n of a horizontal stripe; accumulator 1102b may be configured to store the partial sums corresponding to row n−1 of a horizontal stripe; and so on. For clarity of explanation, it is noted that the bottom instance of convolver unit $CU_{1,1}$ and the top instance of convolver unit $CU_{1,1}$ are one and the same convolver unit, with the bottom instance showing additional details of the top instance.

As depicted in FIG. 11B, convolver unit $CU_{1,2}$ receives data and/or zero values from eight neighboring data storage elements and one data value from the data storage element corresponding to convolver unit $CU_{1,2}$. More specifically, convolver unit $CU_{1,2}$ receives:

data value $x_{n-1,1}$ from data storage element $d_{1,1}$ via electrical connection 1100f, data value $x_{n-1,2}$ from data storage element $d_{1,2}$ via electrical connection 1100g, data value $x_{n-1,3}$ from data storage element $d_{1,3}$ via electrical connection 1100h, data value $x_{n,1}$ from data storage element $d_{2,1}$ via an electrical connection 1100i, data value $x_{n,2}$ from data storage element $d_{2,2}$ via electrical connection (not depicted), data value $x_{n,3}$ from data storage element $d_{2,3}$ via electrical connection 1100j, the zero value from data storage element $d_{3,1}$ via electrical connection 1100k, the zero value from data storage element $d_{3,2}$ via electrical connection 1100l, and the zero value from data storage element $d_{3,3}$ via electrical connection 1100m.

Once the data values have been received, convolver unit $CU_{1,2}$ may compute the partial sum $y_2$ defined by $w_1^{1,1}x_{n-1,1}+w_2^{1,1}x_{n-1,2}+w_3^{1,1}x_{n-1,3}+w_4^{1,1}x_{n,1}+w_5^{1,1}x_{n,2}+w_6^{1,1}x_{n,3}$ (where $w_1^{1,1}$, $w_2^{1,1}$, $w_3^{1,1}$, $w_4^{1,1}$, $w_5^{1,1}$ and $w_6^{1,1}$ are six of the nine weights of kernel 704a depicted in FIG. 9C) and store the partial sum $y_2$ in accumulator 1104a of convolver unit $CU_{1,2}$.

Figure 11C:
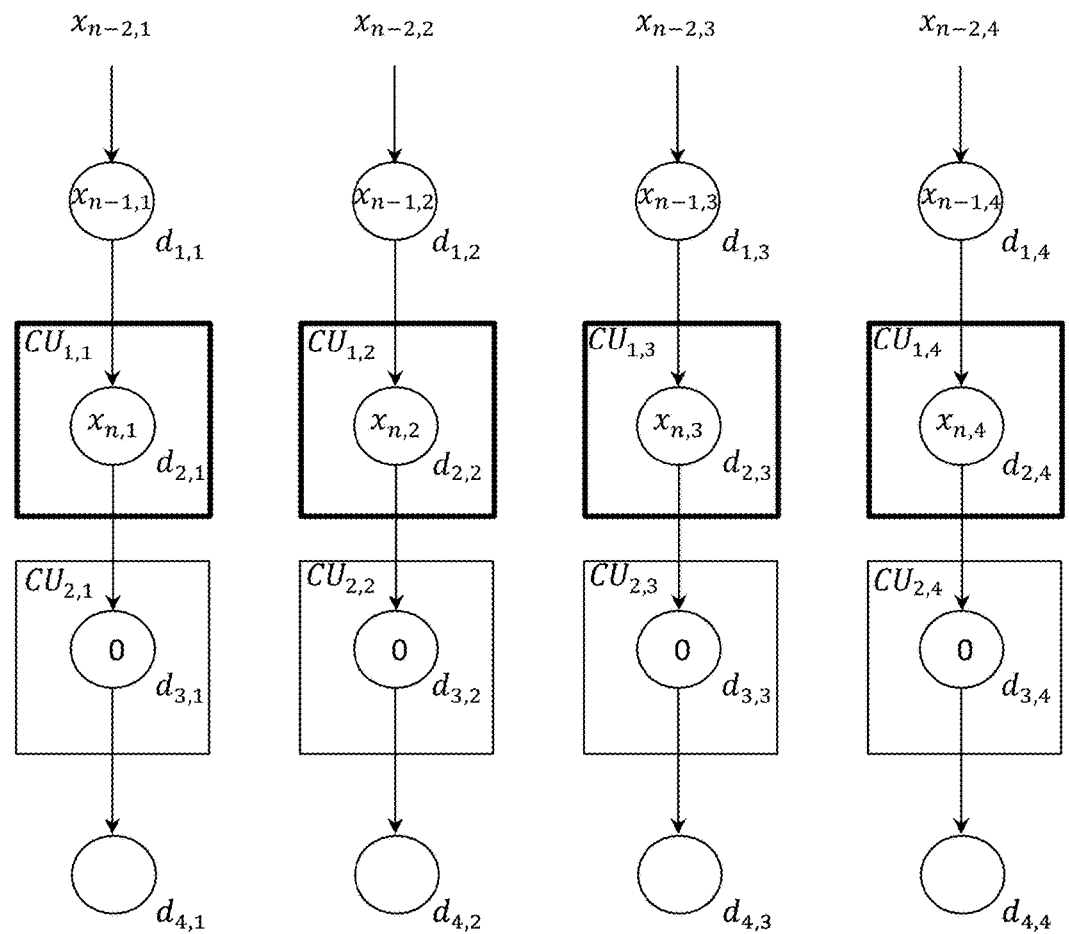
FIG. 11C depicts the resulting partial sums following the processing of all active convolver units for the spatial orientation of the data values depicted in FIG. 10D, in accordance with one embodiment of the invention.
Figure 11C:
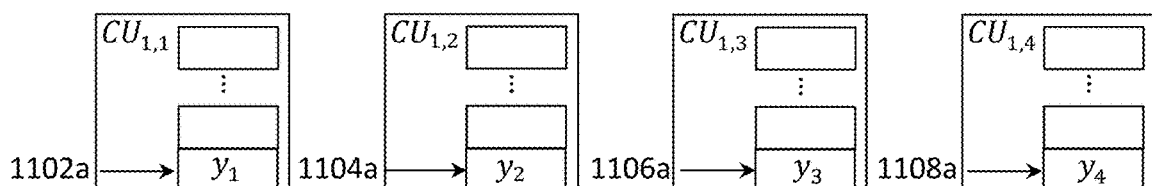
Figure 11C:
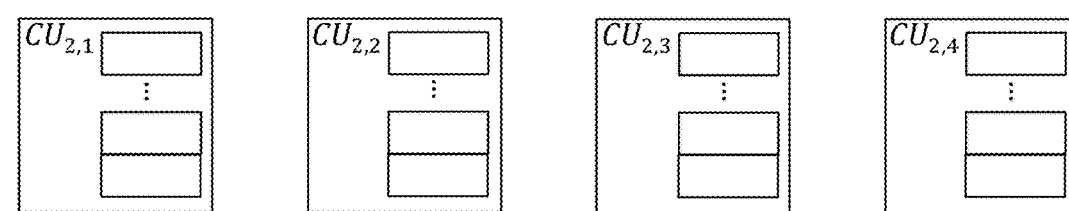

Similar processing is performed by $CU_{1,3}$ and $CU_{1,4}$, so the details of these computations have been omitted for conciseness. At the conclusion of the processing by the four active convolver units for the spatial orientation of data values shown in FIG. 10D, four partial sums are computed and stored in accumulators 1102a, 1104a, 1106a and 1108a, as shown in FIG. 11C.

Figure 12:
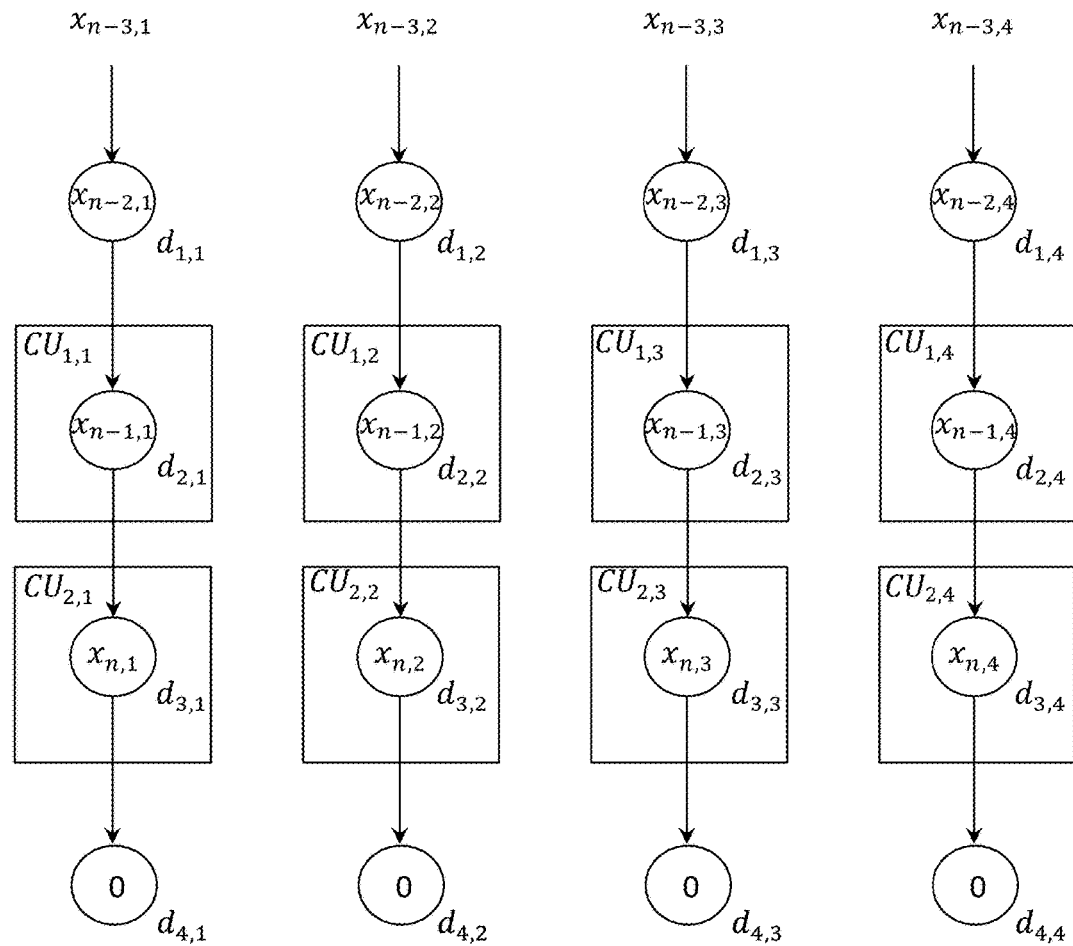
FIG. 12 depicts the data values after they have been shifted down one row of the 2-D shift register, as compared to the spatial orientation of the data values depicted in FIG. 10D.

FIG. 12 depicts the 2-D shift register after the data and/or zero values have been shifted down one row of data storage elements, and data values $x_{n-2,1}$, $x_{n-2,2}$, $x_{n-2,3}$ and $x_{n-2,4}$ from the n−2 row of the horizontal stripe 902a have been loaded into the 2-D shift register. Once row n of horizontal stripe 902a has been loaded into data storage elements $d_{3,1}$, $d_{3,2}$, $d_{3,3}$, and $d_{3,4}$, the corresponding convolver units $CU_{2,1}$, $CU_{2,2}$, $CU_{2,3}$ and $CU_{2,4}$ are activated, in addition to $CU_{1,1}$, $CU_{1,2}$, $CU_{1,3}$ and $CU_{1,4}$ (as shown in FIG. 13A).

FIGS. 13A-13D describe the processing of four of the eight active convolver units, in accordance with one embodiment of the invention. While the processing of the four convolver units is described in four separate figures, it is understood that such processing typically occurs in parallel (i.e., at the same time) in order to increase the number of computations per clock cycle.

Figure 13A:
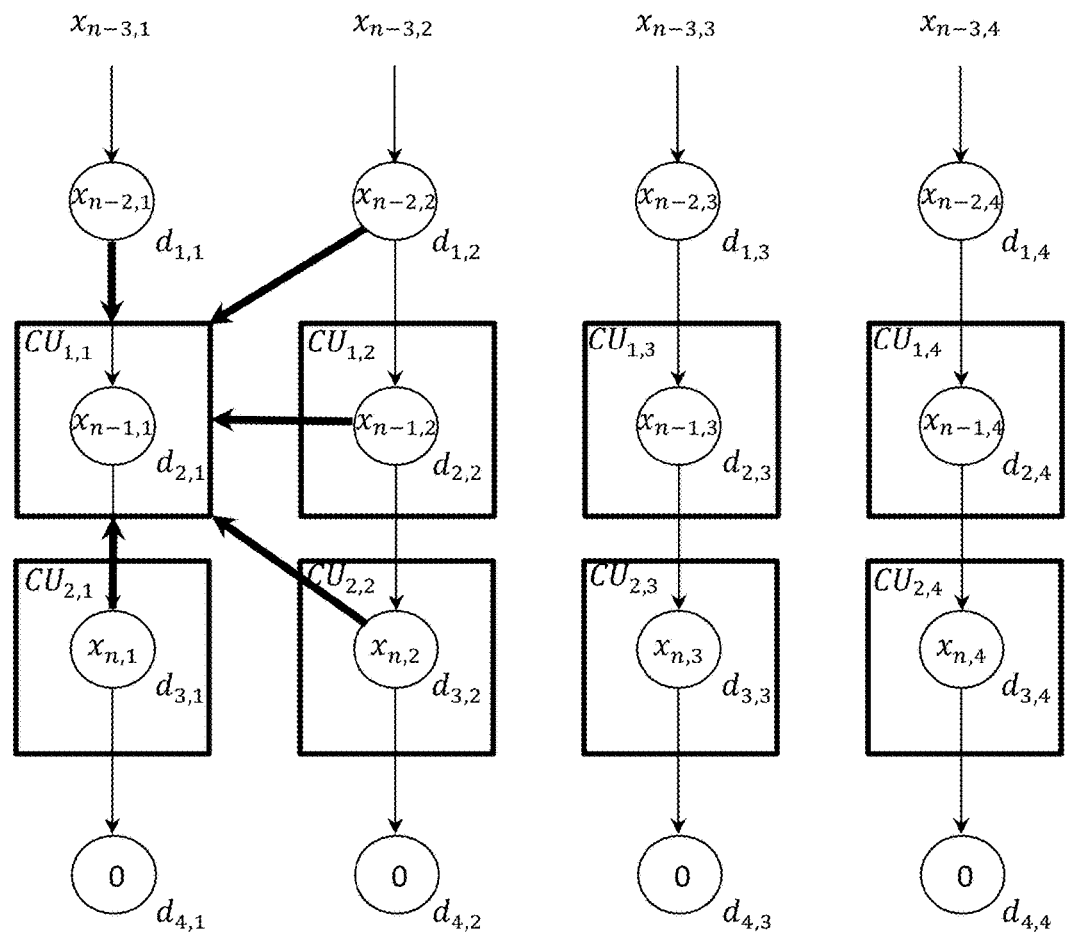
FIGS. 13A-13D describe the processing of four convolver units for the spatial orientation of the data values depicted in FIG. 12, in accordance with one embodiment of the invention.
Figure 13A:
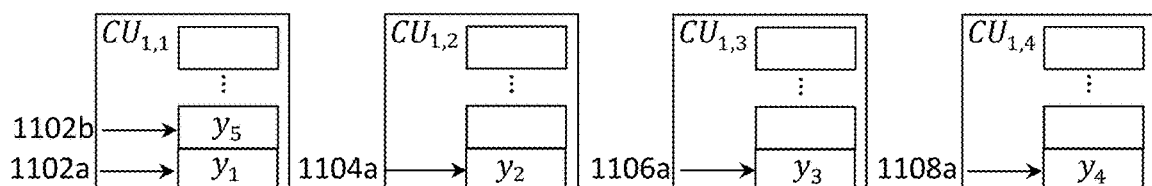
Figure 13A:
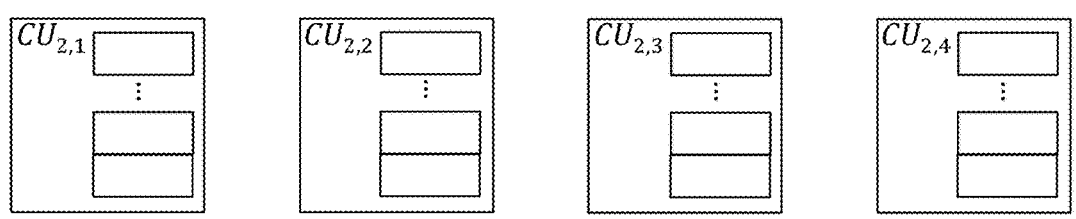

As depicted in FIG. 13A, convolver unit $CU_{1,1}$ may receive data values from the five neighboring data storage elements and the one corresponding data storage element. Convolver unit $CU_{1,1}$ may compute the partial sum $y_5$ defined by $w_2^{1,1}x_{n-2,1}+w_3^{1,1}x_{n-2,2}+w_5^{1,1}x_{n-1,1}+w_6^{1,1}x_{n-1,2}+w_8^{1,1}x_{n,1}+w_9^{1,1}x_{n,2}$ and store the partial sum $y_5$ in accumulator 1102b of convolver unit $CU_{1,1}$.

Figure 13B:
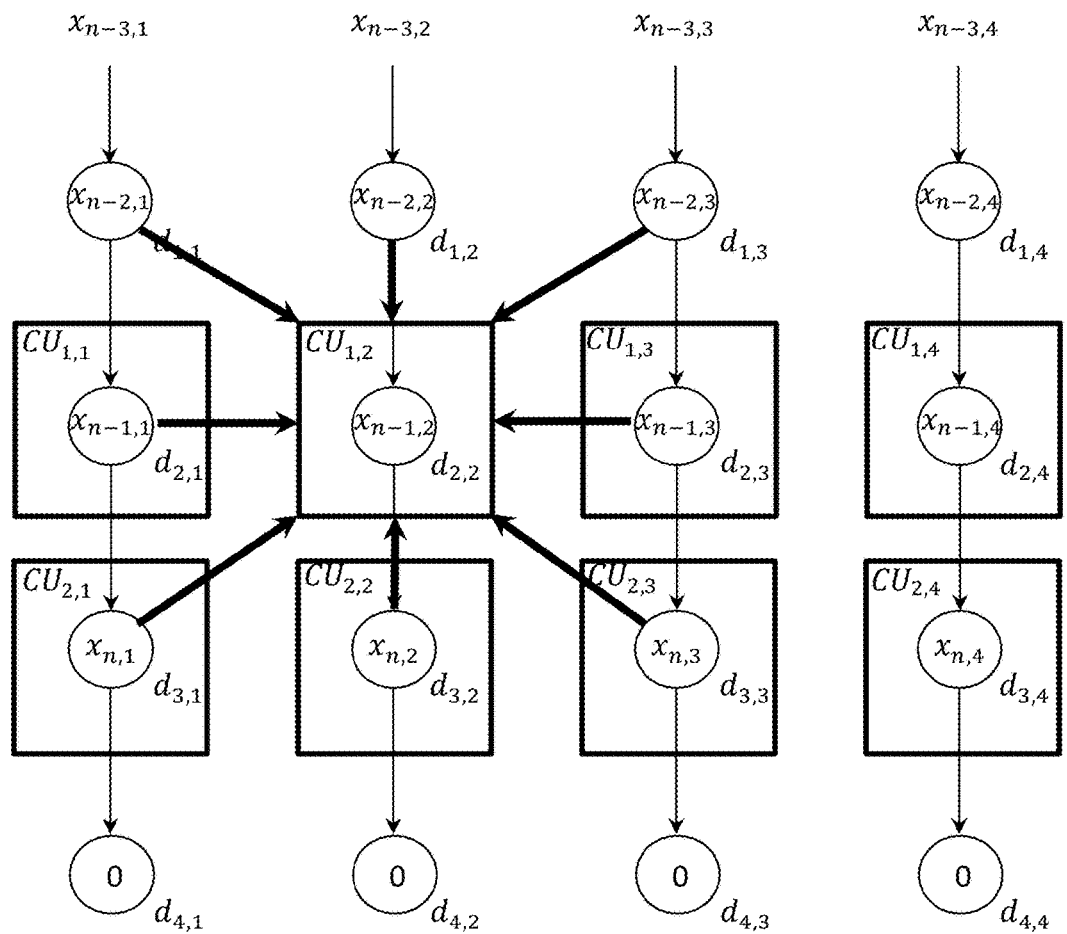
Figure 13B:
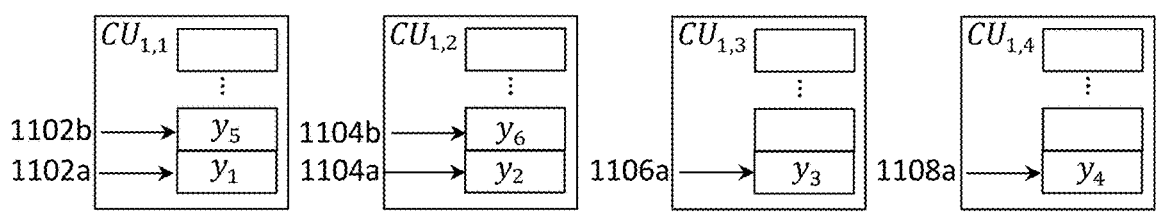
Figure 13B:
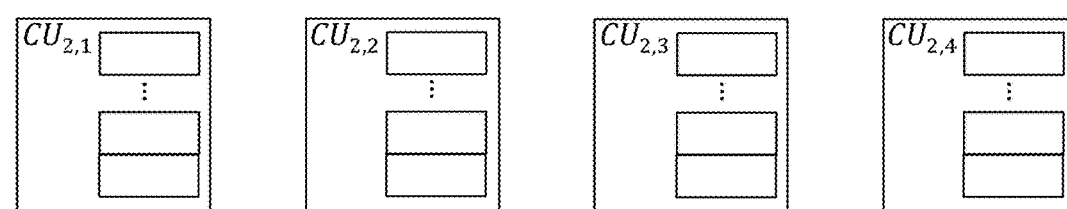

As depicted in FIG. 13B, convolver unit $CU_{1,2}$ may receive data values from the eight neighboring data storage elements and the one corresponding data storage element. Convolver unit $CU_{1,2}$ may compute the partial sum $y_6$ defined by $w_1^{1,1}x_{n-2,1}+w_2^{1,1}x_{n-2,2}+w_3^{1,1}x_{n-2,3}+w_4^{1,1}x_{n-1,1}+w_5^{1,1}x_{n-1,2}+w_6^{1,1}x_{n-1,3}+w_7^{1,1}x_{n,1}+w_8^{1,1}x_{n,2}+w_9^{1,1}x_{n,3}$ and store the partial sum $y_6$ in accumulator $1104b$ of convolver unit $CU_{1,2}$.

Figure 13C:
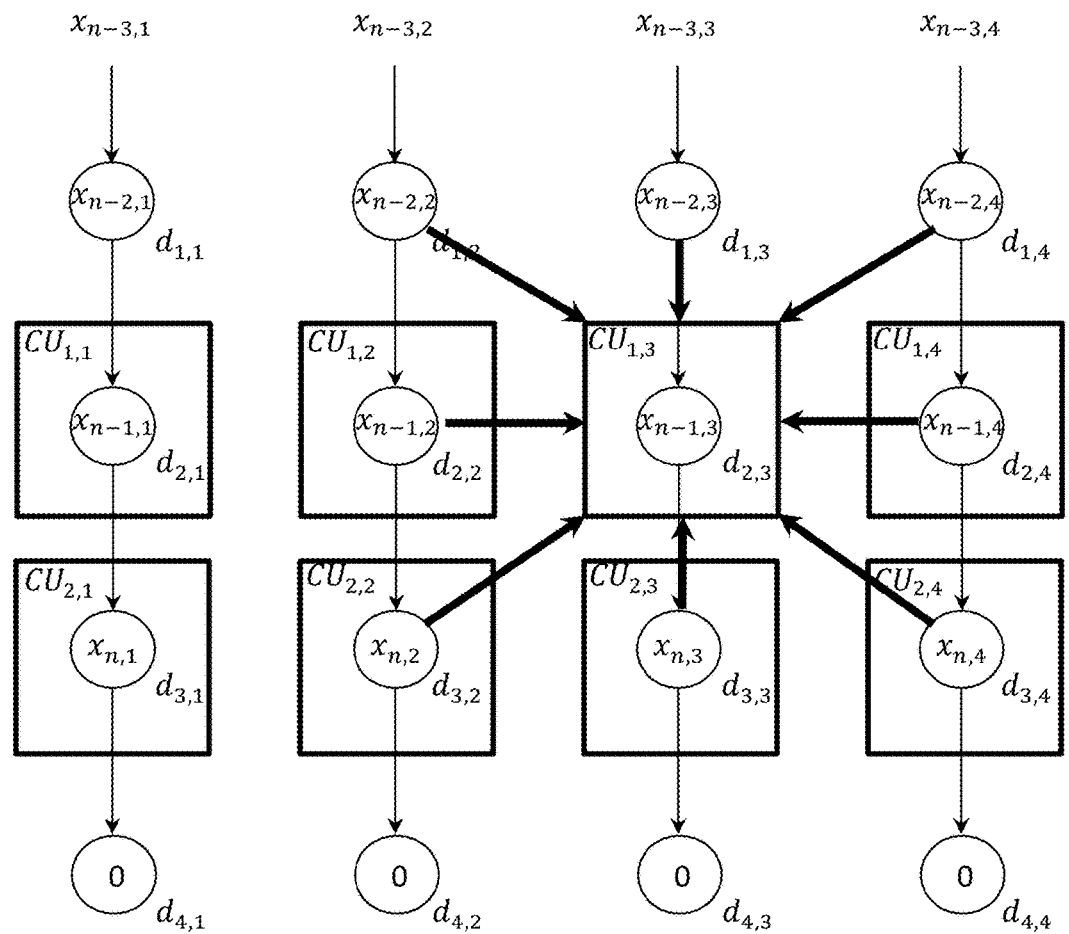
Figure 13C:
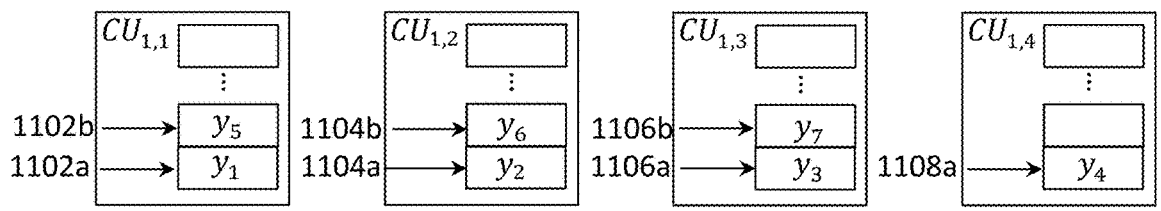
Figure 13C:
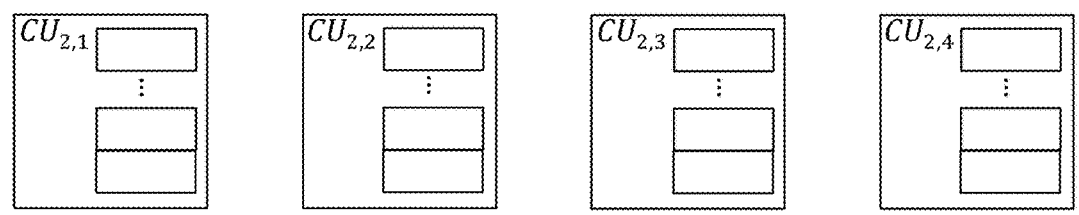

As depicted in FIG. 13C, convolver unit $CU_{1,3}$ may receive data values from the eight neighboring data storage elements and the one corresponding data storage element. Convolver unit $CU_{1,3}$ may compute the partial sum $y_7$ defined by $w_1^{1,1}x_{n-2,2}+w_2^{1,1}x_{n-2,3}+w_1^{1,1}x_{n-2,4}+w_4^{1,1}x_{n-1,2}+w_5^{1,1}x_{n-1,3}+w_6^{1,1}x_{n-1,4}+w_7^{1,1}x_{n,2}+w_8^{1,1}x_{n,3}+w_9^{1,1}x_{n,4}$ and store the partial sum $y_7$ in accumulator $1106b$ of convolver unit $CU_{1,3}$.

Figure 13D:
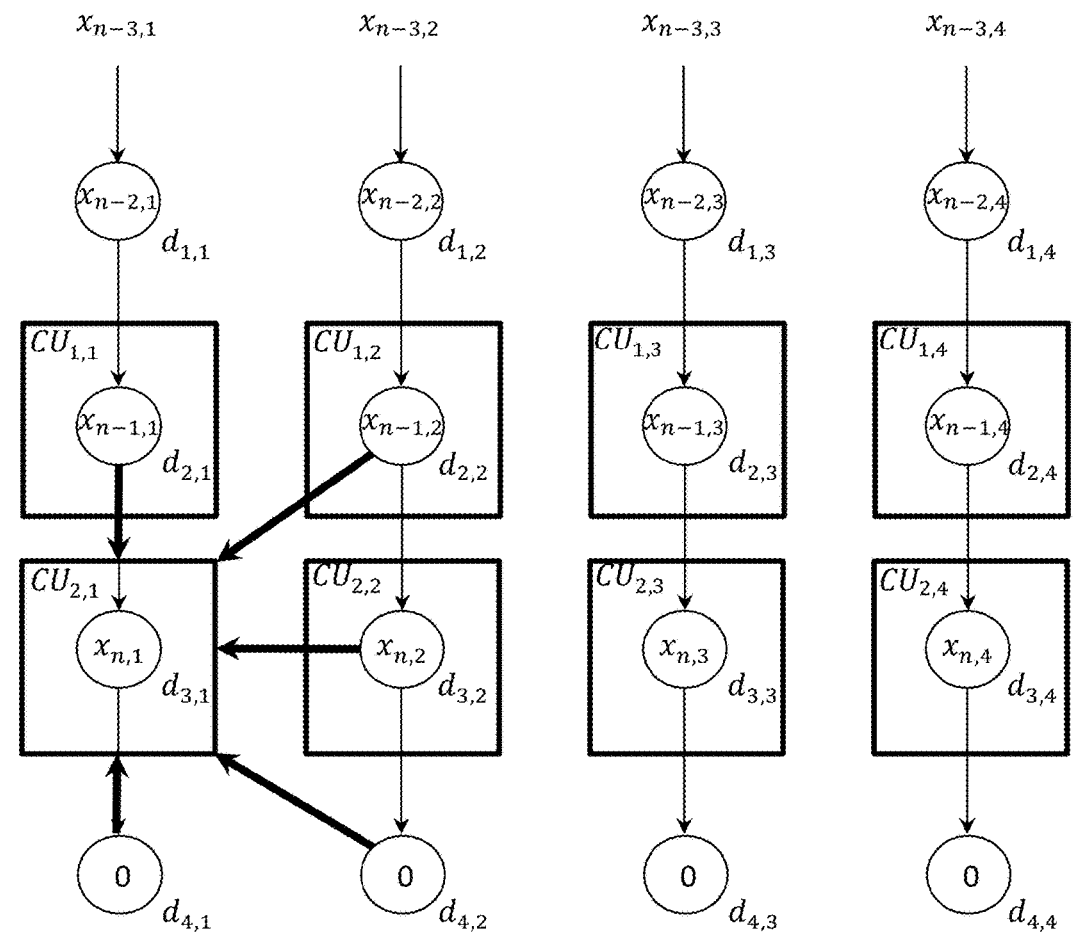
Figure 13D:
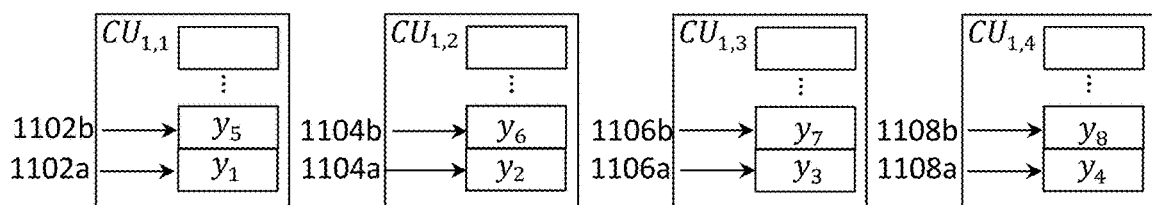
Figure 13D:
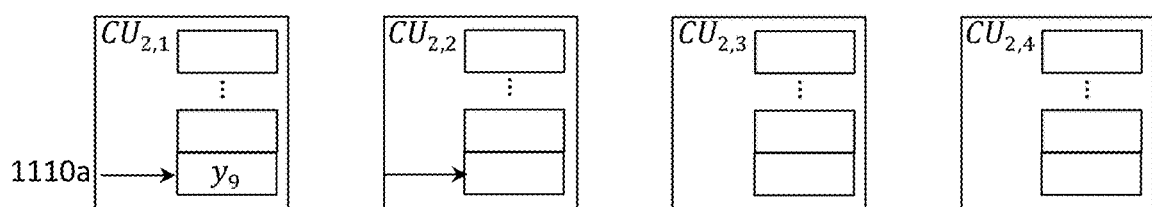

As depicted in FIG. 13D, convolver unit $CU_{2,1}$ may receive data and/or zero values from the five neighboring data storage elements and the one corresponding data storage element. Convolver unit $CU_{2,1}$ may then compute the partial sum $y_9$ defined by $w_2^{2,1}x_{n-1,1}+w_2^{2,1}x_{n-1,2}+w_5^{2,1}x_{n,1}+w_6^{2,1}x_{n,2}$ (where $w_2^{2,1}$, $w_3^{2,1}$, $w_5^{2,1}$, and $w_6^{2,1}$ are four of the nine weights of kernel $704b$ depicted in FIG. 9D) and store the partial sum ye in accumulator $1110a$ of convolver unit $CU_{2,1}$.

Figure 13E:
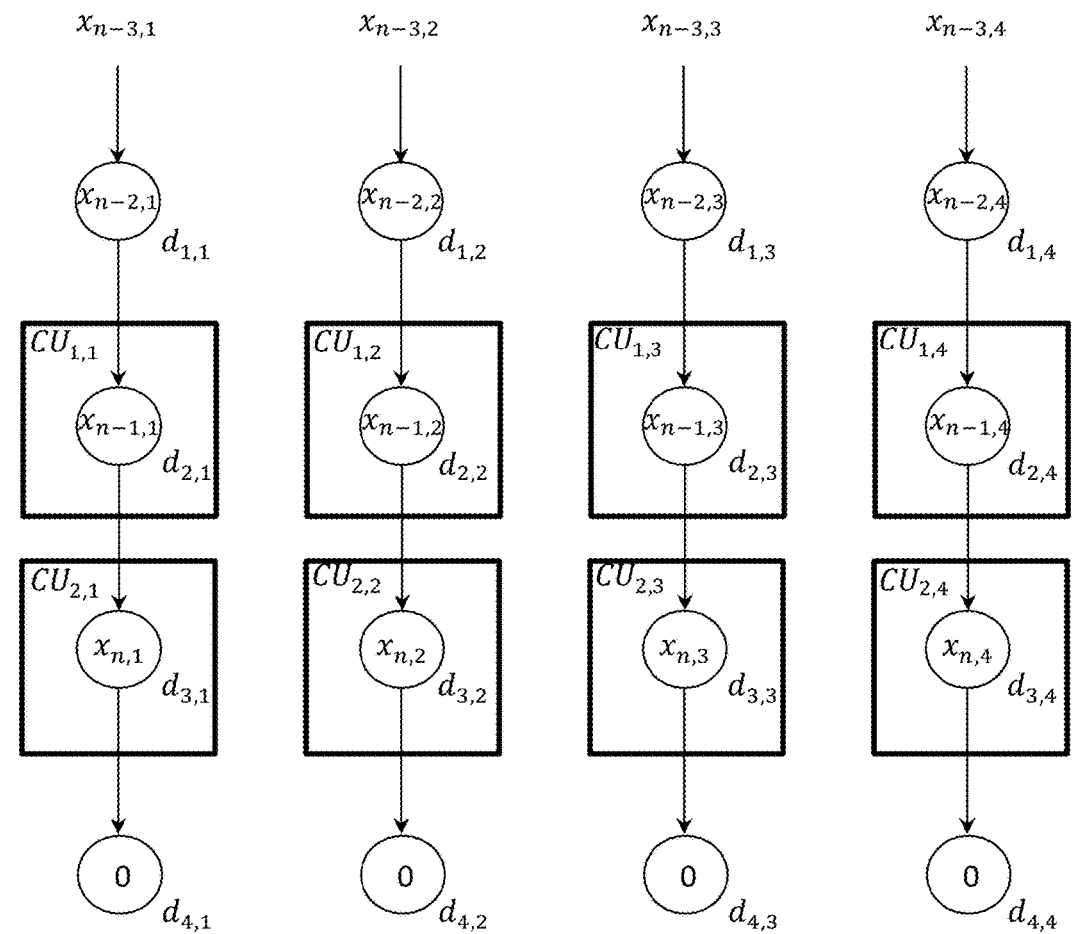
FIG. 13E depicts the resulting partial sums following the processing of all active convolver units for the spatial orientation of the data values depicted in FIG. 12, in accordance with one embodiment of the invention.
Figure 13E:
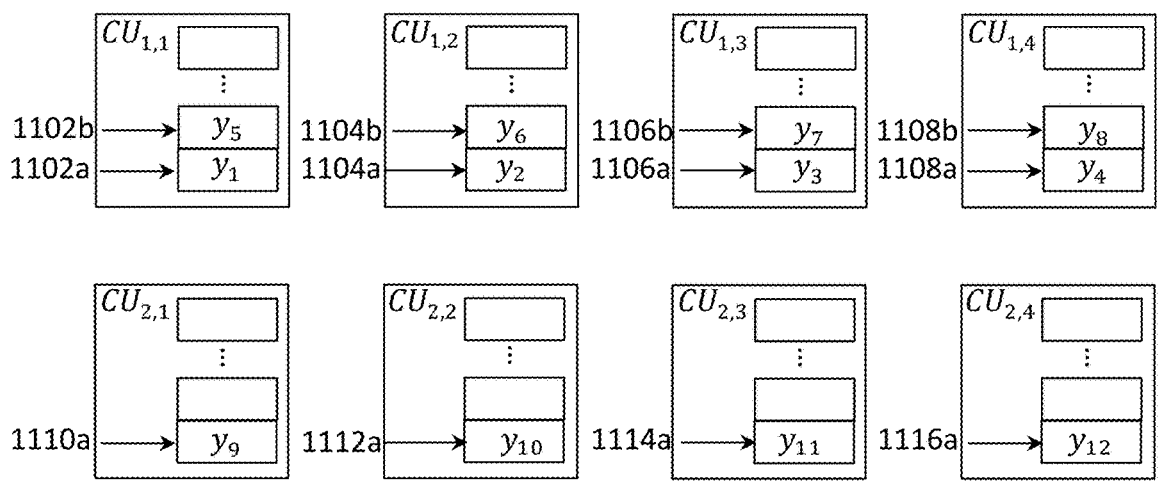

Similar processing may be performed by $CU_{1,4}$, $CU_{2,2}$, $CU_{2,3}$ and $CU_{2,4}$, so the details of these computations have been omitted for conciseness. At the conclusion of the processing by the active convolver units for the spatial orientation of data values shown in FIG. 12, eight (additional) partial sums have been computed and stored in accumulators $1102b$, $1104b$, $1106b$, $1108b$, $1110a$, $1112a$, $1114a$ and $1116a$, as shown in FIG. 13E.

The processing of the 2-D shift register and the plurality of convolutional units continues in a similar fashion until row 1 of horizontal stripe $902a$ has been shifted through the 2-D shift register. At this point, data values of the next input channel and parameters (i.e., weights) of the kernels corresponding to the next input channel may be loaded into the convolutional engine, as depicted in FIGS. 14A-14D.

Figure 14A:
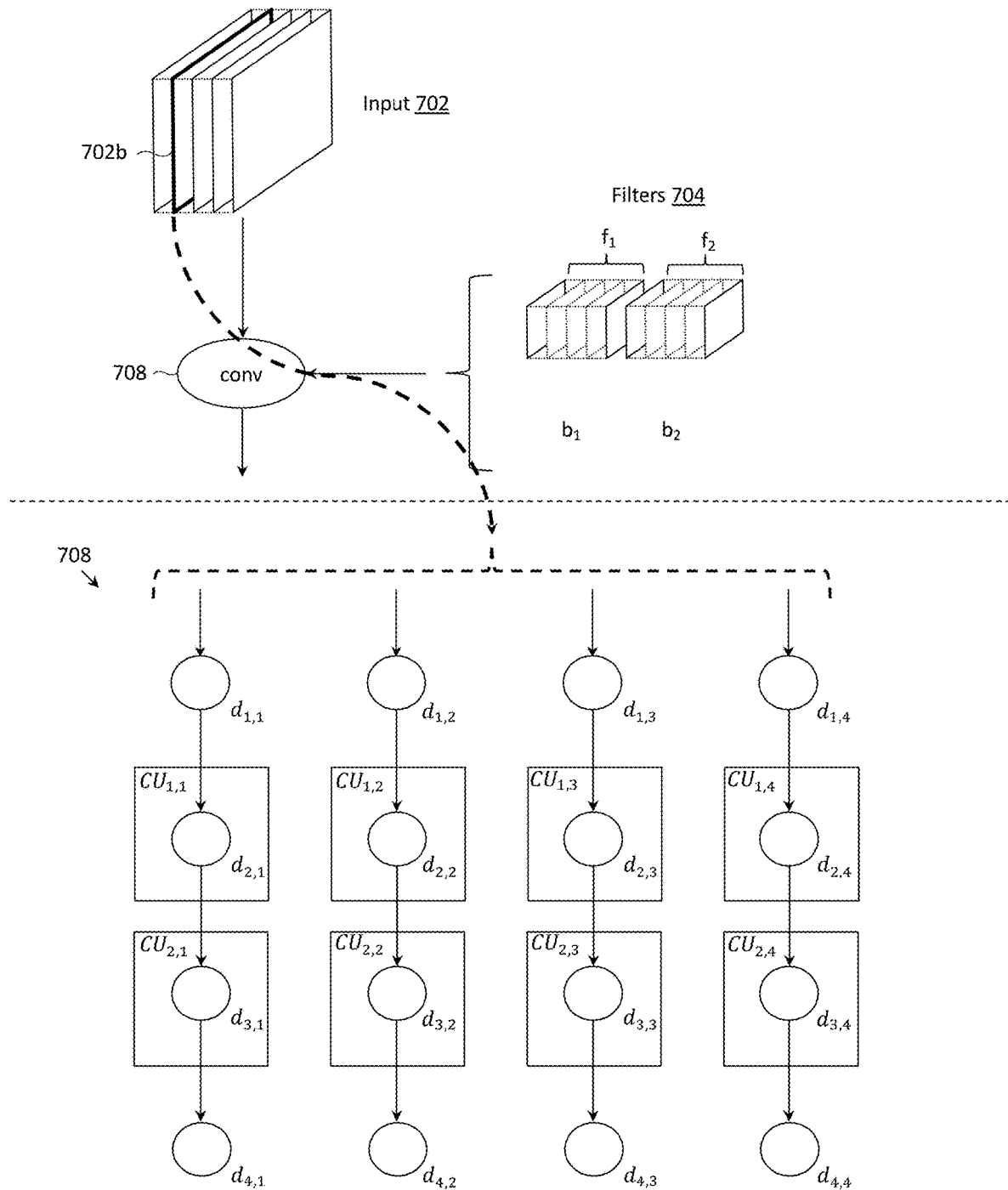
FIGS. 14A-14B depict the loading of data values into the convolutional engine, in accordance with one embodiment of the invention.
Figure 14B:
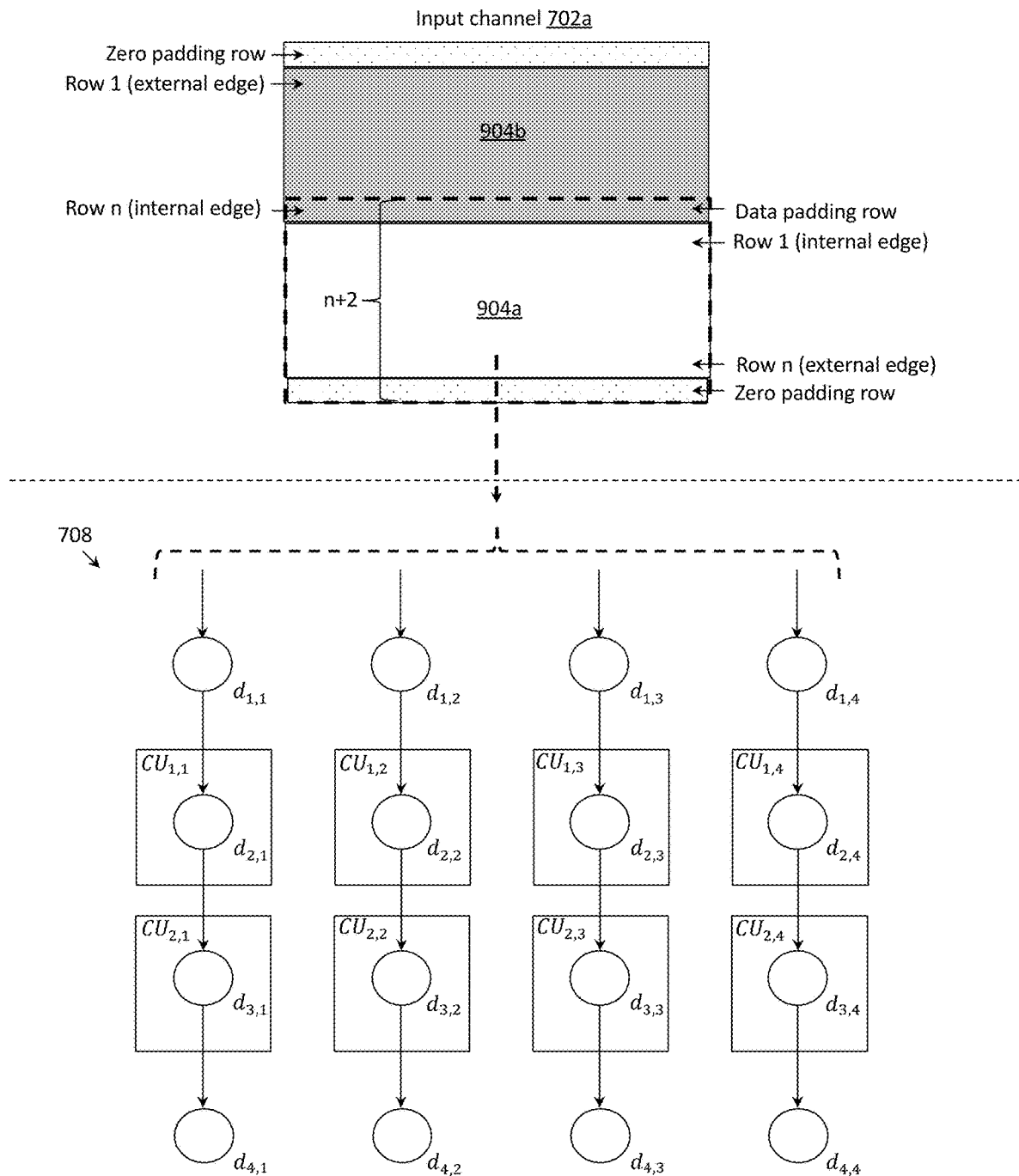

FIG. 14A depicts the loading of data values from the second input channel $702b$ into convolutional engine 708, in accordance with one embodiment of the invention. As depicted in greater detail in FIG. 14B, the second input channel $702b$ may include horizontal stripes $904a$ and $904b$, and horizontal stripe $904a$ may be loaded into convolutional engine 708 in a similar manner as horizontal stripe $902a$ was loaded.

Figure 14C:
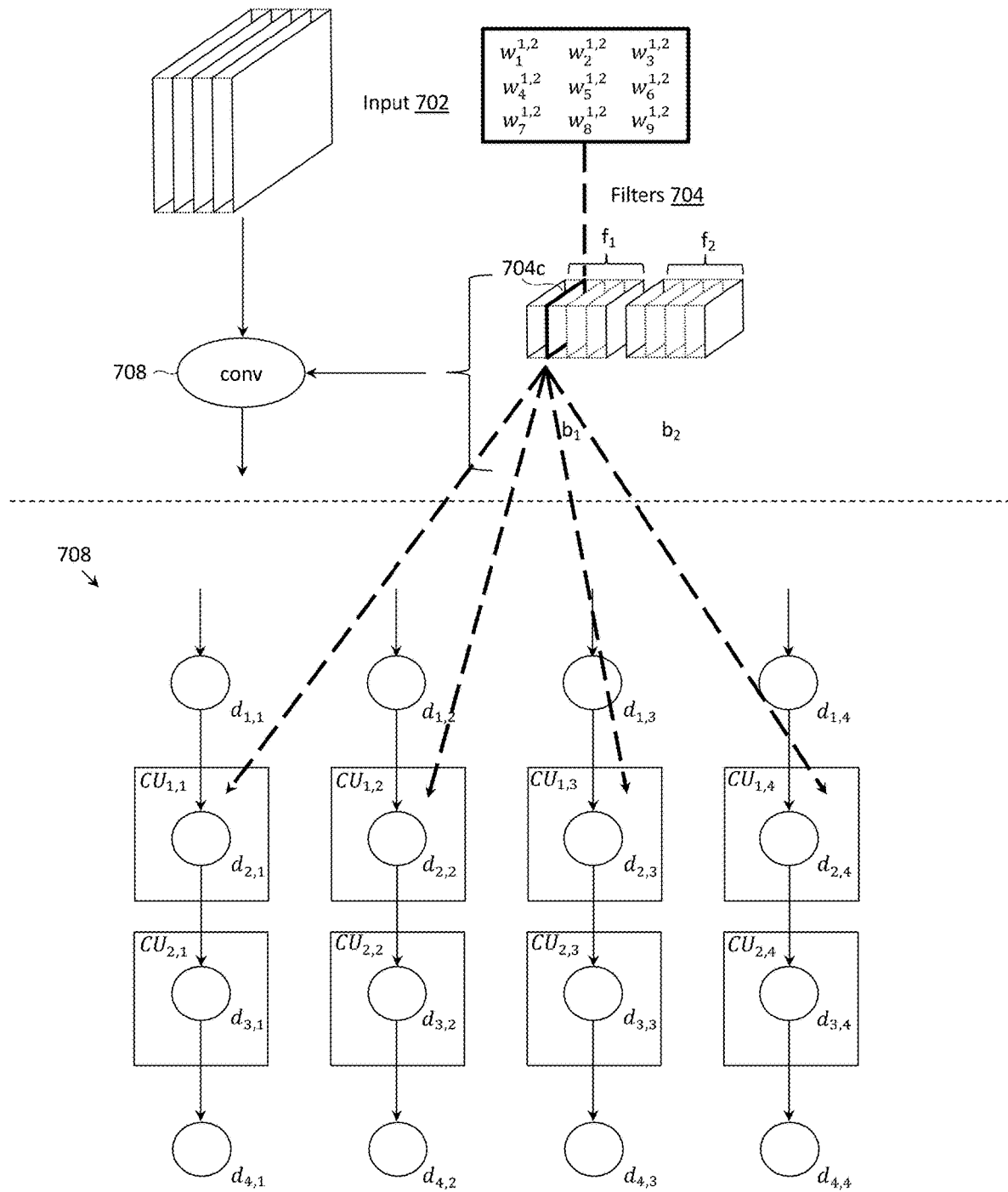
FIGS. 14C-14D depict the loading of filter weights into the convolutional engine, in accordance with one embodiment of the invention.
Figure 14D:
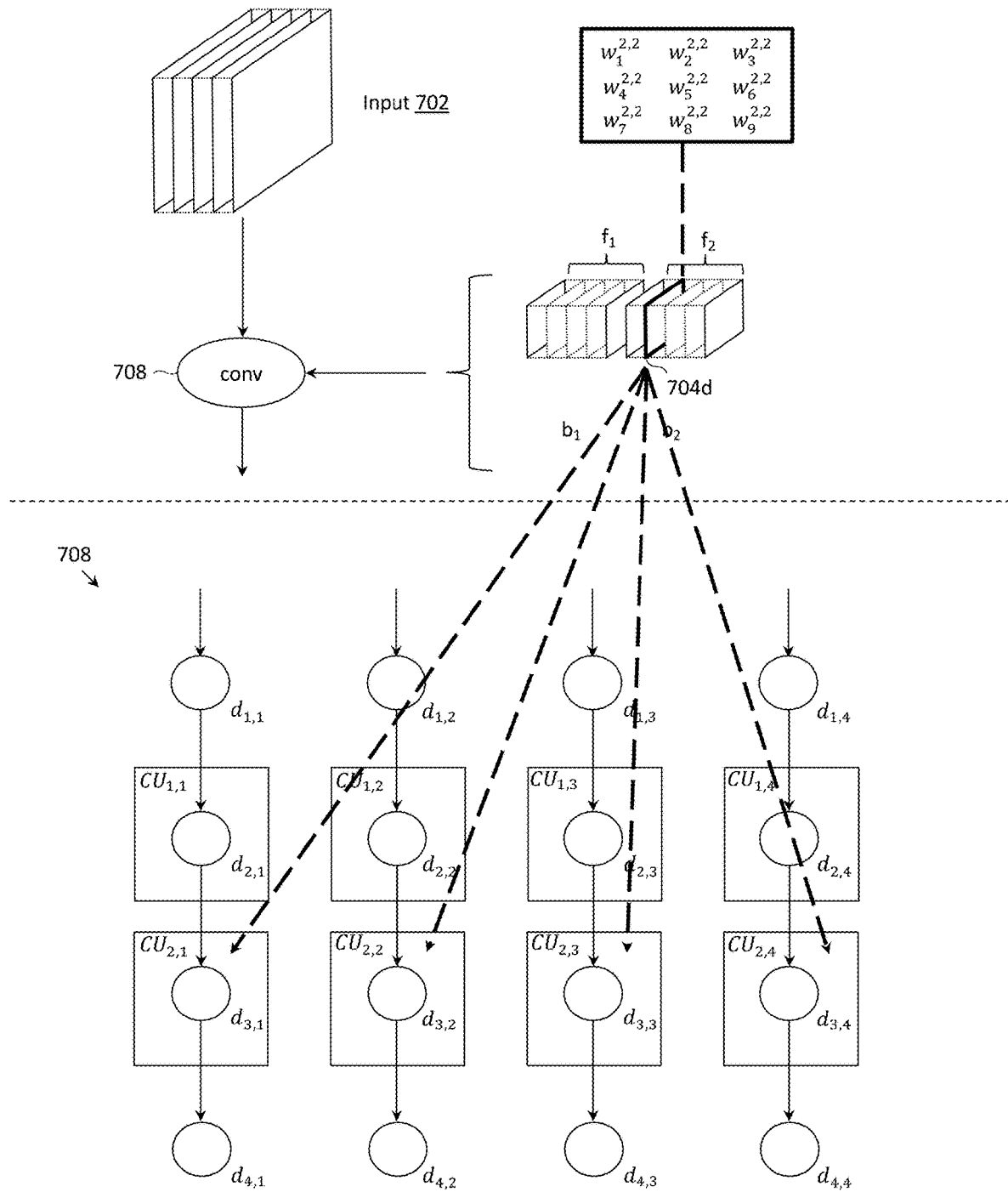

FIGS. 14C-14D depict the loading of filter weights into convolutional engine 708, in accordance with one embodiment of the invention. More specifically, FIG. 14C depicts the loading of the nine weights of kernel $704c$ into each of the convolver units of the first row of the convolver array (i.e., $CU_{1,1}$, $CU_{1,2}$, $CU_{1,3}$ and $CU_{1,4}$), and FIG. 14D depicts the loading of the nine weights of kernel $704b$ into each of the convolver units of the second row of the convolver array (i.e., $CU_{2,1}$, $CU_{2,2}$, $CU_{2,3}$ and $CU_{2,4}$). Kernel $704c$ is the second kernel of filter $f_1$, and each of its weights is labeled with the superscript "1,2", which is shorthand for (filter $f_1$, kernel 2). Kernel $704d$ is the second kernel of filter $f_2$, and each of its weights is labeled with the superscript "2,2", which is shorthand for (filter $f_2$, kernel 2).

Figure 15A:
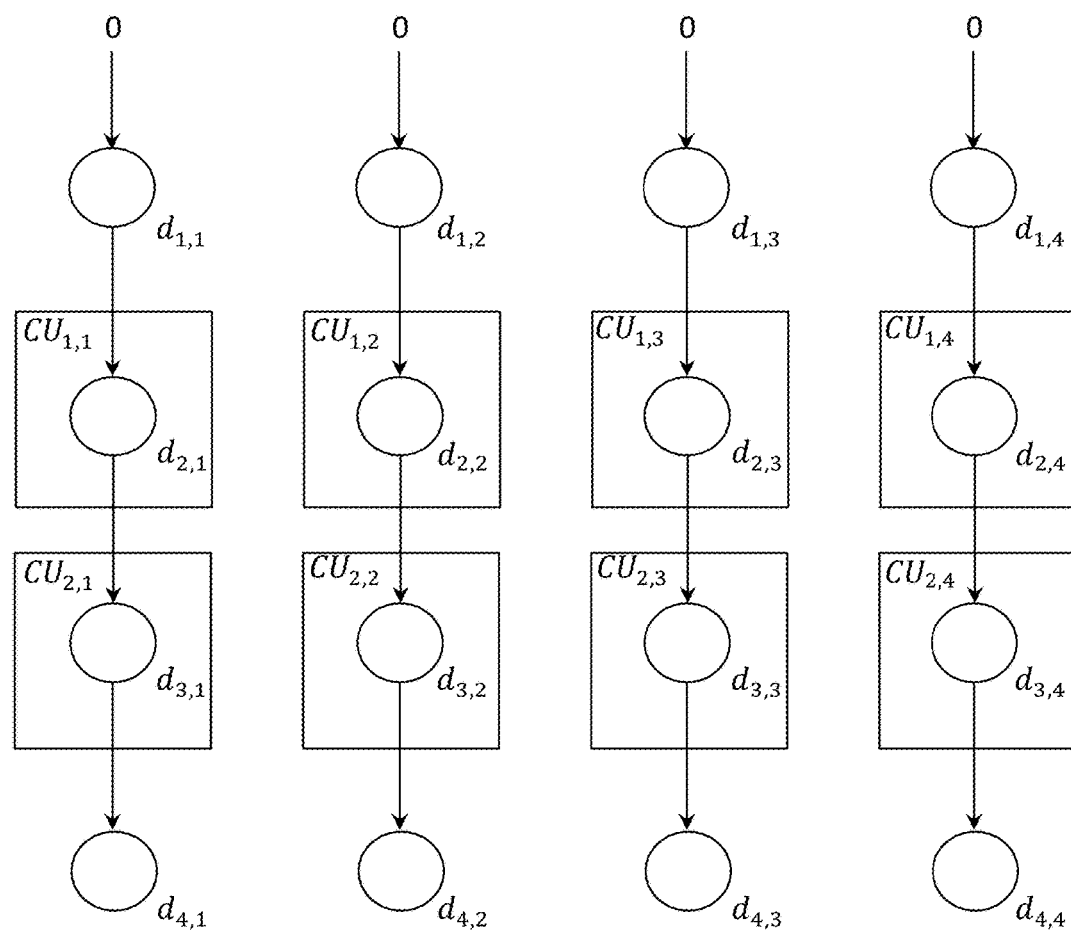
FIGS. 15A-15B depict the loading of a zero padding row into the 2-D shift register, in accordance with one embodiment of the invention.
Figure 15B:
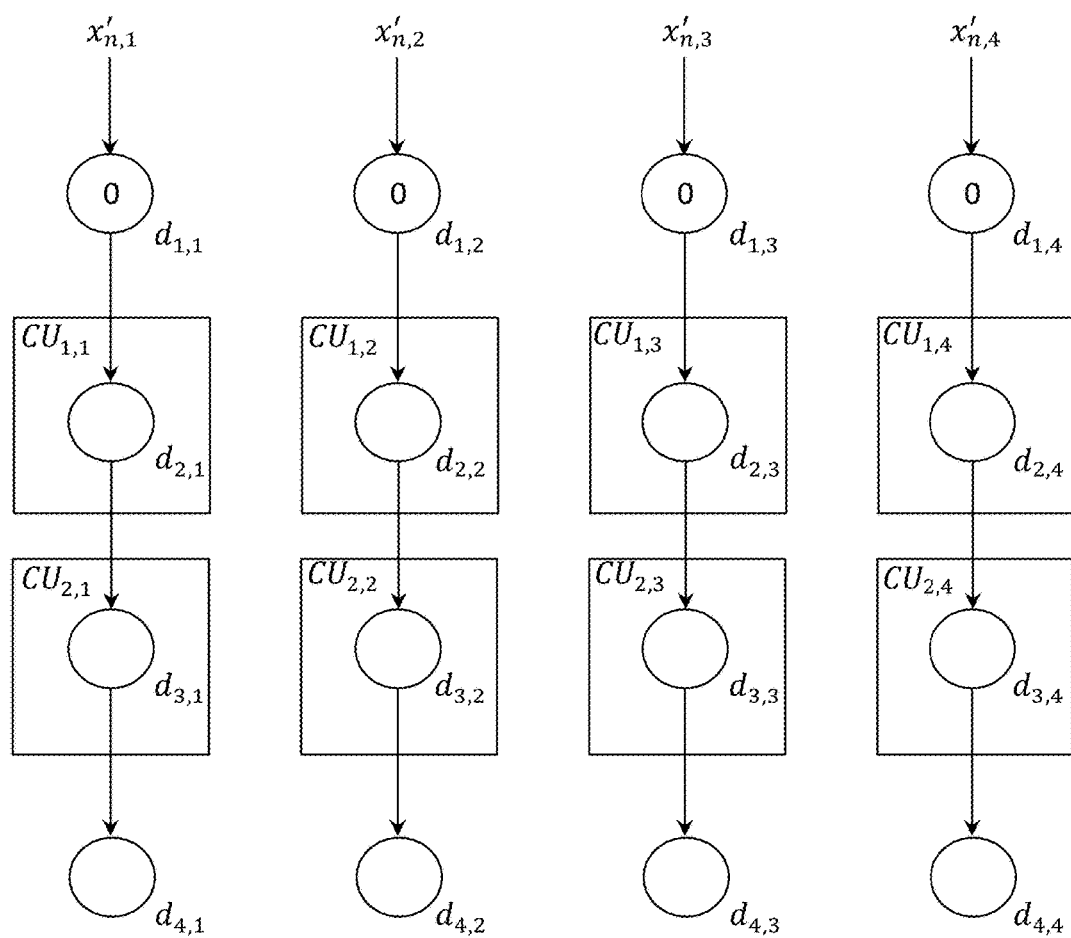
Figure 15C:
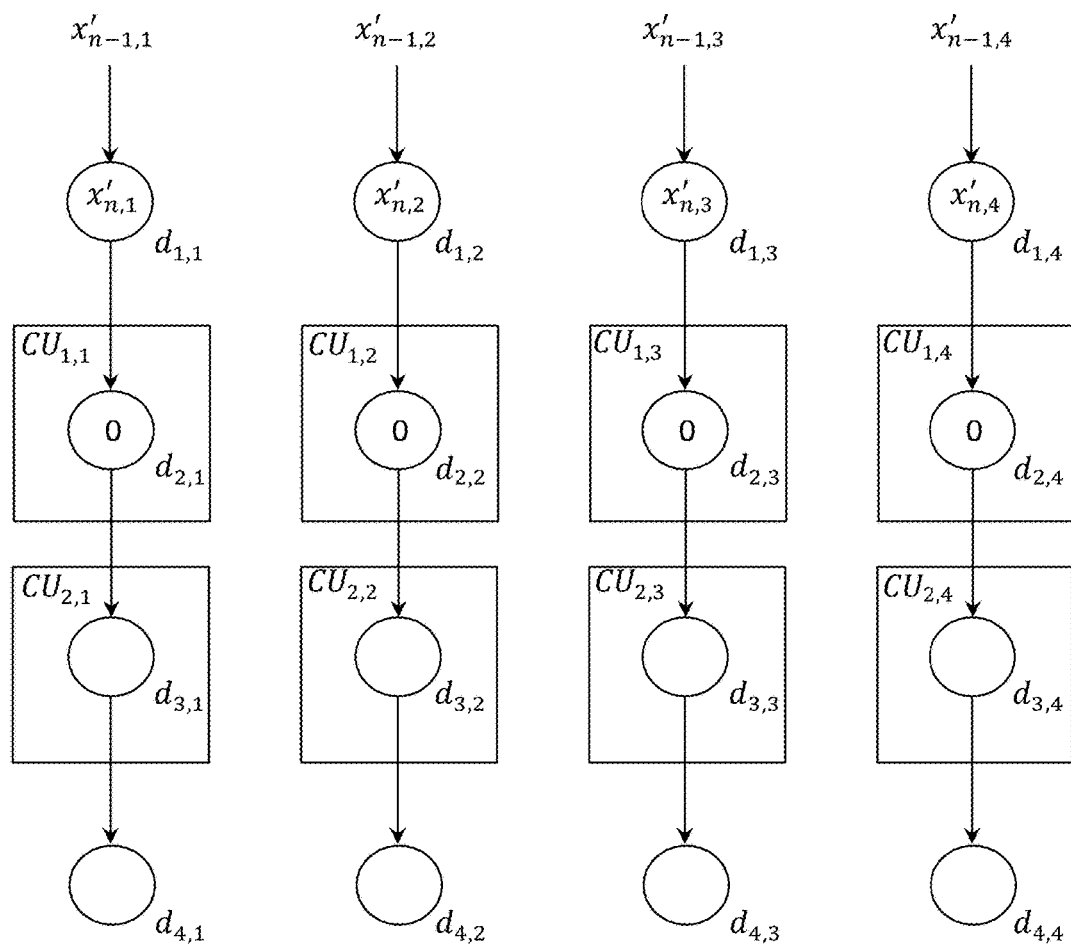
Figure 15D:
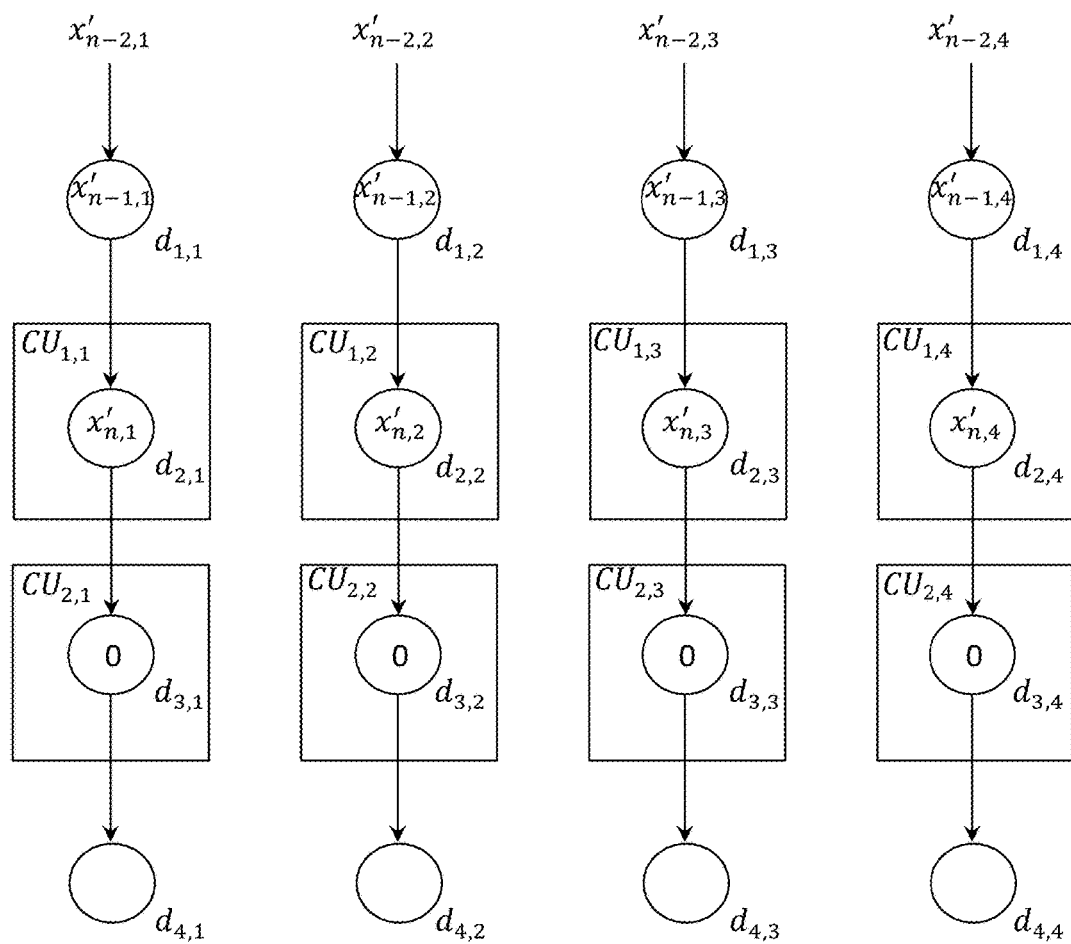

FIGS. 15A-15B depict the loading of a row of zero values into the 2-D shift register. FIGS. 15B-15D depict a row-by-row loading of data values from the second input channel $702b$ into the 2-D shift register and a row-to-row shifting of the data values through the 2-D shift register. Data values $x'_{n,1}, x'_{n,2}, x'_{n,3}$ and $x'_{n,4}$ may represent values from row n of horizontal stripe $904a$ of input channel $702b$. Data values $x'_{n-1,1}, x'_{n-1,2}, x'_{n-1,3}$ and $x'_{n-1,4}$, may represent values from row n−1 of horizontal stripe $904a$ of input channel $702b$. Data values $x'_{n-2,1}, x'_{n-2,2}, x'_{n-2,3}$ and $x'_{n-2,4}$ may represent values from row n−2 of horizontal stripe $904a$ of input channel $702b$. Upon row n of horizontal stripe $904a$ being loaded into the second row of data storage elements, the first row of convolver units may be activated (as shown in FIG. 16A).

Figure 16A:
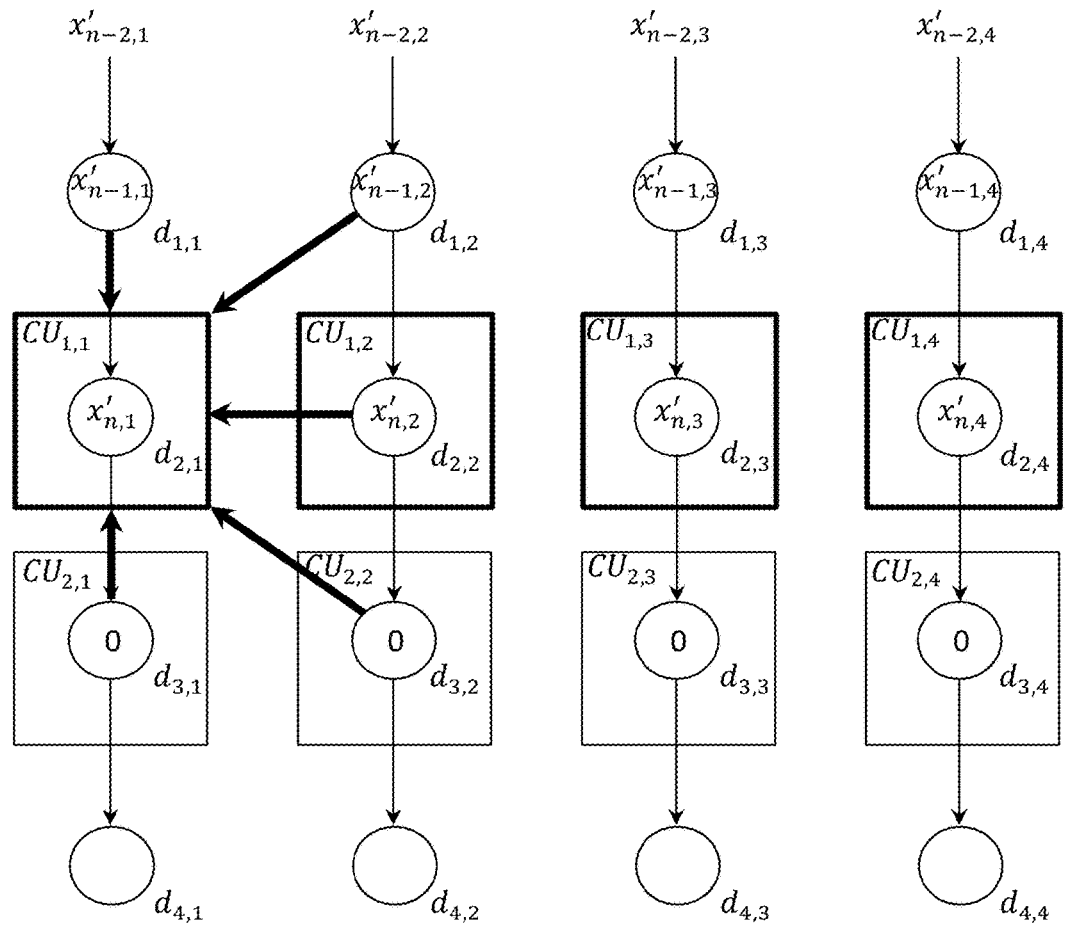
FIGS. 16A-16B describe the processing of two convolver units for the spatial orientation of the data values depicted in FIG. 15D, in accordance with one embodiment of the invention.
Figure 16A:
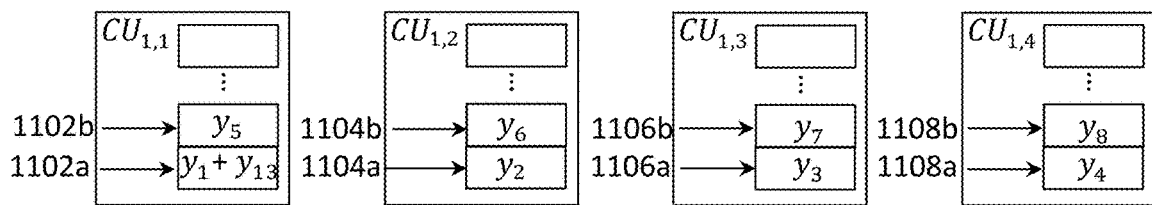
Figure 16A:
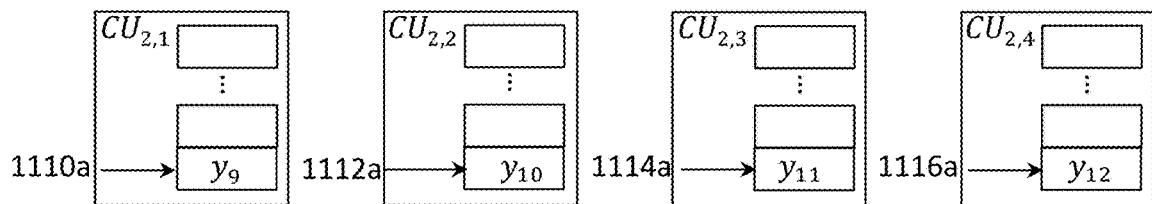
Figure 16B:
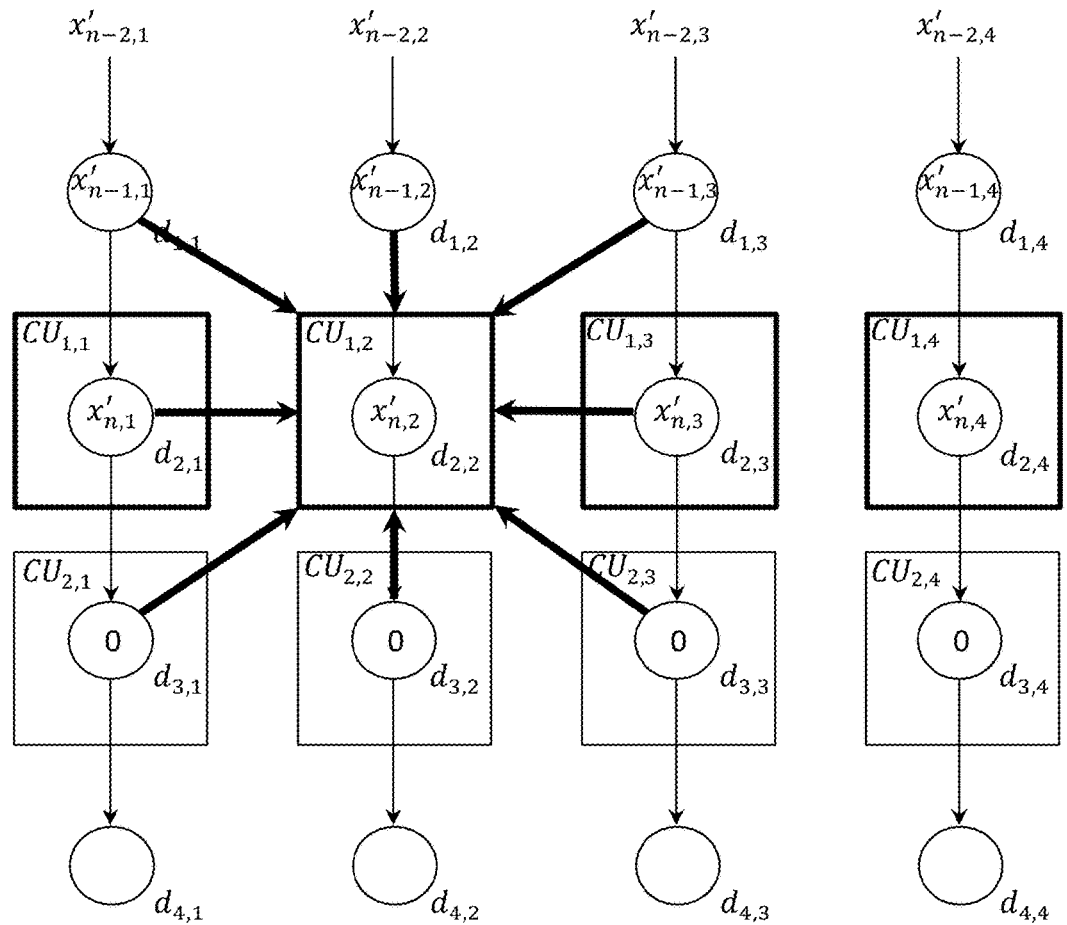

FIGS. 16A and 16B describe the processing of two out of the four active convolver units for the spatial orientation of the data values depicted in FIG. 15D. As depicted in FIG. 16A, convolver unit $CU_{1,1}$ may receive data and/or zero values from the five neighboring data storage elements and one data value from the data storage element corresponding to convolver unit $CU_{1,1}$. Once the data values have been received, convolver unit $CU_{1,1}$ may compute the partial sum $y_{13}$ defined by $w_2^{1,2}x'_{n-1,1}+w_3^{1,2}x'_{n-1,2}+w_5^{1,2}x'_{n,1}+w_6^{1,2}x'_{n,2}$ (where $w_2^{1,2}$, $w_3^{1,2}$, $w_5^{1,2}$, and $w_6^{1,2}$ are four of the nine weights of kernel $704c$ depicted in FIG. 14C). The partial sum $y_{13}$ may be summed with $y_1$ (the partial sum previously computed by convolver unit $CU_{1,1}$ for row n) and the new partial sum $y_1+y_{13}$ may be stored in accumulator $1102a$.

As depicted in FIG. 16B, convolver unit $CU_{1,2}$ may receive data and/or zero values from the eight neighboring data storage elements and one data value from the data storage element corresponding to convolver unit $CU_{1,2}$. Once the data and/or zero values have been received, convolver unit $CU_{1,2}$ may compute the partial sum $y_{14}$ defined by $w_1^{1,2}x'_{n-1,1}+w_2^{1,2}x'_{n-1,2}+w_3^{1,2}x'_{n-1,3}+w_4^{1,2}x'_{n,1}+w_5^{1,2}x'_{n,2}+w_6^{1,2}x'_{n,3}$ (where $w_1^{1,2}$, $w_2^{1,2}$, $w_3^{1,2}$, $w_4^{1,2}$, $w_5^{1,2}$ and $w_6^{1,2}$ are six of the nine weights of kernel $704c$ depicted in FIG. 14C). The partial sum $y_{14}$ may be summed with $y_2$ (the partial sum previously computed by convolver unit $CU_{1,2}$ for row n) and the new partial sum $y_2+y_{14}$ may be stored in accumulator $1104a$.

Figure 16C:
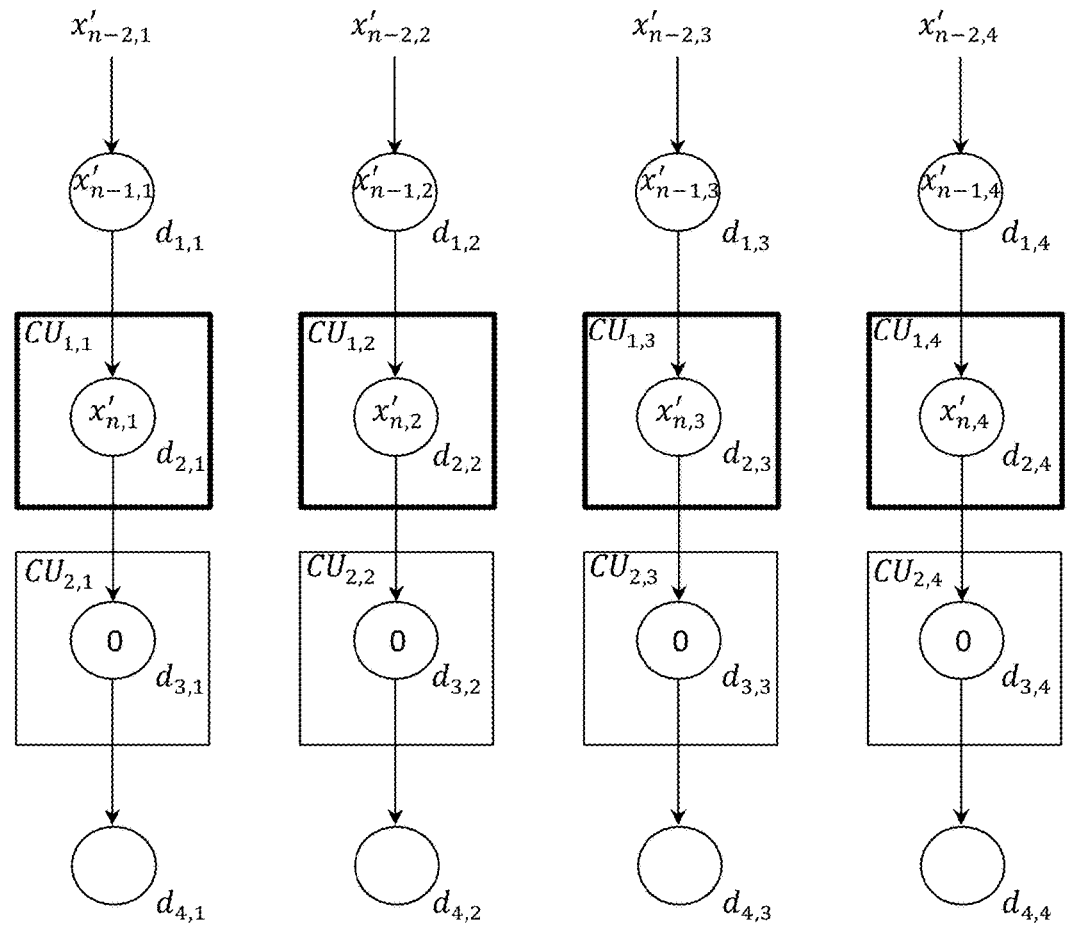
FIG. 16C depicts the resulting partial sums following the processing of all active convolver units for the spatial orientation of the data values depicted in FIG. 15D, in accordance with one embodiment of the invention.
Figure 16C:
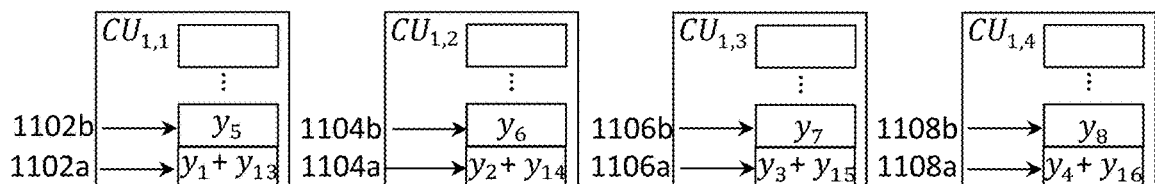
Figure 16C:
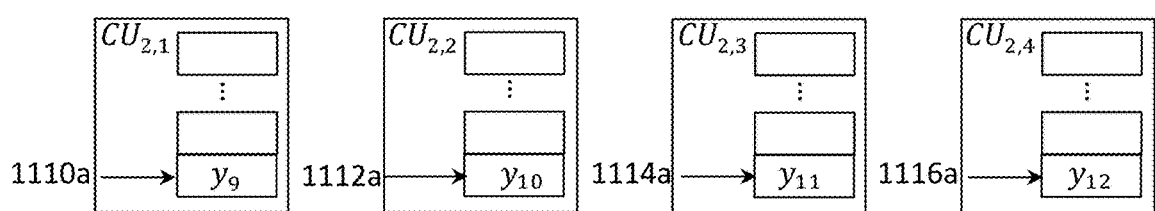

Similar processing is performed by $CU_{1,3}$ and $CU_{1,4}$, so the details of these computations have been omitted for conciseness. At the conclusion of the processing by the four active convolver units for the spatial orientation of data values shown in FIG. 15D, four partial sums have been updated and stored in accumulators $1102a$, $1104a$, $1106a$ and $1108a$, as shown in FIG. 16C.

Figure 17:
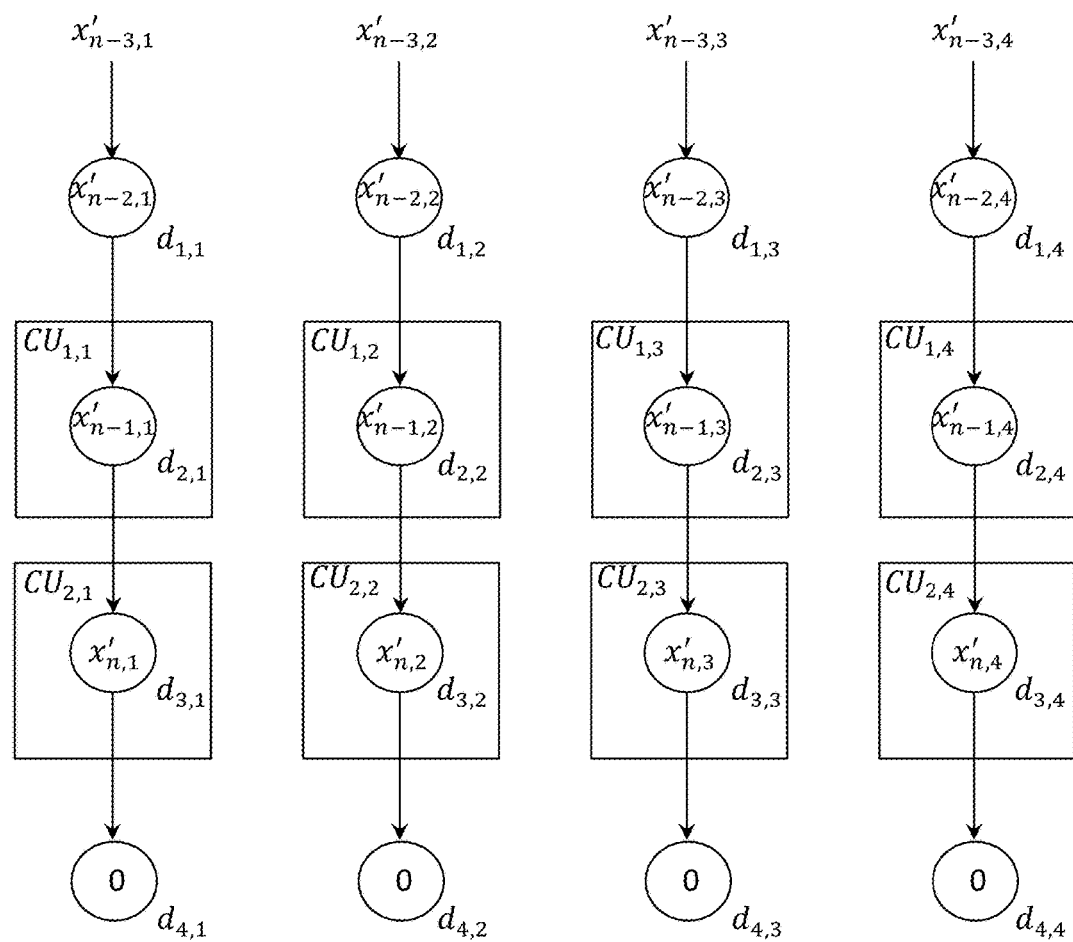
FIG. 17 depicts the data values after they have been shifted down one row of the 2-D shift register as compared to the spatial orientation of the data values depicted in FIG. 15D.

FIG. 17 depicts the 2-D shift register after the data and/or zero values have been shifted down one row of data storage elements, and data values $x'_{n-2,1}, x'_{n-2,2}, x'_{n-2,3}$ and $x'_{n-2,4}$ from the n−2 row of the horizontal stripe $904a$ have been loaded into the 2-D shift register. Once row n of horizontal stripe $904a$ has been loaded into data storage elements $d_{3,1}$, $d_{3,2}$, $d_{3,3}$ and $d_{3,4}$, the corresponding convolver units $CU_{2,1}$, $CU_{2,2}$, $CU_{2,3}$ and $CU_{2,4}$ are activated, in addition to $CU_{1,1}$, $CU_{1,2}$, $CU_{1,3}$ and $CU_{1,4}$ (as shown in FIG. 18A).

Figure 18A:
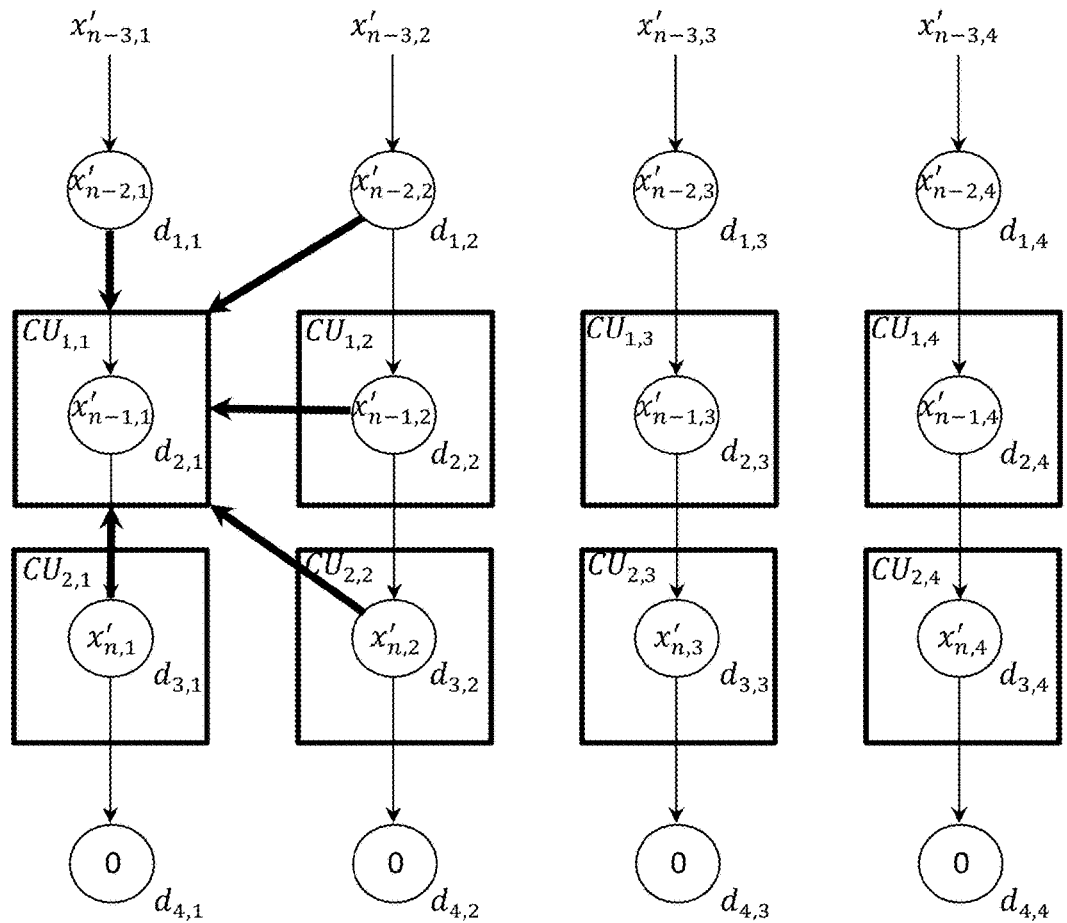
FIGS. 18A-18B describe the processing of two convolver units for the spatial orientation of the data values depicted in FIG. 17, in accordance with one embodiment of the invention.
Figure 18A:
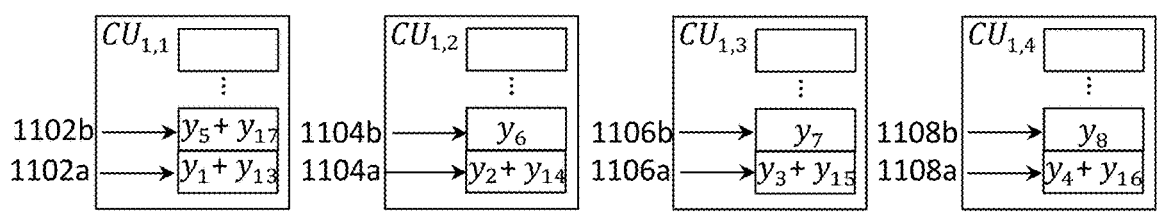
Figure 18A:
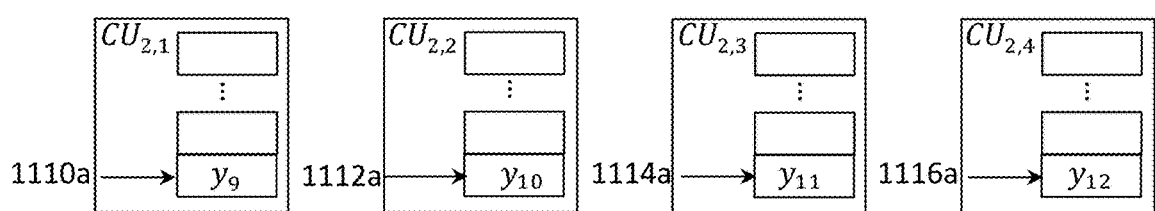
Figure 18B:
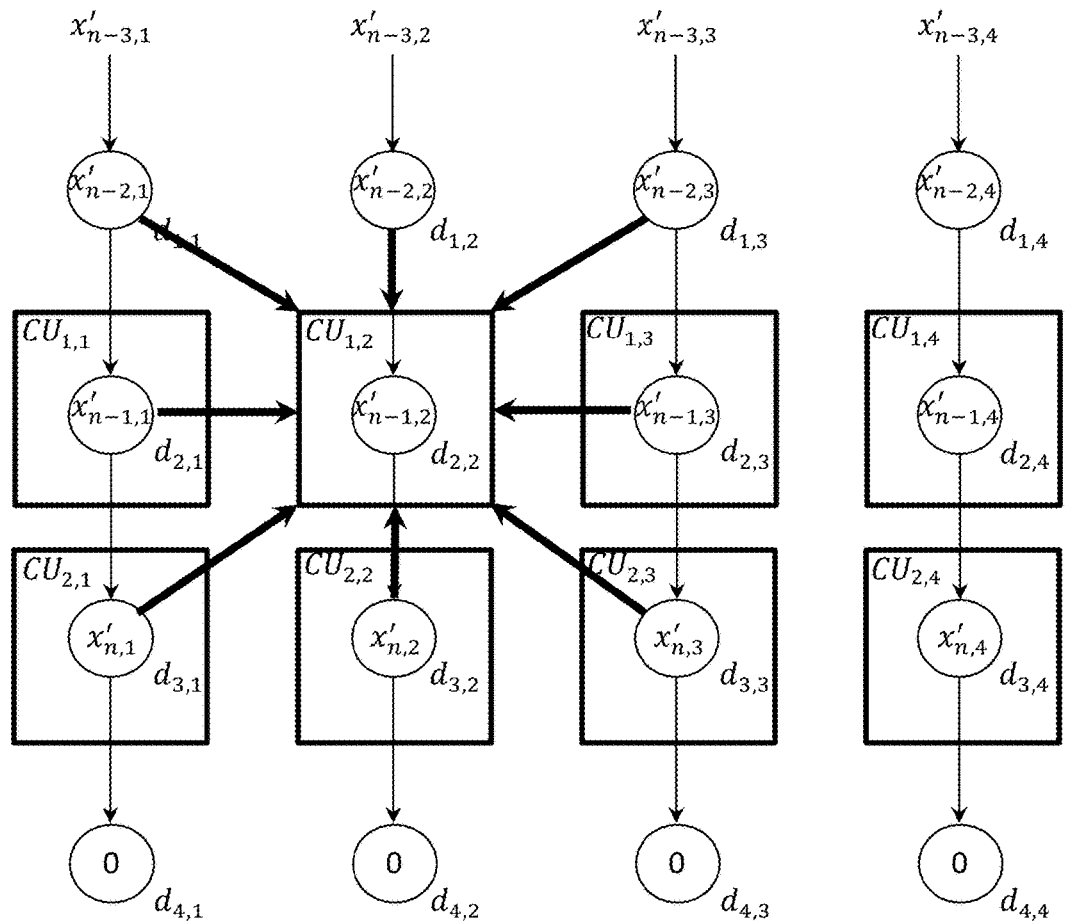
Figure 18B:
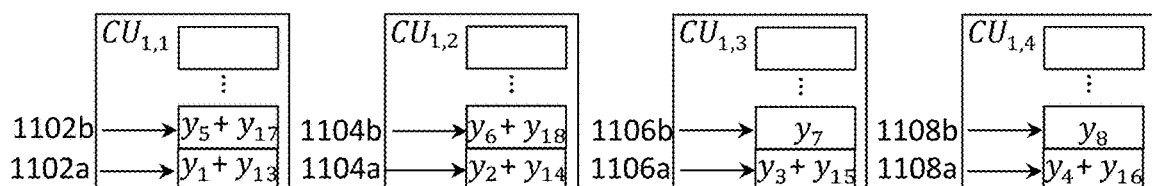
Figure 18B:
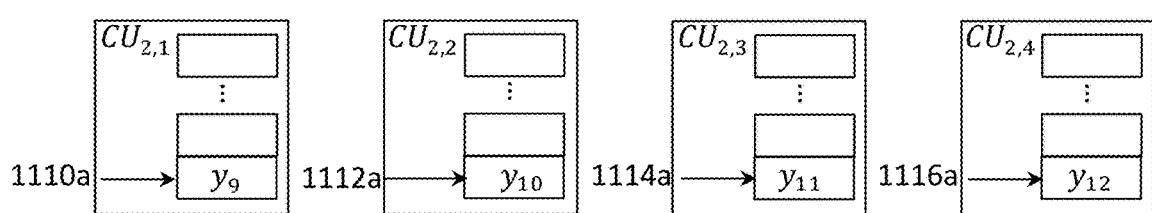

FIGS. 18A-18B describe the processing of two of the eight active convolver units, in accordance with one embodiment of the invention. As depicted in FIG. 18A, convolver unit $CU_{1,1}$ may receive data values from the five neighboring data storage elements and the one corresponding data storage element. Convolver unit $CU_{1,1}$ may then compute the partial sum $y_{17}$ defined by $w_2^{1,2}x'_{n-2,1}+w_3^{1,2}x'_{n-2,2}+w_5^{1,2}x'_{n-1,1}+w_6^{1,2}x'_{n-1,2}+w_8^{1,2}x'_{n,1}+w_9^{1,2}x'_{n,2}$. The partial sum $y_{17}$ may be summed with $y_6$ (the partial sum previously computed by convolver unit $CU_{1,1}$ for row n−1) and the new partial sum $y_5+y_{17}$ may be stored in accumulator $1102b$.

As depicted in FIG. 18B, convolver unit $CU_{1,2}$ may receive data values from the eight neighboring data storage elements and the one corresponding data storage element. Convolver unit $CU_{1,2}$ may then compute the partial sum $y_{18}$ defined by $w_1^{1,2}x'_{n-1,2}+w_2^{1,2}x'_{n-2,2}+w_3^{1,2}x'_{n-2,3}+w_4^{1,2}x'_{n-1,1}+w_5^{1,2}x'_{n-1,2}+w_6^{1,2}x'_{n-1,3}+w_7^{1,2}x'_{n,1}+w_8^{1,2}x'_{n,2}+w_9^{1,2}$ $2x'_{n,3}$. The partial sum $y_{18}$ may be summed with $y_6$ (the partial sum previously computed by convolver unit $CU_{1,2}$ for row n−1) and the new partial sum $y_6+y_{18}$ may be stored in accumulator 1104b.

Figure 18C:
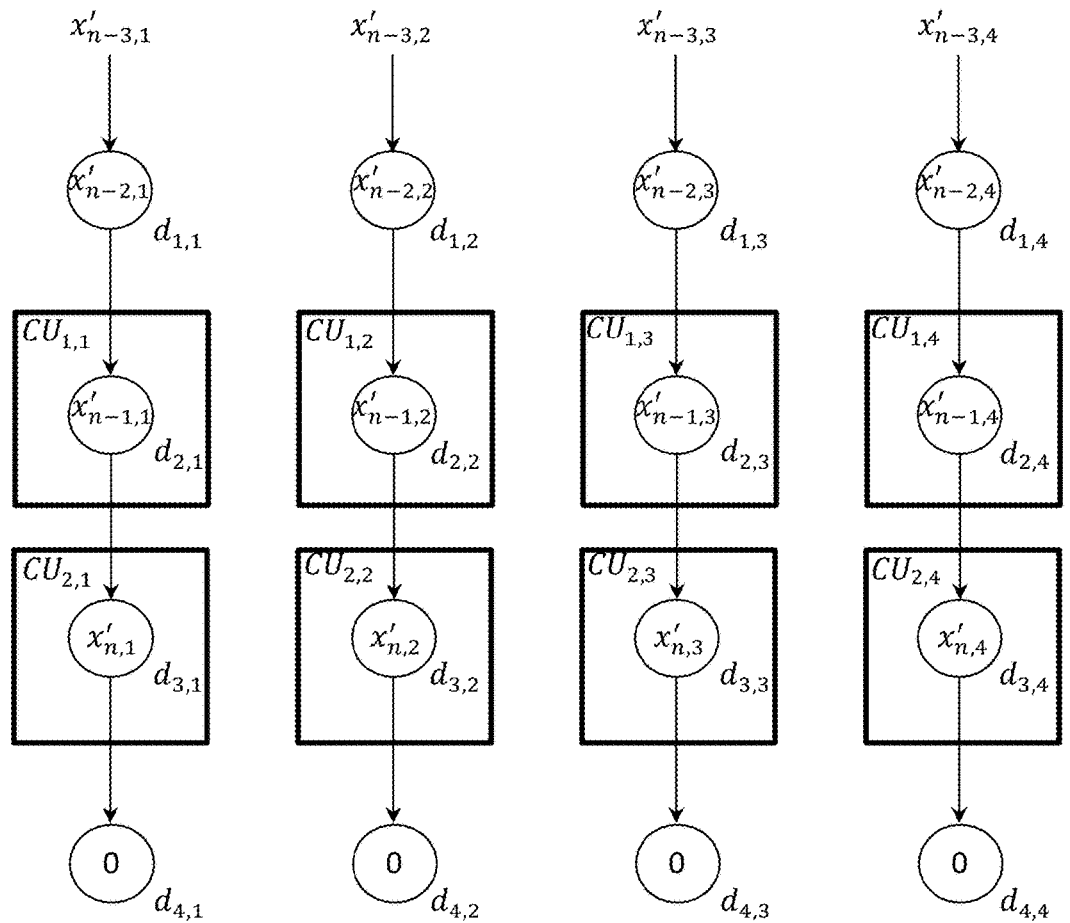
FIG. 18C depicts the resulting partial sums following the processing of all active convolver units for the spatial orientation of the data values depicted in FIG. 17, in accordance with one embodiment of the invention.
Figure 18C:
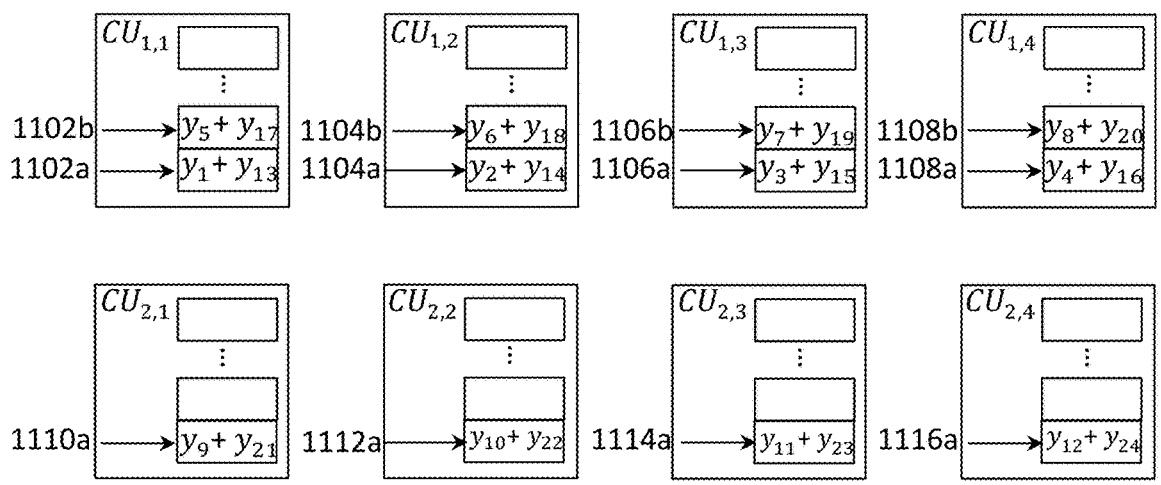

Similar processing is performed by convolver units $CU_{1,3}$, $CU_{1,4}$, $CU_{2,1}$, $CU_{2,2}$, $CU_{2,3}$ and $CU_{2,4}$, so the details of these computations have been omitted for conciseness. At the conclusion of the processing by the active convolver units for the spatial orientation of data values shown in FIG. 17, eight (additional) partial sums have been updated and stored in accumulators 1102b, 1104b, 1106b, 1108b, 1110a, 1112a, 1114a and 1116a, as shown in FIG. 18C.

The processing of the 2-D shift register and the plurality of convolutional units continues in a similar fashion until row 1 of horizontal stripe 904a has been shifted through the 2-D shift register. The processing of the 2-D shift register and the plurality of convolutional units then continues until all of the remaining input channels have been processed in a manner similar to the processing of the first two input channels.

Figure 19A:
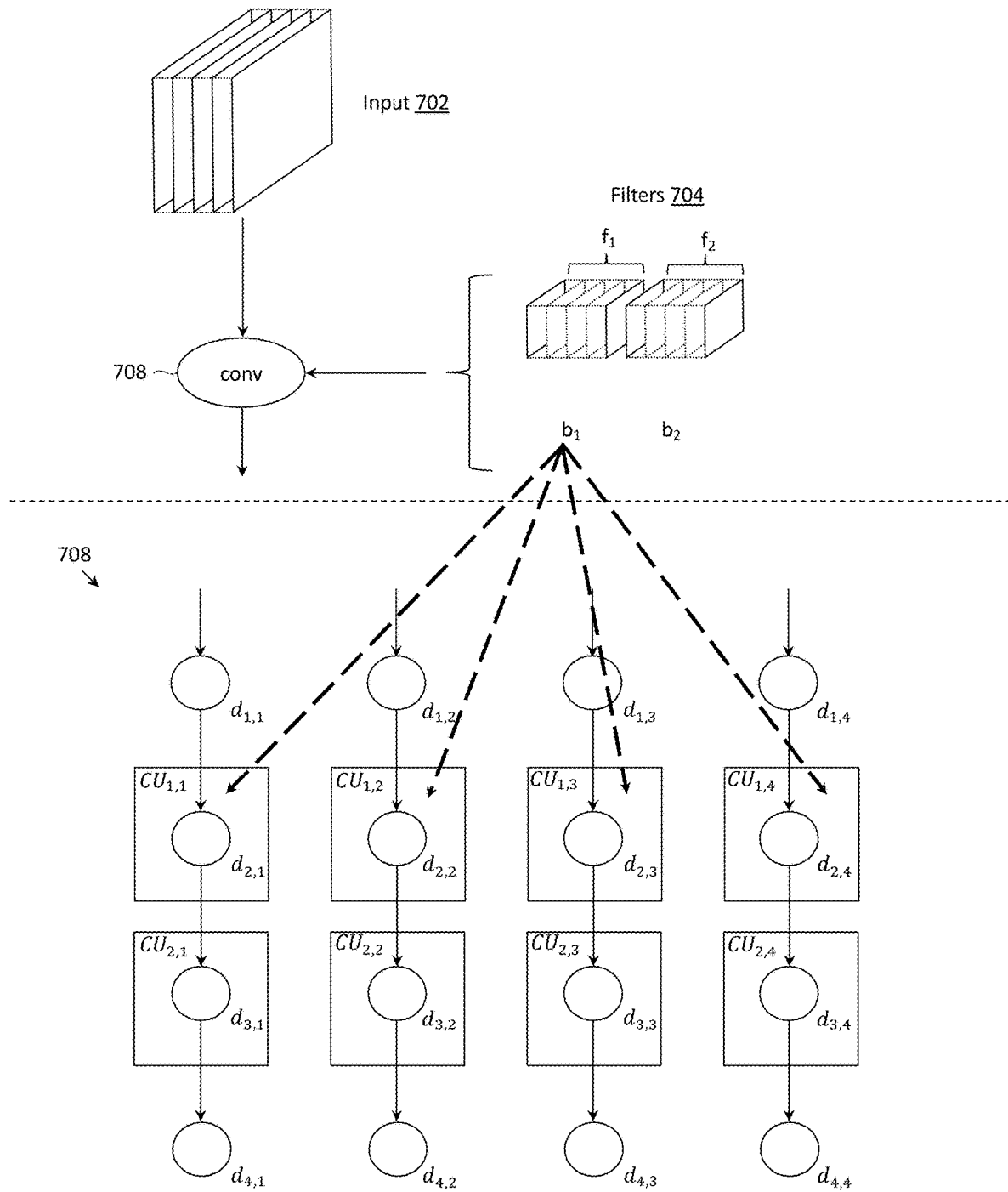
FIGS. 19A-19B depict the loading of bias values into the convolutional engine, in accordance with one embodiment of the invention.
Figure 19B:
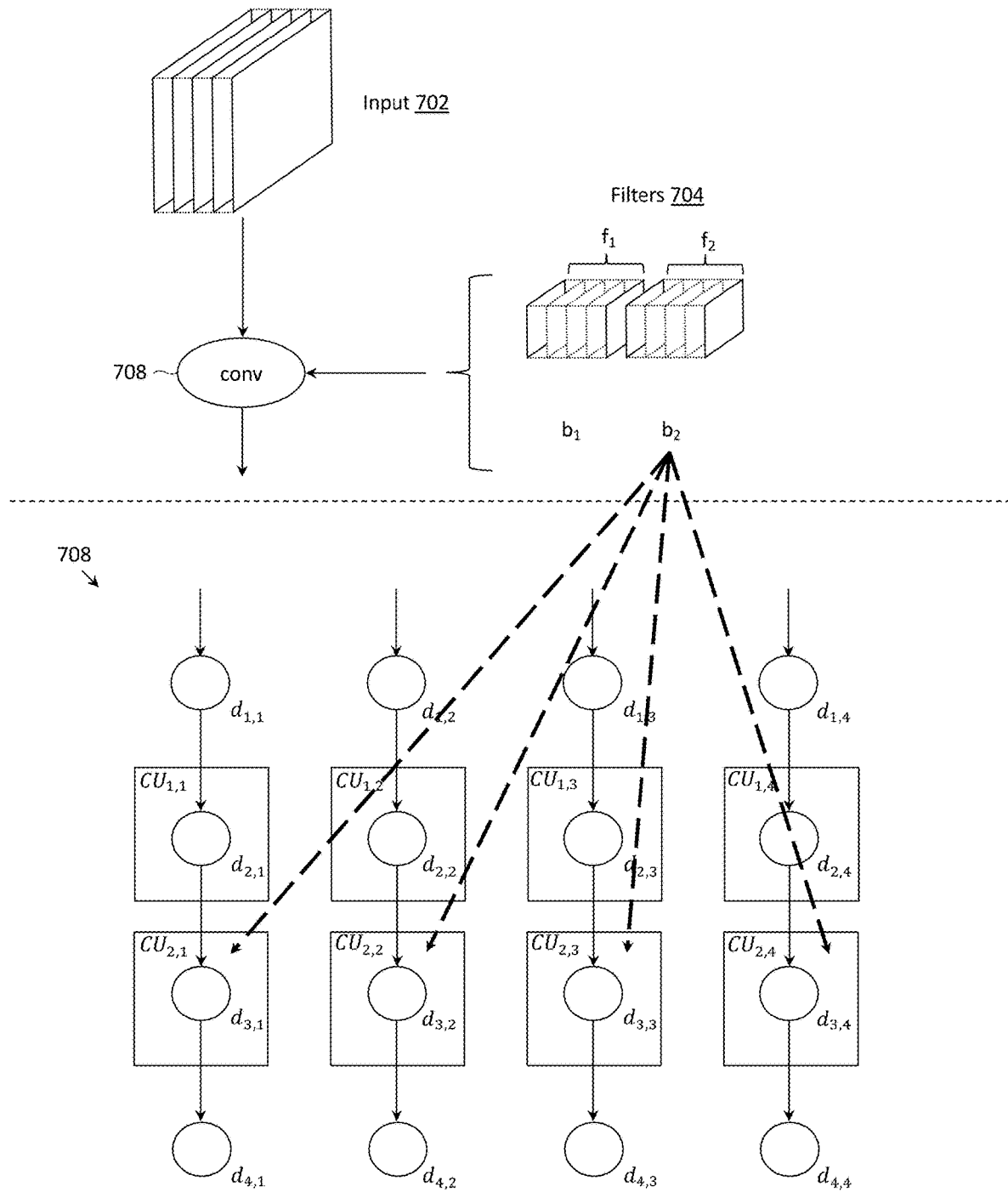
Figure 20:
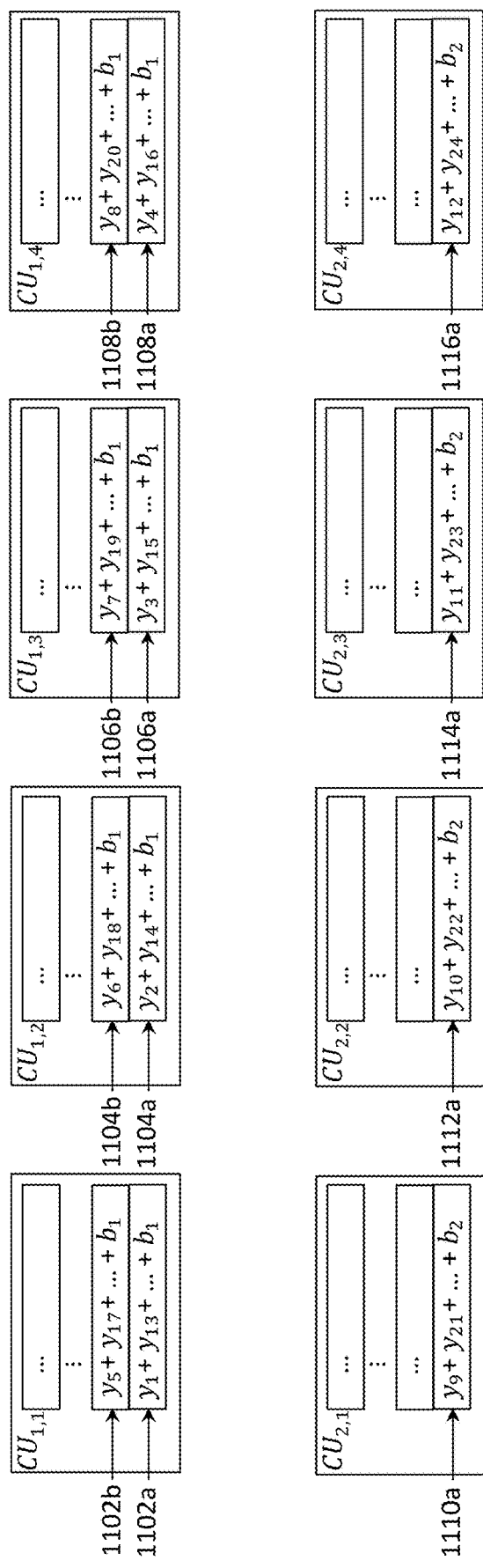
FIG. 20 depicts the output of each of the convolver units, after the partial sums have been biased with bias values, in accordance with one embodiment of the invention.

At this point (or earlier in the process), bias values may be loaded into the convolutional units. More specifically, FIG. 19A depicts the loading of bias value $b_1$ into the first row of convolver units ($CU_{1,1}$, $CU_{1,2}$, $CU_{1,3}$ and $CU_{1,4}$) and FIG. 19B depicts the loading of bias value $b_2$ into the second row of convolver units ($CU_{2,1}$, $CU_{2,2}$, $CU_{2,3}$ and $CU_{2,4}$). The partial sums computed by the first row of convolver units may be biased by bias value $b_1$, and the partial sums computed by the second row of convolver units may be biased by bias value $b_2$ (as depicted in FIG. 20) to yield the output of the convolution operation.

In the examples so far, it was assumed that the number of rows of the convolver array equals the number filters. This relationship, however, does not always hold. If the number of filters were less than the number of rows of the convolver array, unused rows of the convolver array could be deactivated. If the number of filters were more than the number of rows of the convolver array, the convolution operations would essentially need to be repeated. For instance, if there were six filters and only three rows of convolver units, then the convolution operations could be performed for filters 1-3, and the same convolution operations would be repeated, except that filters 1-3 would be substituted with filters 4-6.

Some motivation is now provided for the above-described architecture of the convolutional engine. The architecture essentially attempts to strike a balance between the fan-out of data storage elements (related to the sizing of circuit components) and the number of computations per clock cycle (related to the speed of computation). At one extreme of solely maximizing the computations per clock cycle, the 2-D shift register could have been reduced to three rows of data storage elements, with $CU_{1,1}$, $CU_{2,1}$, $CU_{3,1}$, . . . wired to the same six data storage elements; $CU_{1,2}$, $CU_{2,2}$, $CU_{3,2}$, . . . wired to the same nine data storage elements, etc. While the computations per clock cycle would be greater than the above-described architecture, the fan-out of the data storage elements would be much greater (requiring larger circuit components to drive the increased output capacitance). At the other extreme of solely minimizing the fan-out, three contiguous rows of the 2-D shift register could have been used exclusively for filter 1, three contiguous rows of the 2-D shift register could have been used exclusively for filter 2, and so on. While the fan-out would be lower than the above-described architecture, the number of computations per clock cycle would essentially be reduced by two-thirds, as compared to the above-described architecture. In light of this explanation, the motivation for the above-described architecture should now be more apparent as one which strikes a balance between the fan-out of data storage elements and the number of computations per clock cycle.

Figure 21:
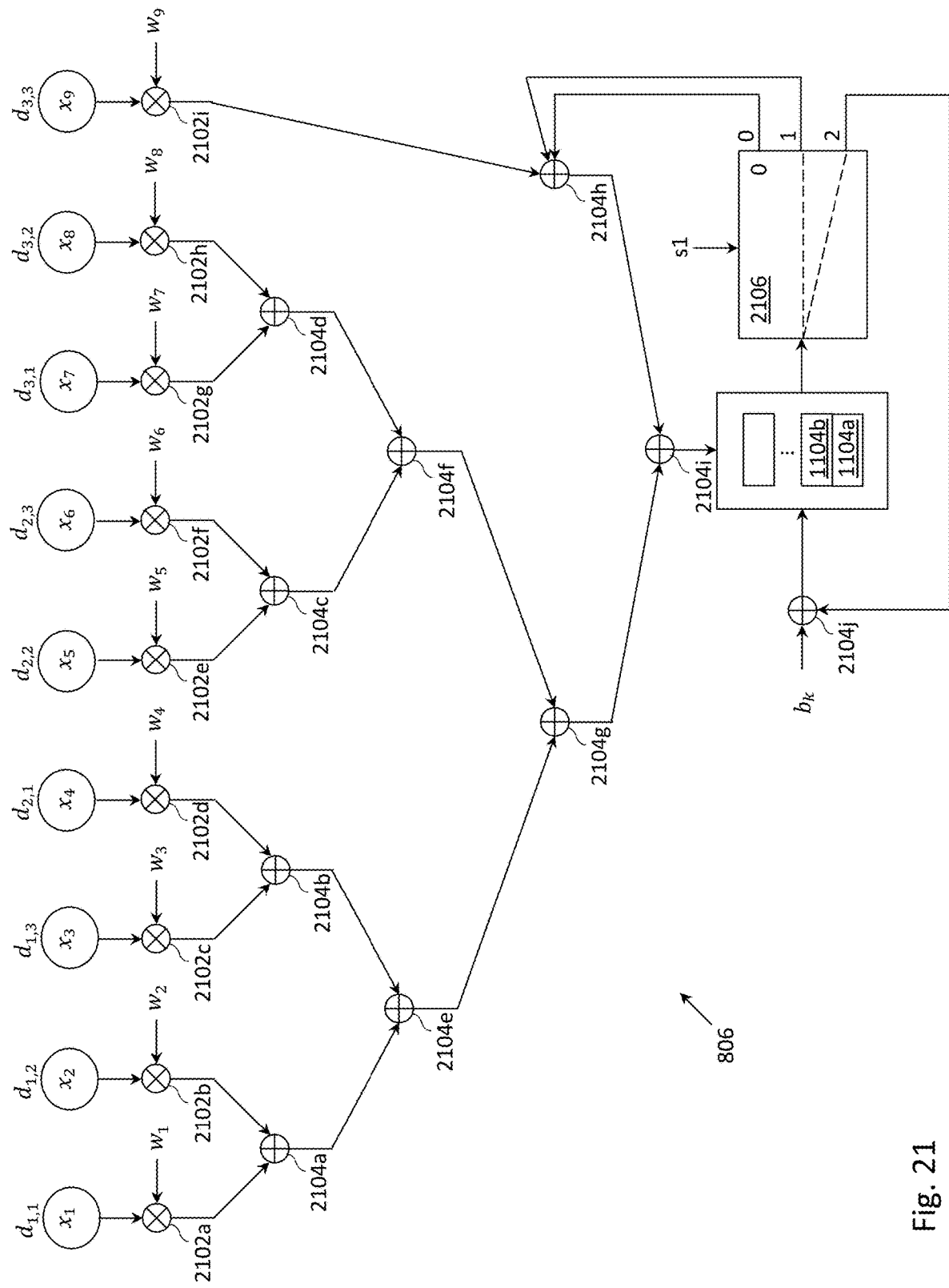
FIG. 21 depicts internal components of a convolver unit, in accordance with one embodiment of the invention.

FIG. 21 depicts internal components of convolver unit 806 (i.e., $CU_{1,2}$), in accordance with one embodiment of the invention. Convolver unit 806 may include nine multipliers (2102a, . . . , 2102i). Each of the multipliers may be electrically coupled to a data storage element (i.e., one of the data storage elements of the 2-D shift register) and may be configured to receive a data value stored in the corresponding data storage element. In particular, multipliers 2102a, 2102b, 2102c, 2102d, 2102e, 2102f, 2102g, 2102h, and 2102i are electrically coupled to data storage elements $d_{1,1}$, $d_{1,2}$, $d_{1,3}$, $d_{2,1}$, $d_{2,2}$, $d_{2,3}$, $d_{3,1}$, $d_{3,2}$, and $d_{3,3}$, and are configured to receive data values $x_1$, $x_2$, $x_3$, $x_4$, $x_5$, $x_6$, $x_7$, $x_8$, and $x_9$, from data storage elements 2102a, 2102b, 2102c, 2102d, 2102e, 2102f, 2102g, 2102h, and 2102i, respectively. The data value stored in a data storage element typically changes with each clock cycle. For example, in the context of FIG. 10C, $x_1$ would equal $x_{n,1}$; in FIG. 10D, $x_1$ would equal $x_{n-1,1}$; and so on. The same comment applies for the other data values.

Each of the multipliers is further configured to receive a weight. In particular, multipliers 2102a, 2102b, 2102c, 2102d, 2102e, 2102f, 2102g, 2102h, and 2102i are configured to receive weights $w_1$, $w_2$, $w_3$, $w_4$, $w_5$, $w_6$, $w_7$, $w_8$, and $w_9$, respectively. A different set of weights may be loaded for each channel of input data 702. For example, in the context of FIG. 9C, $w_1$ would equal $w_1^{1,1}$; in the context of FIG. 14C, $w_1$ would equal $w_1^{1,2}$; and so on.

Each of the multipliers may multiply two values so as to generate the product of the two values. In particular, multipliers 2102a, 2102b, 2102c, 2102d, 2102e, 2102f, 2102g, 2102h, and 2102i may multiply data values $x_1$, $x_2$, $x_3$, $x_4$, $x_5$, $x_6$, $x_7$, $x_8$, and $x_9$ with weights $w_1$, $w_2$, $w_3$, $w_4$, $w_5$, $w_6$, $w_7$, $w_8$, and $w_9$ so as to generate the products $w_1x_1$, $w_2x_2$, $w_3x_3$, $w_4x_4$, $w_5x_5$, $w_6x_6$, $w_7x_7$, $w_8x_8$, and $w_9x_9$, respectively. In an embodiment in which signal values (including data values and weights) are represented in the log domain, a specialized multiplier may be implemented using a bit-shifter and an adder (the specialized multiplier further performing a log-to-linear transformation). For more details on such an implementation, see, e.g., Daisuke Miyashita et al. "Convolutional Neural Networks using Logarithmic Data Representation" arXiv preprint arXiv:1603.01025, 2016. Therefore, for clarity, when stated that a product is generated, it is understood that such a computation can be implemented using a multiplier, or the combination of a bit-shifter and an adder.

Convolver unit 806 may further include a plurality of adders and the values that are summed by the adders may depend on control signal s1. When the data values $x_1$, . . . , $x_9$ are from the first input channel 702a, control signal s1 may be set to 0, causing output selector 2106 to deliver the zero value to adder 2104h. In this mode of operation, the partial sum $w_1x_1+w_2x_2+w_3x_3+w_4x_4+w_5x_5+w_6x_6+w_7x_7+w_8x_8+w_9x_9$ is computed, and is not based on any previous partial sums. The partial sum is then stored in one of the accumulators 1104a, 1104b, etc. depending on which row of a horizontal stripe the data values are from. If the data values are from row n, the partial sum would be stored in accumulator 1104a; if the data values are from row n−1, the partial sum would be stored in accumulator 1104b; and so on.

When the data values $x_1, \ldots, x_9$ are from one of the subsequent input channels (e.g., 702*b*, etc.), control signal s1 may be set to 1, causing output selector 2106 to deliver a previously computed partial sum to adder 2104*h*. In particular, if the data values are from row n of a horizontal stripe, the previously computed partial sum stored in accumulator 1104*a* would be provided to adder 2104*h*; if the data values are from row n−1, the previously computed partial sum stored in accumulator 1104*b* would be provided to adder 2104*h*; and so on.

When control signal s1 is set to 2, output selector 2106 may be configured to deliver a partial sum from an accumulator to adder 2104*j*, which sums the partial sum with bias $b_k$. The resulting sum may be stored back into the accumulator from which the partial sum was read. For an efficient implementation, an entire vector of partial sums may be read from the accumulator array (1104*a*, 1104*b*, ... ), summed with bias $b_k$, and the vector (now with biasing) may be stored back into the accumulator array. Such computation may implement the biasing operation described for $CU_{1,2}$ in FIG. 20.

It is further noted that in an embodiment in which signal values are represented in the log domain, specialized adders (built using comparators, bit-shifters and adders) may receive two values in the linear domain (since the preceding specialized multipliers performed a log-to-linear transformation) and return the resulting sum in the log domain. Details of such specialized adders may also be found in Daisuke Miyashita et al. "Convolutional Neural Networks using Logarithmic Data Representation" arXiv preprint arXiv:1603.01025, 2016.

Any of the convolver units that receive nine data values (and nine weights) may have a similar hardware architecture as convolver unit $CU_{1,2}$, and hence will not be described for conciseness. For convolver units that receive less than nine data values, the hardware architecture could still be similar to the hardware architecture of convolver unit $CU_{1,2}$, except that some of the inputs to the multipliers could be hardwired to the zero value (data input or weight could be set to the zero value). For example, since $CU_{1,1}$ does not receive data values $x_1$, $x_4$ and $x_7$, weights $w_1$, $w_4$ and $w_7$ could be set to zero. In another embodiment, some of the multipliers could even be omitted. For example, since $CU_{1,1}$ does not receive data values $x_1$, $x_4$ and $x_7$, multipliers 2102*a*, 2102*d* and 2102*g* could be omitted.

In one embodiment of the invention, the computations of all nine multipliers (or their equivalents in the log domain) and nine adders (or their equivalents in the log domain) take place all within one clock cycle. That is, if data values are stored in the nine data storage elements at clock cycle n, the partial sum is stored in the accumulators at clock cycle n+1. Further, for increased throughput, new data values may be stored in the nine data storage elements at clock cycle n+1 while the partial sum is stored. Therefore the computation of a new partial sum may be performed during every clock cycle.

Figure 22:
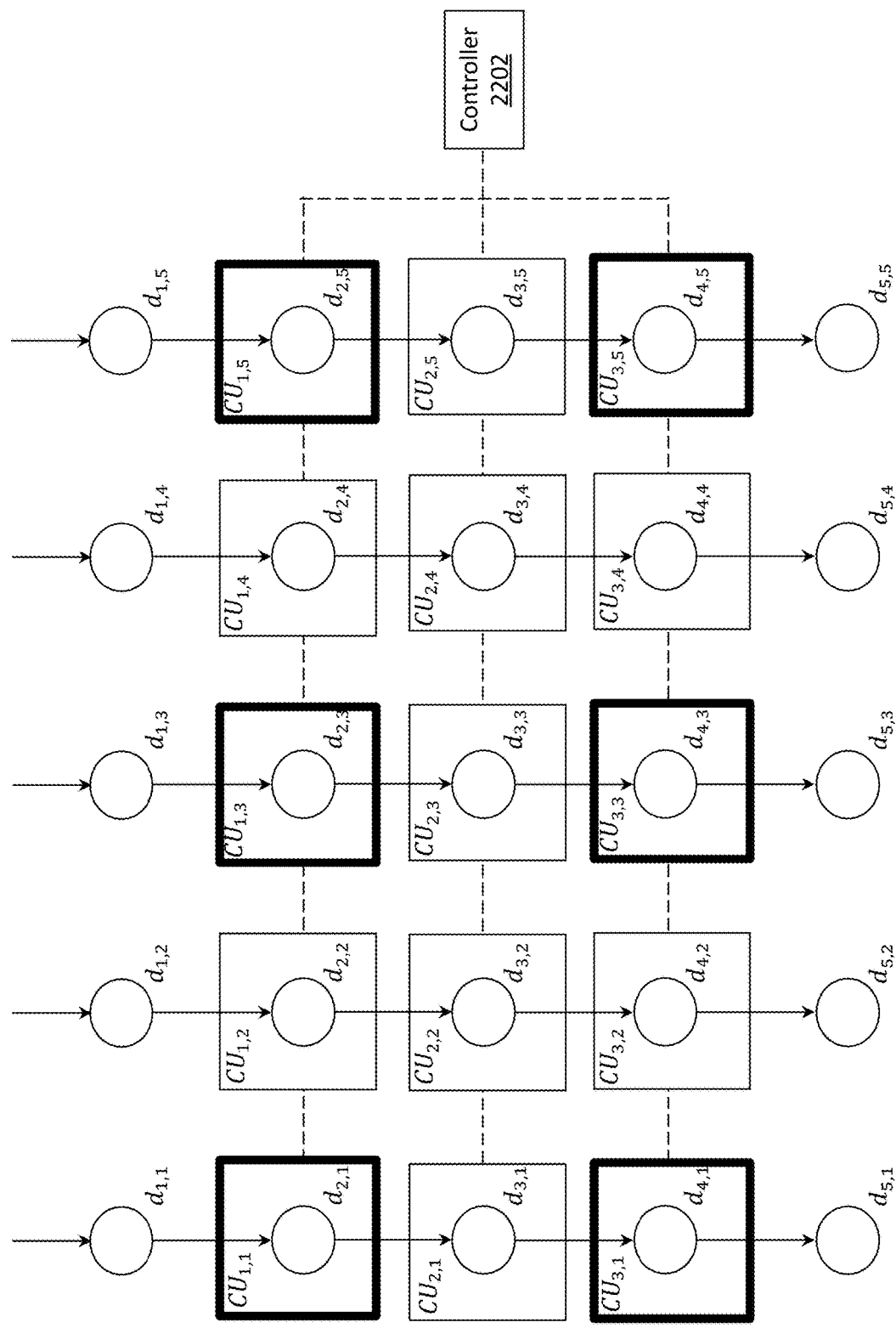
FIG. 22 depicts control circuitry for controlling the stride of a convolution operation, in accordance with one embodiment of the invention.

Details are now provided as to how the stride of the convolution operation can be set using the hardware architecture. Recall, the stride (or the step size) is the number of pixels or data values that the filter is shifted between dot product operations. FIG. 22 illustrates that by setting every odd row and every odd column of convolver units to be active and setting every even row and every even column of convolver units to be non-active (by means of control signals provided by controller 2202), a stride of 2 may be achieved. It should be apparent how other stride values can be set. For a stride of 3, rows 3x+1 for $x \in \{0, 1, 2, \ldots\}$ of convolver units and columns 3x+1 for $x \in \{0, 1, 2, \ldots\}$ of convolver units may be set to be active and all other rows and columns may be set to be non-active. Even strides of less than 1 are possible. For example, for a stride of ½, input 702 can be interpolated before it is loaded into convolutional engine 708. For a 2×2 input matrix of $$\begin{bmatrix} a & b \\ c & d \end{bmatrix}$$

the following 3×3 interpolated matrix can be provided as input to convolutional engine 708 in order to achieve a stride of:

$$\begin{bmatrix} a & \frac{a+b}{2} & b \\ \frac{a+c}{2} & \frac{a+b+c+d}{4} & \frac{b+d}{2} \\ c & \frac{c+d}{2} & d \end{bmatrix}$$

While a linear interpolation was used in the present example, it is understood that other forms of interpolation (e.g., polynomial interpolation, spline interpolation, etc.) are also possible.

While the discussion so far has focused on the convolution operation, a convolutional neural network typically involves other types of operations, such as the max pool and rectification operators. The convolver unit was presented first for ease of understanding, but now a more generalized form of a convolver unit, called a "functional unit" will now be described for handling other types of operations common in a convolutional neural network in addition to the convolution operation.

Figure 23:
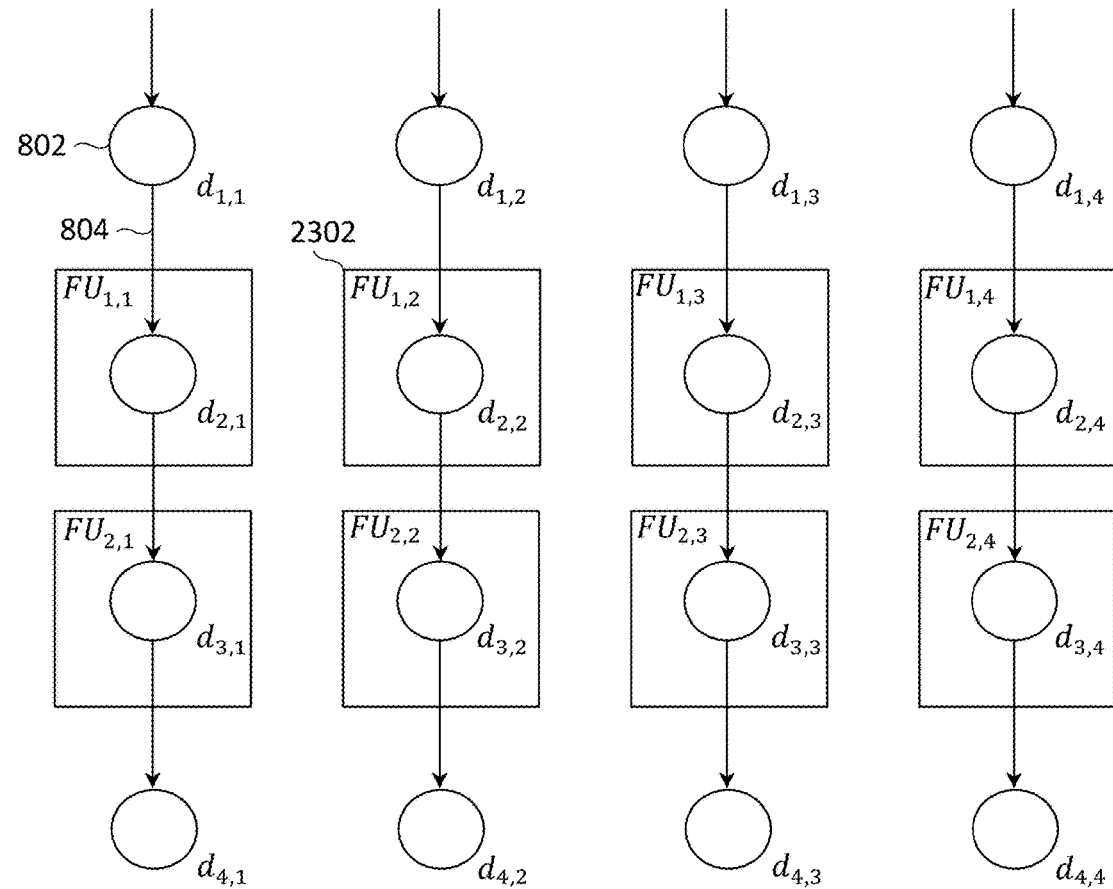
FIG. 23 depicts a generalized convolutional engine including a 2-D shift register and an array of functional units, in accordance with one embodiment of the invention.

FIG. 23 depicts convolutional engine 2300 including a 2-D shift register and an array of functional units, in accordance with one embodiment of the invention. Convolutional engine 2300 is similar to the above-described convolutional engine 708, except that the convolver units have been replaced with functional units. One of the functional units, $FU_{1,2}$, is labeled as 2302 and its hardware architecture is described below in FIG. 23.

Figure 24:
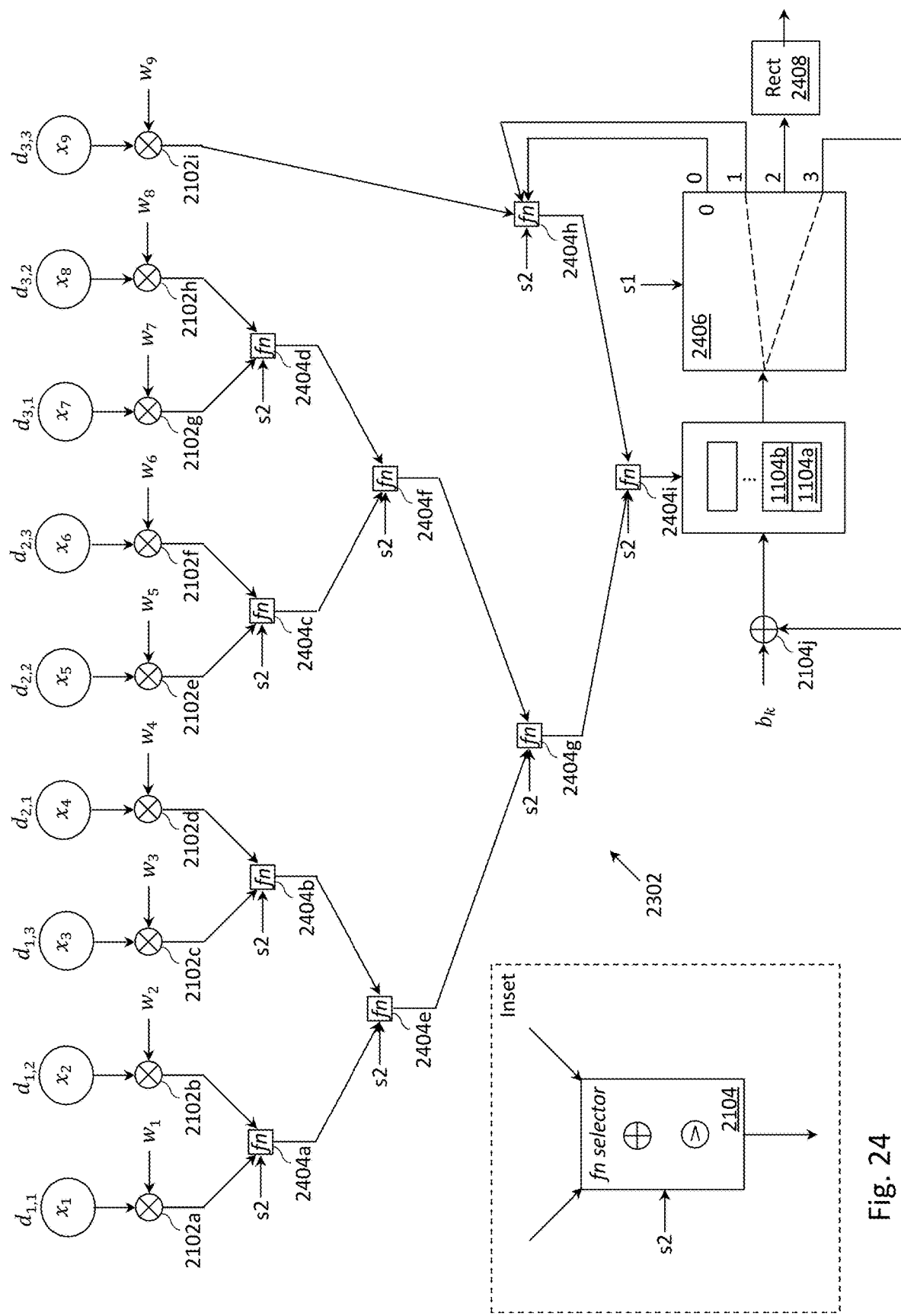
FIG. 24 depicts internal components of a functional unit, in accordance with one embodiment of the invention.

FIG. 24 depicts internal components of functional unit 2302, in accordance with one embodiment of the invention. There are two main differences between functional unit 2302 and convolver unit 806. First, functional unit 2302 has the ability to compute the maximum of a sum (needed to perform the max pool operation). Second, functional unit 2302 has the ability to compute the rectification of a value. In order to compute the maximum of a sum, each of the nine adders (2104*a*, ..., 2104*i*) of the convolver unit may be replaced with a function selector (2404*a*, ..., 2404*i*). The function selector receives control signal s2, allowing the selection between an adder and a comparator (see inset in FIG. 24). With the adder selected, the functional unit, for the most part, is transformed back into the hardware architecture of convolver unit 806, and functional unit 2302 is configured to perform the above-described convolution operation. With the comparator selected, functional unit 2302 is configured to compute $\max(w_1 x_1, w_2 x_2, w_3 x_3, w_4 x_4, w_5 x_5, w_6 x_6, w_7 x_7, w_8 x_8, w_9 x_9)$ when control signal s1 is set to 0, and max $(w_1 x_1, w_2 x_2, w_3 x_3, w_4 x_4, w_5 x_5, w_6 x_6, w_7 x_7, w_8 x_8, w_9 x_9,$ previous partial sum) when control signal s1 is set to 1. Therefore, when operating the convolutional engine 2302 in a manner similar to FIGS. 8-18C, except with the comparator selected, the maximum of the pointwise multiplication of a three dimensional filter (e.g., $f_1$) with a three dimensional volume of input (i.e., a volume of input that aligns with the filter—as described in FIG. 6) may be computed. It should now be apparent that the max pool operator may be implemented with the comparators of a functional unit selected and the stride set equal to the magnitude of one dimension of a kernel of the filter (e.g., for a 3×3 kernel, the stride would be set to be 3).

When the control signal s1 is set to 2, functional unit is configured to perform the rectification operation. Control signal s1 being set to 2 causes output selector 2406 to provide the value stored in one or more of the accumulators 1104a, 1104b, . . . to rectifier 2408, which performs the following rectification operation:

$$rect(x) = \begin{cases} x \text{ for } x > 0 \\ 0 \text{ for } x \leq 0 \end{cases}$$

In a data representation in which a data value is represented by a zero bit (indicating whether the data value is 0), a sign bit (indicating the whether the data value is positive or negative) and the magnitude (indicating the magnitude of the data value), rectifier 2408 can be configured to return 0 whenever the sign bit indicates a negative number or if the zero bit is set, and return the magnitude otherwise.

When the control signal s1 is set to 3, functional unit is configured to add a bias value to the data stored in accumulators 1104a, 1104b, etc. similar to the operation of convolver unit 806.

Figure 25:
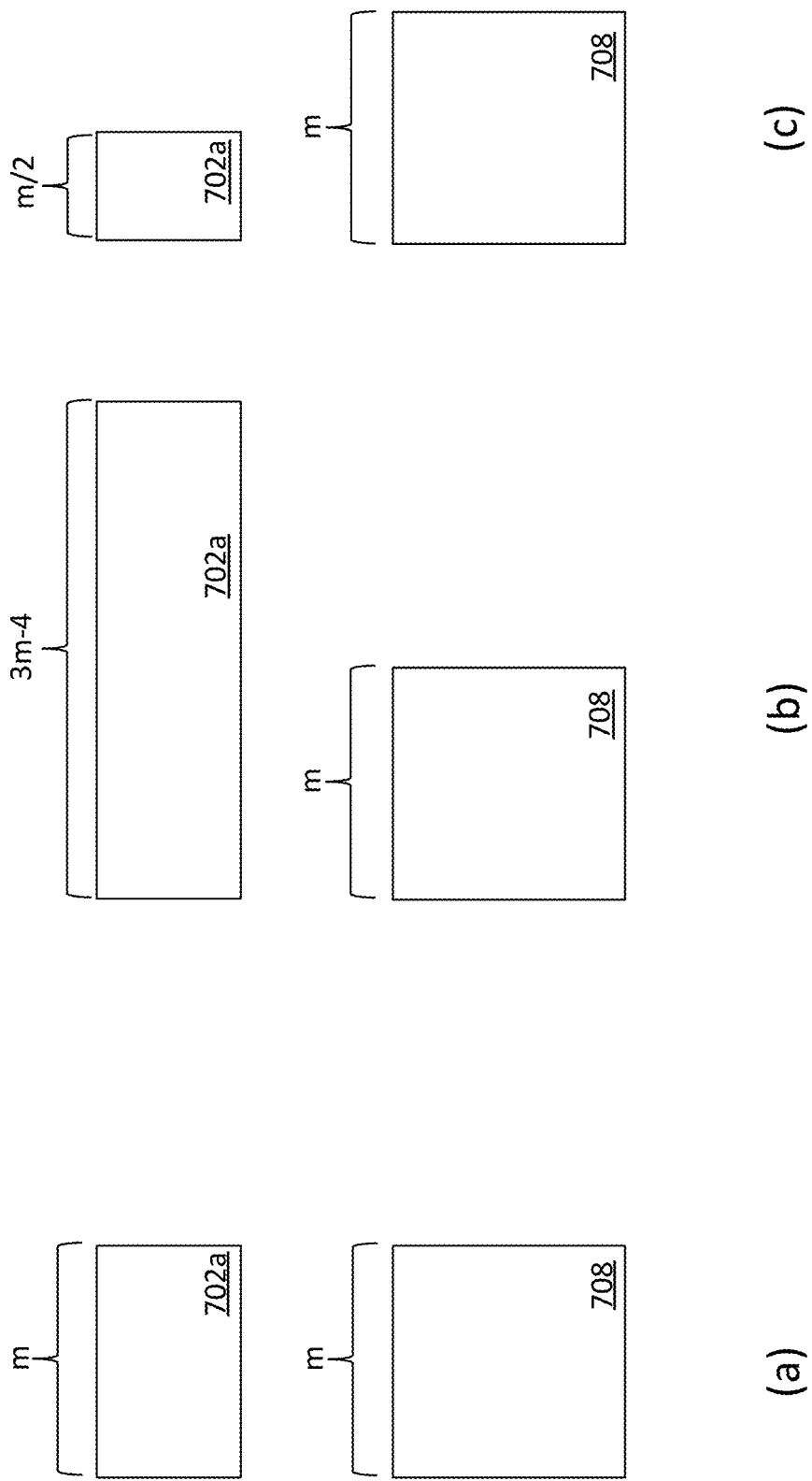
FIG. 25 depicts three scenarios of data values being loaded from an input channel into a convolutional engine having m columns of convolver units, with scenario (a) illustrating the input channel having m columns of data values, scenario (b) illustrating the input channel having 3m–4 columns of data values, and scenario (c) illustrating the input channel having m/2 columns of data values, in accordance with one embodiment of the invention.

FIG. 25 depicts three scenarios of data values being loaded from input channel 702a into convolutional engine 708 having m columns of convolver units, with scenario (a) illustrating input channel 702a having m columns of data values, scenario (b) illustrating input channel 702a having 3m−4 columns of data values, and scenario (c) illustrating input channel 702a having m/2 columns of data values, in accordance with one embodiment of the invention. Scenario (a) was previously described in FIG. 9B, but will be more fully discussed in FIGS. 26A-26B. Scenario (b) discusses an example in which the number of columns of input channel 702a is greater than the number of columns of the convolver array. Scenario (c) discusses an example in which the number of columns of input channel 702a is less than the number of columns of the convolver array. While a convolutional engine is more abstractly depicted, it should be understood that the architecture of a convolutional engine may be similar to earlier described examples, with a 2-D shift register and a convolver array.

Figure 26A:
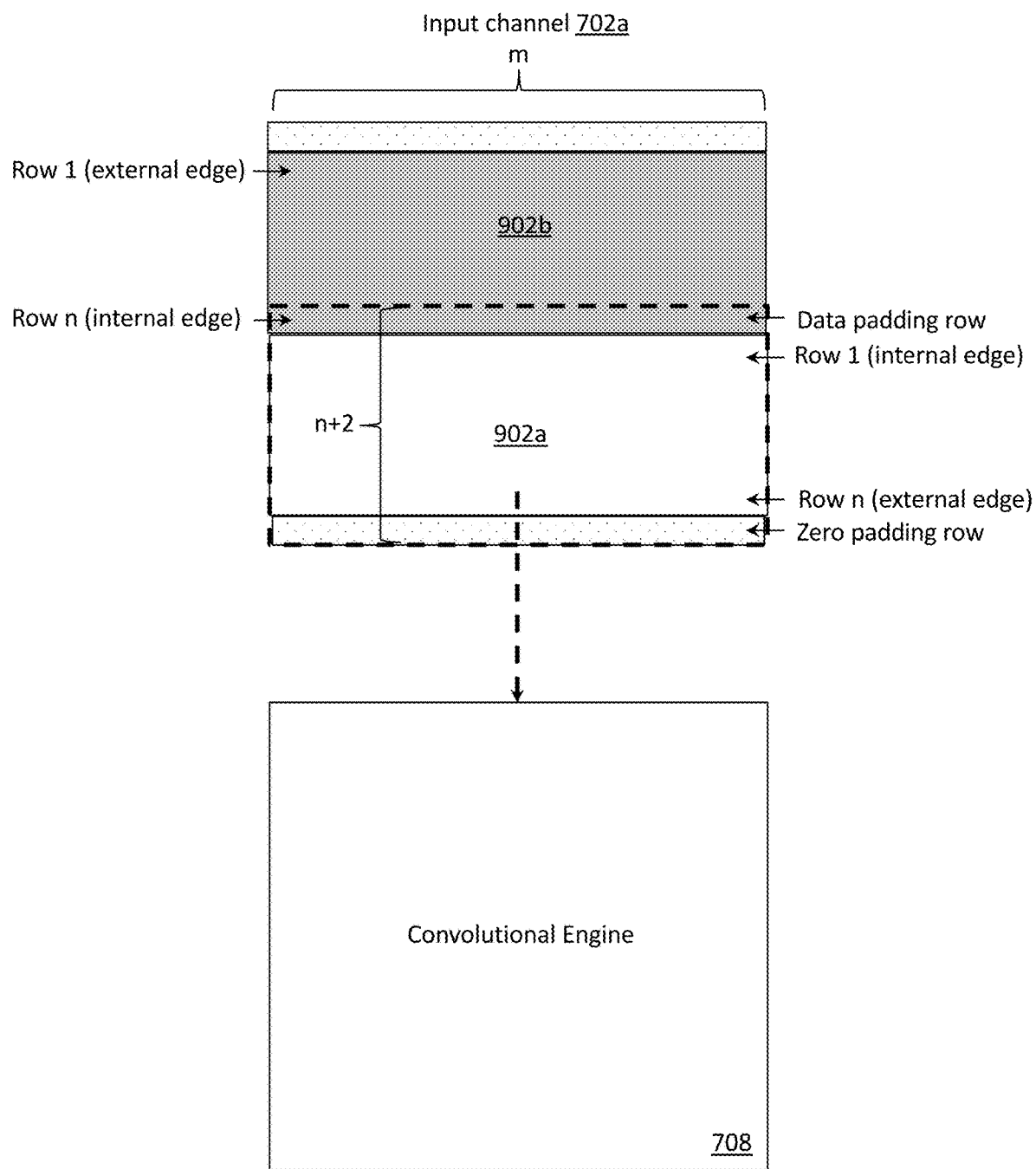
FIGS. 26A-26B depict the loading of data values into the convolutional engine for scenario (a), in accordance with one embodiment of the invention.

FIG. 26A depicts the loading of a zero padding row, horizontal stripe 902a and a data padding row (corresponding to row n of horizontal stripe 902b) into convolutional engine 708. (If not already apparent, the bolded dashed rectangle denotes the portion of input channel 702a being loaded into convolutional engine 708.) More specifically, the zero padding row is first loaded into the 2-D shift register of convolutional engine 708, followed by row n of horizontal stripe 902a, followed by row n−1 of horizontal stripe 902a, . . . followed by row 1 of horizontal stripe 902a, and followed by the data padding row. As described above, each time a row of data storage elements stores row n of a horizontal stripe, the convolver units corresponding to that row of data storage elements are activated. Each time row 1 of a horizontal stripe is shifted out of a row of data storage elements, the convolver units corresponding to that row of data storage elements are de-activated.

Figure 26B:
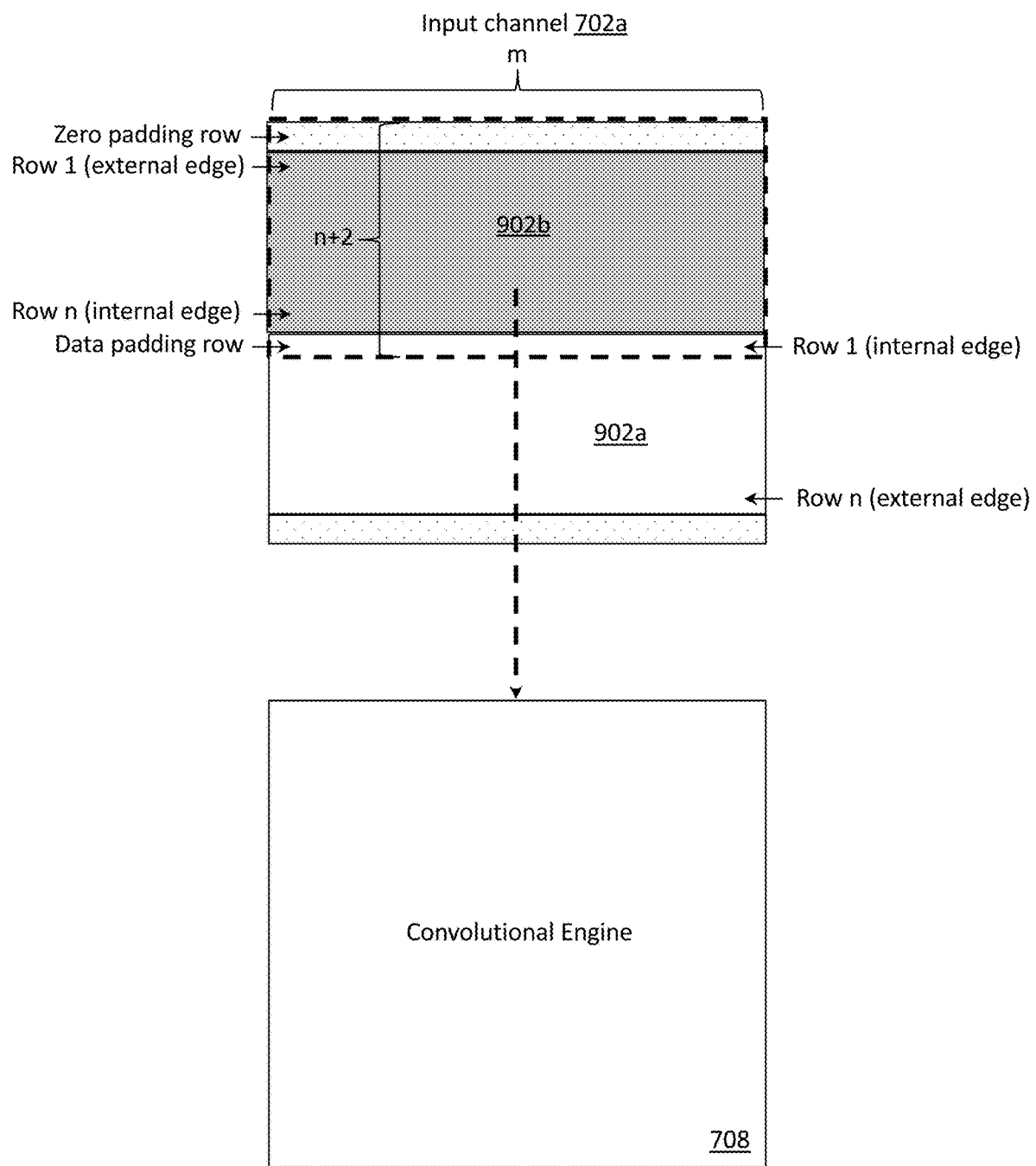

FIG. 26B depicts the loading of one data padding row (corresponding to row 1 of horizontal stripe 902a), horizontal stripe 902b and a zero padding row into convolutional engine 708. More specifically, the data padding row is first loaded into the 2-D shift register of convolutional engine 708, followed by row n of horizontal stripe 902b, followed by row n−1 of horizontal stripe 902b, . . . followed by row 1 of horizontal stripe 902b, and followed by the zero padding row.

While input channel 702a included two horizontal stripes to illustrate the concept of a single "horizontal cut line" through the input data (conceptually located at the boundary of horizontal stripes 902a and 902b), it is understood that an input channel would have more horizontal stripes if there were more horizontal cut lines. For a horizontal stripe that is bordered above and below by other horizontal stripes, the loading of that horizontal stripe would be preceded by a data padding row and followed by another data padding row.

FIGS. 27A-27C illustrate a scenario in which "vertical cut lines" through input channel 702a are needed, and how to handle the vertical cut lines. Generally, a vertical cut line is needed whenever the number of columns of the input channel is greater than the number of columns of the convolver array. The present example discusses the scenario in which the number of columns of the input channel is equal to 3m−4, where m is the number of columns of the convolver array. Whenever the number of columns of the input channel is equal to two more than a multiple of m−2 (as is true in the present example), the convolver array is utilized in an efficient manner (no unused convolver units), but if this relationship does not hold, the concepts described below still apply, but the convolver array will be utilized in a less efficient manner (will have unused convolver units). Further, for the sake of clarity of illustration and explanation, horizontal cut lines, zero padding rows, and data padding rows are not discussed in the example of FIGS. 27A-27C. Nevertheless, it is expected that one of ordinary skill in the art will be able to combine concepts from FIGS. 26A-26B and 27A-27B in order to handle scenarios in which there are both horizontal and vertical cut lines.

In FIG. 27A, input channel 702a is divided into vertical stripes 906a, 906b and 906c. Conceptually, one can imagine a first vertical cut line separating vertical stripe 906a from vertical stripe 906b, and a second vertical cut line separating vertical stripe 906b from 906c. In an efficient use of the convolutional engine, interior vertical stripes (such as 906b) contain m−2 columns, whereas exterior vertical stripes (such as 906a and 906c) contain m−1 columns. FIG. 27A depicts m columns (including the m−1 columns of vertical stripe 906a and one data padding column) being loaded into convolutional engine 708. The right most column of convolver units (which aligns with the data padding column) is non-active, as the output of these convolver units would have produced a convolution output treating the data padding column as an external column (which is not true in the current scenario). The remaining m−1 columns of the convolver units operate in a similar manner as the convolver units that have been previously described.

FIG. 27B depicts m columns (including the m−2 columns of vertical stripe 906b bordered on the right and left sides by a data padding column) being loaded into convolutional engine 708. The left most and right most columns of convolver units (which align with the data padding columns) are non-active, for reasons similar to those provided above.

The remaining m−2 columns of the convolver units operate in a similar manner as the convolver units that have been previously described.

FIG. 27C depicts m columns (including one data padding column and the m−1 columns of vertical stripe 906c) being loaded into convolutional engine 708. The left most column of convolver units (which aligns with the data padding column) is non-active, for reasons similar to those provided above. The remaining m−1 columns of the convolver units operate in a similar manner as the convolver units that have been previously described.

FIG. 28 describes the scenario in which the number of columns of the input channel 702a is equal to m/2, in which m is the number of columns of the convolutional engine. The variable m is assumed to be an even number for the example of FIG. 28, but need not be an even number in general. Whenever the number of columns of the input channel is equal to a divisor of m (as is true in the present example), the convolver array is utilized in an efficient manner (i.e., will have no unused convolver units), but if this relationship does not hold, the concepts described below still apply, but the convolver array will be utilized in a less efficient manner (i.e., will have unused convolver units).

The example of FIG. 28 illustrates the concept of a "vertical cut line" through the convolutional engine 708, in which there is no transfer of data between region 708a (which includes the first half of the "columns" of the convolutional engine) and region 708b (which includes the second half of the "columns" of the convolutional engine). The term column, when used in the context of a convolutional engine, includes a column of the 2-D shift register and the corresponding column of convolutional units. Conceptually, one can imagine a vertical cut line that separates region 708a from region 708b. Region 708a essentially functions independently from region 708b, allowing region 708a to be configured to perform a convolution with a first set of filters (e.g., filters 1 through 10), and region 708b to be configured to perform the convolution with a second set of filters (e.g., filters 11-20). The number of filters (10 in each region) was chosen for clarity of explanation, and it is understood that there could have been a different number of filters in one or both of the two regions. The partitioning of the convolutional engine into independent regions (2 regions in this case, but could be more regions in other cases), allows for an increased throughput for the convolutional engine (in this case a doubling of the throughput).

As a concrete example, suppose that convolutional engine has 14 columns of convolver units. The weights of filter 1 would be loaded in each of convolver units 1-7 of the first row of convolver units, and the weights of filter 11 would be loaded in each of convolver units 8-14 of the first row of convolver units.

To configure convolutional engine 708 to operate with a "vertical cut line", convolver units in the right most column of region 708a have weights $w_3$, $w_6$ and $w_9$ set to zero (regardless of what those weights might be from the filter kernels), and convolver units in the left most column of region 708b have weights $w_1$, $w_4$ and $w_7$ set to zero (regardless of what those weights might be from the filter kernels). Such setting of weights results in the data flow shown in the inset of FIG. 28, in which convolver units in the right most column of region 708a do not receive any data values from its "right neighbors", and the convolver units in the left most column of region 708b do not receive any data values from its "left neighbors".

When input channel 702a is loaded into convolutional engine 708, it is loaded into region 708a row-by-row, and at the same time, it is loaded into region 708b row-by-row. If the propagation of data through convolutional engine 708 could conceptually be viewed as a ticker tape traversing in the vertical direction, there would be one ticker tape traversing down region 708a, and there would be a mirror image of that ticker tape traversing down region 708b.

While FIG. 28 illustrated an example with one vertical cut line through the convolutional engine, it should be apparent how a convolutional engine could be modified to have multiple vertical cut lines. Further, for the sake of clarity of illustration and explanation, horizontal cut lines, zero padding rows, and data padding rows are not discussed in the example of FIG. 28. Nevertheless, it is expected that one of ordinary skill in the art will be able to combine concepts from FIGS. 26A-26B and 28 together to handle scenarios in which there are both horizontal and vertical cut lines.

FIGS. 29A-29B illustrate another scheme for handling the scenario in which the number of columns of the input channel 702a is equal to m/2, in which m is the number of columns of convolutional engine 708. The scheme involves combining the concept of a horizontal cut line through the input data (described in FIGS. 26A-26B) and the concept of a vertical cut line through the convolver array (described in FIG. 28). In the FIGS. 26A-26B, the two horizontal stripes were processed one after another (i.e., serially). However, in the example of FIGS. 29A-29B, the horizontal stripes 908a and 908b are processed in parallel, with horizontal stripe 908a processed in region 708a, and horizontal stripe 908b processed in region 708b. The same filters are populated in regions 708a and 708b, in contrast to the scheme of FIG. 28.

Since there are several overlapping rectangles in FIG. 29A, the scheme is conceptually redrawn in FIG. 29B, which more clearly shows the data loaded into region 708a and region 708b. If not already apparent, it is noted that row 1 of horizontal stripe 908a is identical to the data padding row that precedes horizontal stripe 908b, and the data padding row that follows horizontal stripe 908a is identical to row n of horizontal stripe 908b.

Similar to the scheme of FIG. 28, the scheme of FIGS. 29A-29B also has the effect of doubling the throughput. At this point, since there are two possible schemes for handling the m/2 scenario, one might wonder which scheme is preferable. One consideration between the scheme of FIG. 28 and the scheme of FIGS. 29A-29B is the number of filters versus the number of rows of the input channel. If there are many more filters than the number of rows of the input channel, then the scheme of FIG. 28 might be preferred, whereas if there are many more rows of the input channel than the number of filters, then the scheme of FIGS. 29A-29B might be preferred. Intuitively, the former case would be analogous to a long skinny column of filters, in which it would be advantageous to cut the long skinny column of filters in half (place one half in region 708a and the other half in region 708b), whereas the latter case would be analogous to a long skinny column of input data, in which it would be advantageous to cut the long skinny column of input data in half and process the two halves of input data in parallel.

Other considerations for favoring one scheme over the another might also include the number of filters relative to the number of rows of convolver units. If the number of filters were less than the number of rows of convolver units, then the scheme of FIG. 29A-29B might be preferred, whereas if the number of filters were more than the number of rows of convolver units, then the scheme of FIG. 28 might be preferred.

FIG. 30 depicts convolutional engine 708 as one component of system 3000, in accordance with one embodiment of the invention. System 3000 may include memory 3002, shift and format module 3004, convolutional engine 708 and controller 3006.

Memory 3002 may be implemented using static random-access memory (SRAM), and may store input data 702, and the output of the convolutional engine 708 (e.g., convolution output, max pool output, rectified output, etc.).

Shift and format module 3004 is an interface between memory 3002 and convolutional engine 708 and is configured to shift and format the data. For instance, in the example of FIG. 29A, providing horizontal stripe 908*b* to region 708*b* of the convolutional engine would be one task performed by shift and format module 3004. Achieving a stride of ½ (or a stride less than one) could also involve shift and format module 3004, in which the above-described interpolation could be performed by the shift and format module 3004.

In the embodiment of FIG. 30, convolutional engine 708 contains a more typical number of data storage elements and convolver units. FIG. 30 depicts a convolutional engine with a 64 by 256 array of convolver units 806 and a 66 by 256 array of data storage elements configured as a 2-D shift register. Similar to the previously-described embodiments, the first row of convolver units logically corresponds with the second row of data storage elements, and the last row of convolver units logically corresponds with the second to last row of data storage elements.

Controller 3006 may be responsible for performing many of the above-described control operations. For example, controller 3006 may provide the control signals that set convolver units to be active and non-active (and hence, the above-described controller 2202 may be part of controller 3006). Controller 3006 may be responsible for providing control signal s1 (described in FIGS. 21 and 24) for controlling the output of output selectors 2106 and 2406. Controller 3006 may be responsible for providing control signal s2 (described in FIG. 24) for controlling whether a functional unit is programmed to output a convolution output or a max pool output. Controller 3006 may logically partition an input channel into horizontal stripes, and/or vertical stripes (more appropriately called chunks when there are vertical and horizontal cut lines) based on the dimensions of the input channel relative to the dimensions of the convolver array. Controller 3006 may control shift and format module 3004 to perform the necessary shift and format operations. Controller 3006 may determine which weights are to be loaded to which convolutional units. Controller 3006 may determine whether to override filter weights with zero values in order to logically partition the convolutional engine into multiple independent regions (as depicted in FIGS. 28, 29A and 29B). Controller 3006 may also contain the logic that determines, for the loading of a horizontal stripe into the convolutional engine, whether the horizontal stripe is to be preceded by a zero padding row or a data padding row, or whether the horizontal stripe is to be followed by a zero padding row or a data padding row. These are merely some examples of the functions that may be performed by controller 3006.

Figure 31:
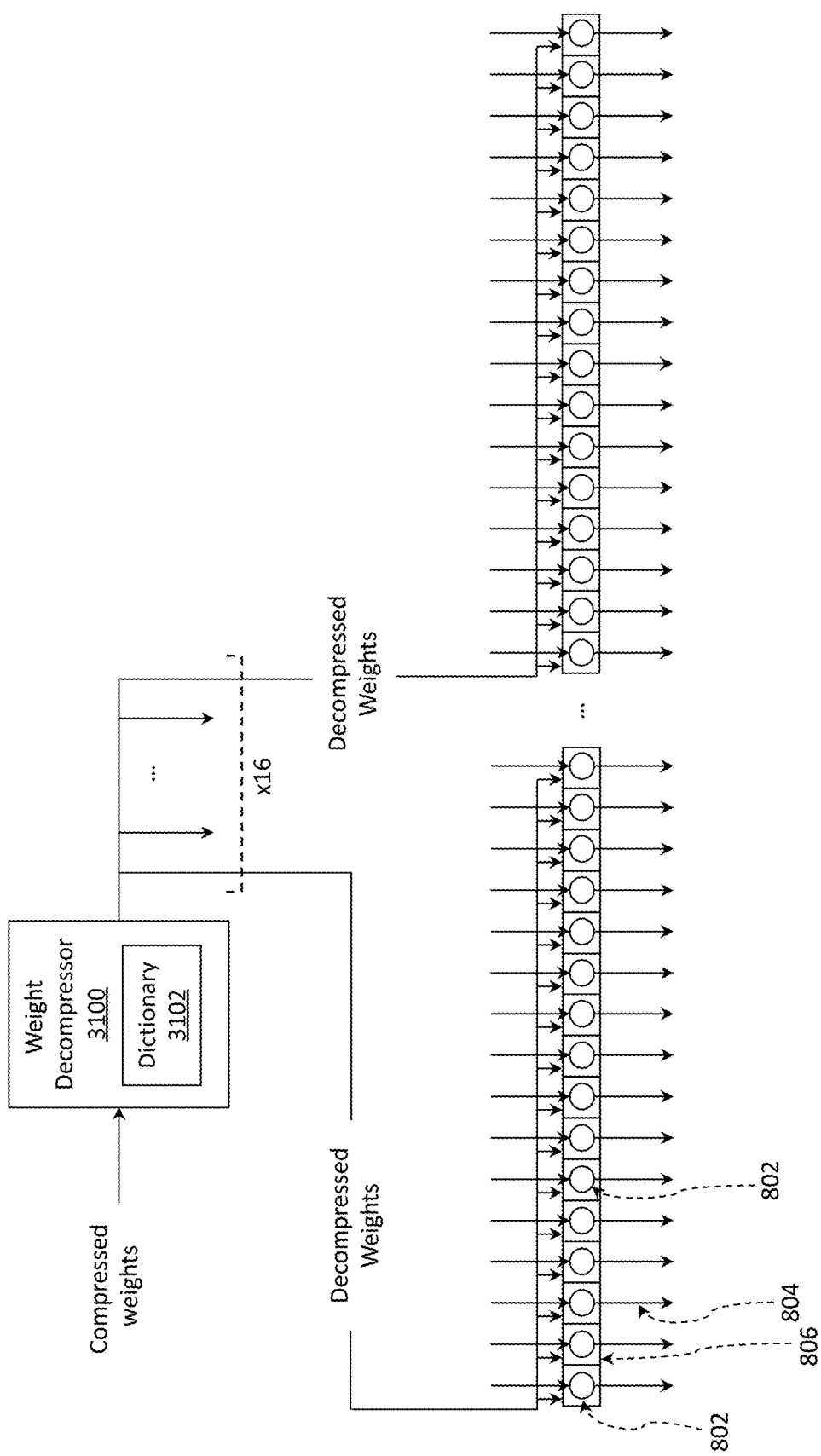
FIG. 31 depicts a block diagram of a component for decompressing filter weights before the weights are provided to the convolver units, in accordance with one embodiment of the invention.

FIG. 31 depicts a block diagram of weight decompressor 3100 for decompressing filter weights before the weights are provided to the convolver units, in accordance with one embodiment of the invention. Weight decompressor 3100 may utilize dictionary 3102 to decompress weights. In one embodiment, compressed weights are keys to a look-up table (an embodiment of the dictionary), and the records corresponding to the keys in the look-up table are the decompressed weights. The 256 convolver units may be logically and/or physically grouped into 16 groups, each group including 16 convolver units. The decompressed weights may be provided to each of the 16 groups of convolver units.

Thus, an efficient convolutional engine has been described. In one embodiment, the convolutional engine includes a two-dimensional shift register having a three by four array of data storage elements:

$$\begin{bmatrix} d_{1,1} & d_{1,2} & d_{1,3} & d_{1,4} \\ d_{2,1} & d_{2,2} & d_{2,3} & d_{2,4} \\ d_{3,1} & d_{3,2} & d_{3,3} & d_{3,4} \end{bmatrix}$$

wherein, at a first moment in time,
data storage element $d_{1,1}$ stores data value $x_{1,1}$,
data storage element $d_{1,2}$ stores data value $x_{1,2}$,
data storage element $d_{1,3}$ stores data value $x_{1,3}$,
data storage element $d_{1,4}$ stores data value $x_{1,4}$,
data storage element $d_{2,1}$ stores data value $x_{2,1}$,
data storage element $d_{2,2}$ stores data value $x_{2,2}$,
data storage element $d_{2,3}$ stores data value $x_{2,3}$,
data storage element $d_{2,4}$ stores data value $x_{2,4}$,
data storage element $d_{3,1}$ stores data value $x_{3,1}$,
data storage element $d_{3,2}$ stores data value $x_{3,2}$,
data storage element $d_{3,3}$ stores data value $x_{3,3}$, and
data storage element $d_{3,4}$ stores data value $x_{3,4}$.

The convolutional engine further includes a first convolver unit having a first plurality of multipliers, $m_{1,1}^1$, $m_{1,2}^1$, $m_{1,3}^1$, $m_{2,1}^1$, $m_{2,2}^1$, $m_{2,3}^1$, $m_{3,1}^1$, $m_{3,2}^1$, and $m_{3,3}^1$, wherein:

multiplier $m_{1,1}^1$ is electrically coupled to data storage element $d_{1,1}$, and is configured to multiply data value $x_{1,1}$ with weight $w_1$ so as to generate a product $w_1 x_{1,1}$, multiplier $m_{1,2}^1$ is electrically coupled to data storage element $d_{1,2}$, and is configured to multiply data value $x_{1,2}$ with weight $w_2$ so as to generate a product $w_2 x_{1,2}$, multiplier $m_{1,3}^1$ is electrically coupled to data storage element $d_{1,3}$, and is configured to multiply data value $x_{1,3}$ with weight $w_3$ so as to generate a product $w_3 x_{1,3}$, multiplier $m_{2,1}^1$ is electrically coupled to data storage element $d_{2,1}$, and is configured to multiply data value $x_{2,1}$ with weight $w_4$ so as to generate a product $w_4 x_{2,1}$, multiplier $m_{2,2}^1$ is electrically coupled to data storage element $d_{2,2}$, and is configured to multiply data value $x_{2,2}$ with weight $w_5$ so as to generate a product $w_5 x_{2,2}$, multiplier $m_{2,3}^1$ is electrically coupled to data storage element $d_{2,3}$, and is configured to multiply data value $x_{2,3}$ with weight $w_6$ so as to generate a product $w_6 x_{2,3}$, multiplier $m_{3,1}^1$ is electrically coupled to data storage element $d_{3,1}$, and is configured to multiply data value $x_{3,1}$ with weight $w_7$ so as to generate a product $w_7 x_{3,1}$, multiplier $m_{3,2}^1$ is electrically coupled to data storage element $d_{3,2}$, and is configured to multiply data value $x_{3,2}$ with weight $w_8$ so as to generate a product $w_8 x_{3,2}$, and multiplier $m_{3,3}^1$ is electrically coupled to data storage element $d_{3,3}$, and is configured to multiply data value $x_{3,3}$ with weight $w_9$ so as to generate a product $w_9 x_{3,3}$.

The convolutional engine further includes a second convolver unit comprising a second plurality of multipliers, $m_{1,1}^2$, $m_{1,2}^2$, $m_{1,3}^2$, $m_{2,1}^2$, $m_{2,3}^2$, $m_{3,1}^2$, $m_{3,2}^2$, and $m_{3,3}^2$, wherein:

multiplier $m_{1,1}^2$ is electrically coupled to data storage element $d_{1,2}$, and is configured to multiply data value $x_{1,2}$ with weight $w_1$ so as to generate a product $w_1 x_{1,2}$,
multiplier $m_{1,2}^2$ is electrically coupled to data storage element $d_{1,3}$, and is configured to multiply data value $x_{1,3}$ with weight $w_2$ so as to generate a product $w_2 x_{1,3}$,
multiplier $m_{1,3}^2$ is electrically coupled to data storage element $d_{1,4}$, and is configured to multiply data value $x_{1,4}$ with weight $w_3$ so as to generate a product $w_3 x_{1,4}$,
multiplier $m_{2,1}^2$ is electrically coupled to data storage element $d_{2,2}$, and is configured to multiply data value $x_{2,2}$ with weight $w_4$ so as to generate a product $w_4 x_{2,2}$,
multiplier $m_{2,2}^2$ is electrically coupled to data storage element $d_{2,3}$, and is configured to multiply data value $x_{2,3}$ with weight $w_5$ so as to generate a product $w_5 x_{2,3}$,
multiplier $m_{2,3}^2$ is electrically coupled to data storage element $d_{2,4}$, and is configured to multiply data value $x_{2,4}$ with weight $w_6$ so as to generate a product $w_6 x_{2,4}$,
multiplier $m_{3,1}^2$ is electrically coupled to data storage element $d_{3,2}$, and is configured to multiply data value $x_{3,2}$ with weight $w_7$ so as to generate a product $w_7 x_{3,2}$,
multiplier $m_{3,2}^2$ is electrically coupled to data storage element $d_{3,3}$, and is configured to multiply data value $x_{3,3}$ with weight $w_8$ so as to generate a product $w_8 x_{3,3}$, and
multiplier $m_{3,3}^2$ is electrically coupled to data storage element $d_{3,4}$, and is configured to multiply data value $x_{3,4}$ with weight $w_9$ so as to generate a product $w_9 x_{3,4}$.

In various embodiments, the first convolver unit may be configured to generate a sum of terms, the terms including at least the product $w_1 x_{1,1}$, the product $w_2 x_{1,2}$, the product $w_3 x_{1,3}$, the product $w_4 x_{2,1}$, the product $w_5 x_{2,2}$, the product $w_6 x_{2,3}$, the product $w_7 x_{3,1}$, the product $w_8 x_{3,2}$, the product $w_9 x_{3,3}$ and $b_1$, wherein $b_1$ is a bias value. Further, the second convolver unit may be configured to compute a sum of terms, the terms including at least the product $w_1 x_{1,2}$, the product $w_2 x_{1,3}$, the product $w_3 x_{1,4}$, the product $w_4 x_{2,2}$, the product $w_5 x_{2,3}$, the product $w_6 x_{2,4}$, the product $w_7 x_{3,2}$, the product $w_8 x_{3,3}$, the product $w_9 x_{3,4}$ and $b_1$, wherein $b_1$ is a bias value.

In some instances:
data storage element $d_{1,1}$ is electrically coupled to data storage element $d_{2,1}$,
data storage element $d_{2,1}$ is electrically coupled to data storage element $d_{3,1}$,
data storage element $d_{1,2}$ is electrically coupled to data storage element $d_{2,2}$,
data storage element $d_{2,2}$ is electrically coupled to data storage element $d_{3,2}$,
data storage element $d_{1,3}$ is electrically coupled to data storage element $d_{2,3}$,
data storage element $d_{2,3}$ is electrically coupled to data storage element $d_{3,3}$,
data storage element $d_{1,4}$ is electrically coupled to data storage element $d_{2,4}$, and
data storage element $d_{2,4}$ is electrically coupled to data storage element $d_{3,4}$.

Further embodiments of the invention provide an apparatus, that includes a two-dimensional shift register having a four by four array of data storage elements:

$$\begin{bmatrix} d_{1,1} & d_{1,2} & d_{1,3} & d_{1,4} \\ d_{2,1} & d_{2,2} & d_{2,3} & d_{2,4} \\ d_{3,1} & d_{3,2} & d_{3,3} & d_{3,4} \\ d_{4,1} & d_{4,2} & d_{4,3} & d_{4,4} \end{bmatrix}$$

wherein, at a first moment in time,
data storage element $d_{1,1}$ stores data value $x_{1,1}$,
data storage element $d_{1,2}$ stores data value $x_{1,2}$,
data storage element $d_{1,3}$ stores data value $x_{1,3}$,
data storage element $d_{1,4}$ stores data value $x_{1,4}$,
data storage element $d_{2,1}$ stores data value $x_{2,1}$,
data storage element $d_{2,2}$ stores data value $x_{2,2}$,
data storage element $d_{2,3}$ stores data value $x_{2,3}$,
data storage element $d_{2,4}$ stores data value $x_{2,4}$,
data storage element $d_{3,1}$ stores data value $x_{3,1}$,
data storage element $d_{3,2}$ stores data value $x_{3,2}$,
data storage element $d_{3,3}$ stores data value $x_{3,3}$,
data storage element $d_{3,4}$ stores data value $x_{3,4}$,
data storage element $d_{4,1}$ stores data value $x_{4,1}$,
data storage element $d_{4,2}$ stores data value $x_{4,2}$,
data storage element $d_{4,3}$ stores data value $x_{4,3}$, and
data storage element $d_{4,4}$ stores data value $x_{4,4}$.

The apparatus also includes a first convolver unit comprising a first plurality of multipliers, $m_{1,1}^1$, $m_{1,2}^1$, $m_{1,3}^1$, $m_{2,1}^1$, $m_{2,2}^1$, $m_{2,3}^1$, $m_{3,1}^1$, $m_{3,2}^1$, and $m_{3,3}^1$, wherein:
multiplier $m_{1,1}^1$ is electrically coupled to data storage element $d_{1,1}$, and is configured to multiply data value $x_{1,1}$ with weight $w_1$ so as to generate a product $w_1 x_{1,1}$,
multiplier $m_{1,2}^1$ is electrically coupled to data storage element $d_{1,2}$, and is configured to multiply data value $x_{1,2}$ with weight $w_2$ so as to generate a product $w_2 x_{1,2}$,
multiplier $m_{1,3}^1$ is electrically coupled to data storage element $d_{1,3}$, and is configured to multiply data value $x_{1,3}$ with weight $w_3$ so as to generate a product $w_3 x_{1,3}$,
multiplier $m_{2,1}^1$ is electrically coupled to data storage element $d_{2,1}$, and is configured to multiply data value $x_{2,1}$ with weight $w_4$ so as to generate a product $w_4 x_{2,1}$,
multiplier $m_{2,2}^1$ is electrically coupled to data storage element $d_{2,2}$, and is configured to multiply data value $x_{2,2}$ with weight $w_5$ so as to generate a product $w_5 x_{2,2}$,
multiplier $m_{2,3}^1$ is electrically coupled to data storage element $d_{2,3}$, and is configured to multiply data value $x_{2,3}$ with weight $w_6$ so as to generate a product $w_6 x_{2,3}$,
multiplier $m_{3,1}^1$ is electrically coupled to data storage element $d_{3,1}$, and is configured to multiply data value $x_{3,1}$ with weight $w_7$ so as to generate a product $w_7 x_{3,1}$,
multiplier $m_{3,2}^1$ is electrically coupled to data storage element $d_{3,2}$, and is configured to multiply data value $x_{3,2}$ with weight $w_8$ so as to generate a product $w_8 x_{3,2}$, and
multiplier $m_{3,3}^1$ is electrically coupled to data storage element $d_{3,3}$, and is configured to multiply data value $x_{3,3}$ with weight $w_9$ so as to generate a product $w_9 x_{3,3}$.

The apparatus also includes a second convolver unit comprising a second plurality of multipliers, $m_{1,1}^2$, $m_{1,2}^2$, $m_{1,3}^2$, $m_{2,1}^2$, $m_{2,2}^2$, $m_{2,3}^2$, $m_{3,1}^2$, $m_{2,2}^2$, and $m_{2,3}^2$, wherein:
multiplier $m_{1,1}^2$ is electrically coupled to data storage element $d_{1,2}$, and is configured to multiply data value $x_{1,2}$ with weight $w_1$ so as to generate a product $w_1 x_{1,2}$,
multiplier $m_{1,2}^2$ is electrically coupled to data storage element $d_{1,3}$, and is configured to multiply data value $x_{1,3}$ with weight $w_2$ so as to generate a product $w_2 x_{1,3}$,
multiplier $m_{1,3}^2$ is electrically coupled to data storage element $d_{1,4}$, and is configured to multiply data value $x_{1,4}$ with weight $w_3$ so as to generate a product $w_3 x_{1,4}$,
multiplier $m_{2,1}^2$ is electrically coupled to data storage element $d_{2,2}$, and is configured to multiply data value $x_{2,2}$ with weight $w_4$ so as to generate a product $w_4 x_{2,2}$,
multiplier $m_{2,2}^2$ is electrically coupled to data storage element $d_{2,3}$, and is configured to multiply data value $x_{2,3}$ with weight $w_5$ so as to generate a product $w_5 x_{2,3}$, multiplier $m_{2,3}^2$ is electrically coupled to data storage element $d_{2,4}$, and is configured to multiply data value $x_{2,4}$ with weight $w_6$ so as to generate a product $w_6 x_{2,4}$, multiplier $m_{3,1}^2$ is electrically coupled to data storage element $d_{3,2}$, and is configured to multiply data value $x_{3,2}$ with weight $w_7$ so as to generate a product $w_7 x_{3,2}$, multiplier $m_{3,2}^2$ is electrically coupled to data storage element $d_{3,3}$, and is configured to multiply data value $x_{3,3}$ with weight $w_8$ so as to generate a product $w_8 x_{3,3}$, and multiplier $m_{3,3}^2$ is electrically coupled to data storage element $d_{3,4}$, and is configured to multiply data value $x_{3,4}$ with weight $w_9$ so as to generate a product $w_9 x_{3,4}$, a third convolver unit comprising a third plurality of multipliers, $m_{1,1}^3$, $m_{1,2}^3$, $m_{1,3}^3$, $m_{2,1}^3$, $m_{2,2}^3$, $m_{2,3}^3$, $m_{3,1}^3$, $m_{3,2}^2$, and $m_{3,3}^3$, wherein:

multiplier $m_{1,1}^3$ is electrically coupled to data storage element $d_{2,1}$, and is configured to multiply data value $x_{2,1}$ with weight $w_{10}$ so as to generate a product $w_{10} x_{2,1}$, multiplier $m_{1,2}^3$ is electrically coupled to data storage element $d_{2,2}$, and is configured to multiply data value $x_{2,2}$ with weight $w_{11}$ so as to generate a product $w_{11} x_{2,2}$, multiplier $m_{1,3}^3$ is electrically coupled to data storage element $d_{2,3}$, and is configured to multiply data value $x_{2,3}$ with weight $w_{12}$ so as to generate a product $w_{12} x_{2,3}$, multiplier $m_{2,1}^3$ is electrically coupled to data storage element $d_{3,1}$, and is configured to multiply data value $x_{3,1}$ with weight $w_{13}$ so as to generate a product $w_{13} x_{3,1}$, multiplier $m_{2,2}^3$ is electrically coupled to data storage element $d_{3,2}$, and is configured to multiply data value $x_{3,2}$ with weight $w_{14}$ so as to generate a product $w_{14} x_{3,2}$, multiplier $m_{2,3}^3$ is electrically coupled to data storage element $d_{3,3}$, and is configured to multiply data value $x_{3,3}$ with weight $w_{15}$ so as to generate a product $w_{15} x_{3,3}$, multiplier $m_{3,1}^3$ is electrically coupled to data storage element $d_{4,1}$, and is configured to multiply data value $x_{4,1}$ with weight $w_{16}$ so as to generate a product $w_{16} x_{4,1}$, multiplier $m_{3,2}^3$ is electrically coupled to data storage element $d_{4,2}$, and is configured to multiply data value $x_{4,2}$ with weight $w_{17}$ so as to generate a product $w_{17} x_{4,2}$, and multiplier $m_{3,3}^3$ is electrically coupled to data storage element $d_{4,3}$, and is configured to multiply data value $x_{4,3}$ with weight $w_{18}$ so as to generate a product $w_{18} x_{4,3}$.

And the apparatus includes a fourth convolver unit comprising a fourth plurality of multipliers, $m_{1,1}^4$, $m_{1,2}^4$, $m_{1,3}^4$, $m_{2,1}^4$, $m_{2,2}^4$, $m_{2,3}^4$, $m_{3,1}^4$, $m_{3,2}^4$, and $m_{3,3}^4$, wherein:

multiplier $m_{1,1}^4$ is electrically coupled to data storage element $d_{2,2}$, and is configured to multiply data value $x_{2,2}$ with weight $w_{10}$ so as to generate a product $w_{10} x_{2,2}$, multiplier $m_{1,2}^4$ is electrically coupled to data storage element $d_{2,3}$, and is configured to multiply data value $x_{2,3}$ with weight $w_{11}$ so as to generate a product $w_{11} x_{2,3}$, multiplier $m_{1,3}^4$ is electrically coupled to data storage element $d_{2,4}$, and is configured to multiply data value $x_{2,4}$ with weight $w_{12}$ so as to generate a product $w_{12} x_{2,4}$, multiplier $m_{2,1}^4$ is electrically coupled to data storage element $d_{3,2}$, and is configured to multiply data value $x_{3,2}$ with weight $w_{13}$ so as to generate a product $w_{13} x_{3,2}$, multiplier $m_{2,2}^4$ is electrically coupled to data storage element $d_{3,3}$, and is configured to multiply data value $x_{3,3}$ with weight $w_{14}$ so as to generate a product $w_{14} x_{3,3}$, multiplier $m_{2,3}^4$ is electrically coupled to data storage element $d_{3,4}$, and is configured to multiply data value $x_{3,4}$ with weight $w_{15}$ so as to generate a product $w_{15} x_{3,4}$, multiplier $m_{3,1}^4$ is electrically coupled to data storage element $d_{4,2}$, and is configured to multiply data value $x_{4,2}$ with weight $w_{16}$ so as to generate a product $w_{16} x_{4,2}$, multiplier $m_{3,2}^4$ is electrically coupled to data storage element $d_{4,3}$, and is configured to multiply data value $x_{4,3}$ with weight $w_{17}$ so as to generate a product $w_{17} x_{4,3}$, and multiplier $m_{3,3}^4$ is electrically coupled to data storage element $d_{4,4}$, and is configured to multiply data value $x_{4,4}$ with weight $w_{18}$ so as to generate a product $w_{18} x_{4,4}$.

In some embodiments, the first convolver unit of this apparatus may be configured to generate a sum of terms, the terms including at least the product $w_1 x_{1,1}$, the product $w_2 x_{1,2}$, the product $w_3 x_{1,3}$, the product $w_4 x_{2,1}$, the product $w_5 x_{2,2}$, the product $w_6 x_{2,3}$, the product $w_7 x_{3,1}$, the product $w_8 x_{3,2}$, the product $w_9 x_{3,3}$ and $b_1$, wherein $b_1$ is a bias value. Also, the second convolver unit may be configured to compute a sum of terms, the terms including at least the product $w_1 x_{1,2}$, the product $w_2 x_{1,3}$, the product $w_3 x_{1,4}$, the product $w_4 x_{2,2}$, the product $w_5 x_{2,3}$, the product $w_6 x_{2,4}$, the product $w_7 x_{3,2}$, the product $w_8 x_{3,3}$, the product $w_9 x_{3,4}$ and $b_1$, wherein $b_1$ is a bias value.

In still further embodiments, the third convolver unit may be configured to generate a sum of terms, the terms including at least the product $w_{10} x_{2,1}$, the product $w_{11} x_{2,2}$, the product $w_{12} x_{2,3}$, the product $w_{13} x_{3,1}$, the product $w_{14} x_{3,2}$, the product $w_{15} x_{3,3}$, the product $w_{16} x_{4,1}$, the product $w_{17} x_{4,2}$, the product $w_{18} x_{4,3}$ and $b_2$, wherein $b_2$ is a bias value. Also, the fourth convolver unit may be configured to compute a sum of terms, the terms including at least the product $w_{10} x_{2,2}$, the product $w_{11} x_{2,3}$, the product $w_{12} x_{2,4}$, the product $w_{13} x_{3,2}$, the product $w_{14} x_{3,3}$, the product $w_{15} x_{3,4}$, the product $w_{16} x_{4,2}$, the product $w_{17} x_{4,3}$, the product $w_{18} x_{4,4}$ and $b_2$, wherein $b_2$ is a bias value.

In various embodiments:

data storage element $d_{1,1}$ is electrically coupled to data storage element $d_{2,1}$, data storage element $d_{2,1}$ is electrically coupled to data storage element $d_{3,1}$, data storage element $d_{3,1}$ is electrically coupled to data storage element $d_{4,1}$, data storage element $d_{1,2}$ is electrically coupled to data storage element $d_{2,2}$, data storage element $d_{2,2}$ is electrically coupled to data storage element $d_{3,2}$, data storage element $d_{3,2}$ is electrically coupled to data storage element $d_{4,2}$, data storage element $d_{1,3}$ is electrically coupled to data storage element $d_{2,3}$, data storage element $d_{2,3}$ is electrically coupled to data storage element $d_{3,3}$, data storage element $d_{3,3}$ is electrically coupled to data storage element $d_{4,3}$, data storage element $d_{1,4}$ is electrically coupled to data storage element $d_{2,4}$, data storage element $d_{2,4}$ is electrically coupled to data storage element $d_{3,4}$, and data storage element $d_{3,4}$ is electrically coupled to data storage element $d_{4,4}$.

Still another embodiment of the invention provides an apparatus that includes a two-dimensional synchronous shift register comprising a p by q array of data storage elements:

$$\begin{bmatrix} d_{1,1} & \cdots & d_{1,q} \\ \vdots & \ddots & \vdots \\ d_{p,1} & \cdots & d_{p,q} \end{bmatrix}$$

wherein a first row of data storage elements $d_{1,1}, \ldots, d_{1,q}$ receives q data values on each clock cycle and each row of data storage elements $d_{k,1}, \ldots, d_{k,q}$ receives q data values from a previous row of data storage elements $d_{k-1,1}, \ldots, d_{k-1,q}$ on each clock cycle, for $1 < k \leq p$; and a convolver array configured to process the data values stored in the two-dimensional synchronous shift register, wherein the convolver array comprises a p–2 by q array of convolver units, wherein for convolver units $CU_{i,j}$, $1 \leq i \leq p-2$ and $2 \leq j \leq q-1$:

(i) a first input of $CU_{i,j}$ is electrically coupled to data storage element $d_{i,j-1}$,
(ii) a second input of $CU_{i,j}$ is electrically coupled to data storage element $d_{i+1,j-1}$,
(iii) a third input of $CU_{i,j}$ is electrically coupled to data storage element $d_{i+2,j-1}$,
(iv) a fourth input of $CU_{i,j}$ is electrically coupled to data storage element $d_{i,j}$,
(v) a fifth input of $CU_{i,j}$ is electrically coupled to data storage element $d_{i+1,j}$,
(vi) a sixth input of $CU_{i,j}$ is electrically coupled to data storage element $d_{i+2,j}$,
(vii) a seventh input of $CU_{i,j}$ is electrically coupled to data storage element $d_{i,j+1}$,
(viii) an eighth input of $CU_{i,j}$ is electrically coupled to data storage element $d_{i+1,j+1}$, and
(ix) a ninth input of $CU_{i,j}$ is electrically coupled to data storage element $d_{i+2,j+1}$.

In some embodiments, for convolver units $CU_{i,1}$, $1 \leq i \leq p-2$, (i) at least one of a first input of $CU_{i,1}$ or a weight associated with the first input is set to logical zero,
(ii) at least one of a second input of $CU_{i,1}$ or a weight associated with the second input is set to logical zero,
(iii) at least one of a third input of $CU_{i,1}$ or a weight associated with the third input is set to logical zero,
(iv) a fourth input of $CU_{i,1}$ is electrically coupled to data storage element $d_{i,1}$,
(v) a fifth input of $CU_{i,1}$ is electrically coupled to data storage element $d_{i+1,1}$,
(vi) a sixth input of $CU_{i,1}$ is electrically coupled to data storage element $d_{i+2,1}$,
(vii) a seventh input of $CU_{i,1}$ is electrically coupled to data storage element $d_{i,2}$,
(viii) an eighth input of $CU_{i,1}$ is electrically coupled to data storage element $d_{i+1,2}$, and
(ix) a ninth input of $CU_{i,1}$ is electrically coupled to data storage element $d_{i+2,2}$.

Further, in some embodiments, for convolver units $CU_{i,q}$, $1 \leq i \leq p-2$, (i) a first input of $CU_{i,q}$ is electrically coupled to data storage element $d_{i,q-1}$,
(ii) a second input of $CU_{i,q}$ is electrically coupled to data storage element $d_{i+1,q-1}$,
(iii) a third input of $CU_{i,q}$ is electrically coupled to data storage element $d_{i+2,q-1}$,
(iv) a fourth input of $CU_{i,q}$ is electrically coupled to data storage element $d_{i,q}$,
(v) a fifth input of $CU_{i,q}$ is electrically coupled to data storage element $d_{j+1,q}$,
(vi) a sixth input of $CU_{i,q}$ is electrically coupled to data storage element $d_{i+2,q}$,
(vii) at least one of a seventh input of $CU_{i,q}$ or a weight associated with the seventh input is set to logical zero,
(viii) at least one of an eighth input of $CU_{i,q}$ or a weight associated with the eighth input is set to logical zero, and
(ix) at least one of a ninth input of $CU_{i,q}$ or a weight associated with the ninth input is set to logical zero.

It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An apparatus, comprising:
a two-dimensional synchronous shift register comprising a three by three array of data storage elements:

$$\begin{bmatrix} d_{1,1} & d_{1,2} & d_{1,3} \\ d_{2,1} & d_{2,2} & d_{2,3} \\ d_{3,1} & d_{3,2} & d_{3,3} \end{bmatrix}$$

wherein:
data storage element $d_{1,1}$ is electrically coupled to data storage element $d_{2,1}$,
data storage element $d_{2,1}$ is electrically coupled to data storage element $d_{3,1}$,
data storage element $d_{1,2}$ is electrically coupled to data storage element $d_{2,2}$,
data storage element $d_{2,2}$ is electrically coupled to data storage element $d_{3,2}$,
data storage element $d_{1,3}$ is electrically coupled to data storage element $d_{2,3}$, and
data storage element $d_{23}$ is electrically coupled to data storage element $d_{3,3}$,
a first convolver unit comprising a first plurality of multipliers, $m_{1,1}^1$, $m_{1,2}^1$, $m_{1,3}^1$, $m_{2,1}^1$, $m_{2,2}^1$, $m_{2,3}^1$, $m_{3,1}^1$, $m_{3,2}^1$, and $m_{3,3}^1$, wherein:
multiplier $m_{1,1}^1$ is electrically coupled in a permanent manner to data storage element $d_{1,1}$,
multiplier $m_{1,2}^1$ is electrically coupled in a permanent manner to data storage element $d_{1,2}$,
multiplier $m_{1,3}^1$ is electrically coupled in a permanent manner to data storage element $d_{1,3}$,
multiplier $m_{1,3}^1$ is electrically coupled in a permanent manner to data storage element $d_{2,1}$,
multiplier $m_{2,2}^1$ is electrically coupled in a permanent manner to data storage element $d_{2,2}$,
multiplier $m_{2,3}^1$ is electrically coupled in a permanent manner to data storage element $d_{2,3}$,
multiplier $m_{3,1}$ is electrically coupled in a permanent manner to data storage element $d_{3,1}$,
multiplier $m_{3,2}^1$ is electrically coupled in a permanent manner to data storage element $d_{3,2}$, and
multiplier $m_{3,3}^1$ is electrically coupled in a permanent manner to data storage element $d_{3,3}$; and
a second convolver unit comprising a second plurality of multipliers, $m_{1,1}^2$, $m_{1,2}^2$, $m_{1,3}^2$, $m_{2,1}^2$, $m_{2,2}^2$, $m_{2,3}^2$, $m_{3,1}^2$, $m_{3,2}^2$, and $m_{3,3}^2$, wherein:
multiplier $m_{1,1}^2$ is electrically coupled in a permanent manner to data storage element $d_{1,1}$,
multiplier $m_{1,2}^2$ is electrically coupled in a permanent manner to data storage element $d_{1,2}$,
multiplier $m_{1,3}^2$ is electrically coupled in a permanent manner to data storage element $d_{1,3}$,
multiplier $m_{2,1}^2$ is electrically coupled in a permanent manner to data storage element $d_{2,1}$,
multiplier $m_{2,2}^2$ is electrically coupled in a permanent manner to data storage element $d_{2,2}$, multiplier $m_{2,3}^2$ is electrically coupled in a permanent manner to data storage element $d_{2,3}$, multiplier $m_{3,1}^2$ is electrically coupled in a permanent manner to data storage element $d_{3,1}$, multiplier $m_{3,2}^2$ is electrically coupled in a permanent manner to data storage element $d_{3,2}$, and multiplier $m_{3,3}^2$ is electrically coupled in a permanent manner to data storage element $d_{3,3}$, wherein, at a start of a first clock cycle:

data storage element $d_{1,1}$ is configured to store data value $x_{1,1}$, data storage element $d_{1,2}$ is configured to store data value $x_{1,2}$, data storage element $d_{1,3}$ is configured to store data value $x_{1,3}$, data storage element $d_{2,1}$ is configured to store data value $x_{2,1}$, data storage element $d_{2,2}$ is configured to store data value $x_{2,2}$, data storage element $d_{2,3}$ is configured to store data value $x_{2,3}$, data storage element $d_{3,1}$ is configured to store data value $x_{3,1}$, data storage element $d_{3,2}$ is configured to store data value $x_{3,2}$, and data storage element $d_{3,3}$ is configured to store data value $x_{3,3}$, wherein, during the first clock cycle:

multiplier $m_{1,1}^1$ is configured to multiply data value $x_{1,1}$ with weight $w_1$ so as to generate a product $w_1 x_{1,1}$, multiplier $m_{1,2}$ is configured to multiply data value $x_{1,2}$ with weight $w_2$ so as to generate a product $w_2 x_{1,2}$, multiplier $m_{1,3}$ is configured to multiply data value $x_{1,3}$ with weight $w_3$ so as to generate a product $w_3 x_{1,3}$, multiplier $m_{2,1}^1$ is configured to multiply data value $x_{2,1}$ with weight $w_4$ so as to generate a product $w_4 x_{2,1}$, multiplier $m_{2,2}^1$ is configured to multiply data value $x_{2,2}$ with weight $w_5$ so as to generate a product $w_5 x_{2,2}$, multiplier $m_{2,3}^1$ is configured to multiply data value $x_{2,3}$ with weight $w_6$ so as to generate a product $w_6 x_{2,3}$, multiplier $m_{3,1}^1$ is configured to multiply data value $x_{3,1}$ with weight $w_7$ so as to generate a product $w_7 x_{3,1}$, multiplier $m_{3,2}^1$ is configured to multiply data value $x_{3,2}$ with weight $w_8$ so as to generate a product $w_8 x_{3,2}$, multiplier $m_{3,3}^1$ is configured to multiply data value $x_{3,3}$ with weight $w_9$ so as to generate a product $w_9 x_{3,3}$, multiplier $m_{1,1}^2$ is configured to multiply data value $x_{1,1}$ with weight $w_{10}$ so as to generate a product $w_{10} x_{1,1}$, multiplier $m_{1,2}^2$ is configured to multiply data value $x_{1,2}$ with weight $w_{11}$ so as to generate a product $w_{11} x_{1,2}$, multiplier $m_{1,3}^2$ is configured to multiply data value $x_{1,3}$ with weight $w_{12}$ so as to generate a product $w_{12} x_{1,3}$, multiplier $m_{2,1}^2$ is configured to multiply data value $x_{2,1}$ with weight $w_{13}$ so as to generate a product $w_{13} x_{2,1}$, multiplier $m_{2,2}^2$ is configured to multiply data value $x_{2,2}$ with weight $w_{14}$ so as to generate a product $w_{14} x_{2,2}$, multiplier $m_{2,3}^2$ is configured to multiply data value $x_{2,3}$ with weight $w_{15}$ so as to generate a product $w_{15} x_{2,3}$, multiplier $m_{3,1}^2$ is configured to multiply data value $x_{3,1}$ with weight $w_{16}$ so as to generate a product $w_{16} x_{3,1}$, multiplier $m_{3,2}^2$ is configured to multiply data value $x_{3,2}$ with weight $w_{17}$ so as to generate a product $w_{17} x_{3,2}$, multiplier $m_{3,3}^2$ is configured to multiply data value $x_{3,3}$ with weight $w_{18}$ so as to generate a product $w_{18} x_{3,3}$, wherein, prior to a second clock cycle that follows the first clock cycle:

the first convolver unit is configured to generate a first sum of terms including at least the product $w_1 x_{1,1}$, the product $w_2 x_{1,2}$, the product $w_3 x_{1,3}$, the product $w_4 x_{2,1}$, the product $w_5 x_{2,2}$, the product $w_6 x_{2,3}$, the product $w_7 x_{3,1}$, the product $w_8 x_{3,2}$, and the product $w_9 x_{3,3}$, and the second convolver unit is configured to generate a second sum of terms including at least the product $w_{10} x_{1,1}$, the product $w_{11} x_{1,2}$, the product $w_{12} x_{1,3}$, the product $w_{13} x_{2,1}$, the product $w_{14} x_{2,2}$, the product $w_{15} x_{2,3}$, the product $w_{16} x_{3,1}$, the product $w_{17} x_{3,2}$, and the product $w_{18} x_{3,3}$, and wherein, at a beginning of the second clock cycle that follows the first clock cycle:

a first accumulator is configured to store the first sum of terms, and a second accumulator is configured to store the second sum of terms.

2. The apparatus of claim 1, wherein the first sum of terms additionally includes $b_1$, wherein $b_1$ is a bias value.

3. The apparatus of claim 1, wherein the second sum of terms additionally includes $b_2$, wherein $b_2$ is a bias value.

* * * * *